US012753886B2

(12) United States Patent
Ogden, Jr.

(10) Patent No.: US 12,753,886 B2
(45) Date of Patent: Oct. 6, 2026

(54) EMITTER ASSEMBLY FOR A LIGHTING DEVICE

(71) Applicant: Lutron Technology Company LLC, Coopersburg, PA (US)

(72) Inventor: Peter W. Ogden, Jr., Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/652,564

(22) Filed: May 1, 2024

(65) Prior Publication Data

US 2024/0369198 A1 Nov. 7, 2024

Related U.S. Application Data

(60) Provisional application No. 63/499,400, filed on May 1, 2023, provisional application No. 63/559,085, filed on Feb. 28, 2024.

(51) Int. Cl.
*F21K 9/66* (2016.01)
*F21K 9/233* (2016.01)
(Continued)

(52) U.S. Cl.
CPC ................ *F21K 9/66* (2016.08); *F21K 9/233* (2016.08); *F21K 9/238* (2016.08); *F21K 9/90* (2013.01);
(Continued)

(58) Field of Classification Search
CPC ... F21K 9/66; F21K 9/238; F21K 9/90; F21K 9/233; F21K 9/69; H10H 20/852; H10H 20/853; H10H 20/855; H10H 20/0362; H10H 20/0363; H10H 20/0361; H10H 20/854; F21V 17/06; F21V 23/005; F21V 23/0457; F21V 3/02; F21V 3/06;
(Continued)

(56) References Cited

U.S. PATENT DOCUMENTS 8,643,041 B2 2/2014 Lee et al.
2007/0212802 A1* 9/2007 Lee ...................... H10H 20/853 257/E33.059

(Continued)

FOREIGN PATENT DOCUMENTS

CN 102347418 A * 2/2012 ............. H01L 24/97

*Primary Examiner* — Omar Rojas Cadima
(74) *Attorney, Agent, or Firm* — Flaster Greenberg P.C.

(57) ABSTRACT

An emitter assembly for a lighting device may comprise a substrate, one or more emitters mounted to a surface of the substrate, a first dome portion formed on the surface of the substrate and encapsulating the one or more emitters, and a second dome portion located above the first dome portion. The first and second dome portions may both be made of materials that are optically transmissive. The second dome portion may have a shape that may be configured to direct light from the emitters in a particular direction. The emitter assembly may comprise a barrier located on the surface of the substrate and surrounding the emitters. The barrier and the surface of the substrate may define a recess in which the first dome portion is located. The emitter assembly may further comprise an adhesive that may be located between and attach the first and second dome portions.

22 Claims, 30 Drawing Sheets

(51) Int. Cl.

| | |
|---|---|
| ***F21K 9/238*** | (2016.01) |
| ***F21K 9/90*** | (2016.01) |
| ***F21V 3/02*** | (2006.01) |
| ***F21V 3/06*** | (2018.01) |
| ***F21V 17/06*** | (2006.01) |
| ***F21V 23/00*** | (2015.01) |
| ***F21V 23/04*** | (2006.01) |
| *F21Y 105/16* | (2016.01) |
| *F21Y 115/10* | (2016.01) |

(52) U.S. Cl.

CPC .................. *F21V 3/02* (2013.01); *F21V 3/06* (2018.02); *F21V 17/06* (2013.01); *F21V 23/005* (2013.01); *F21V 23/0457* (2013.01); *F21Y 2105/16* (2016.08); *F21Y 2115/10* (2016.08)

(58) Field of Classification Search

CPC ...... F21V 5/007; F21V 5/045; F21Y 2105/16; F21Y 2115/10; F21Y 2105/10; H01L 25/0753; G02B 5/1876

See application file for complete search history.

(56) References Cited

U.S. PATENT DOCUMENTS

| | | | | |
|---|---|---|---|---|
| 2007/0241357 | A1 | 10/2007 | Yan | |
| 2008/0180960 | A1 * | 7/2008 | Harrah | H10H 20/853 257/E33.059 |
| 2010/0065879 | A1 | 3/2010 | Kirsch et al. | |
| 2011/0278617 | A1 * | 11/2011 | Lee | H10H 20/853 257/E33.059 |
| 2012/0025216 | A1 * | 2/2012 | Kolodin | C09K 11/02 257/E33.056 |
| 2012/0025243 | A1 * | 2/2012 | Lin | H01L 24/97 257/E33.072 |
| 2012/0168795 | A1 | 7/2012 | Liu | |
| 2020/0318823 | A1 * | 10/2020 | Bocock | F21V 23/0435 |

* cited by examiner

EMITTER ASSEMBLY FOR A LIGHTING DEVICE

CROSS-REFERENCE TO RELATED APPLICATIONS

This application claims the benefit of Provisional U.S. Patent Application No. 63/499,400, filed May 1, 2023, and U.S. Patent Application No. 63/559,085, filed Feb. 28, 2024, the disclosures of which are incorporated herein by reference in their entirety.

BACKGROUND

Lamps and displays using efficient light sources, such as light-emitting diodes (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. In addition, the LED light sources may have no hazardous materials, and may provide additional specific advantages for different applications. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

A multi-colored LED illumination device may have two or more different colors of LED emission devices (e.g., LED emitters) that are combined within the same package to produce light (e.g., white or near-white light). There are many different types of white light LED light sources on the market, some of which combine red, green, and blue (RGB) LED emitters; red, green, blue, and yellow (RGBY) LED emitters; phosphor-converted white and red (WR) LED emitters; red, green, blue, and white (RGBW) LED emitters, etc. By combining different colors of LED emitters within the same package, and driving the differently-colored emitters with different drive currents, these multi-colored LED illumination devices may generate white or near-white light within a wide gamut of color points or correlated color temperatures (CCTs) ranging from warm white (e.g., approximately 2600K-3700K), to neutral white (e.g., approximately 3700K-5000K) to cool white (e.g., approximately 5000K-8300K). Some multi-colored LED illumination devices also may enable the brightness (e.g., intensity or dimming level) and/or color of the illumination to be changed to a particular set point. These tunable illumination devices may all produce the same color and color rendering index (CRI) when set to a particular dimming level and chromaticity setting (e.g., color set point) on a standardized chromaticity diagram.

SUMMARY

As described herein, a light-generation module for a lighting device may comprise an emitter assembly having a dome. In some examples, the dome has a two-part structure that may provide less stress on the structure of the emitter assembly and thus lead to less damage to the structure of the emitter assembly during creation of the dome. As described herein, a dome is not limited to any particular shape. A dome may have any of a variety of different shapes, such as a hemispherical shape, a rectangular shape, a square shape, or a non-uniform shape. Each portion of a dome may have the same shape or different shapes. A dome may encapsulate, or form a dome over, one or more components of the light-generation module.

The light-generation module may also comprise a substrate to which the emitter assembly may be mounted. The substrate may comprise a printed circuit board to which drive circuitry for the emitter module is mounted. For example, the substrate may be a metal-core printed circuit board or may be made of an FR4 material. In some examples, the substrate may comprise an intermediate substrate (e.g., a ceramic substrate) that may be mounted to a separate printed circuit board of the light-generation module.

The emitter assembly may comprise one or more emitters mounted to a surface of the substrate, a first dome portion formed on the surface of the substrate and encapsulating the one or more emitters, and a second dome portion located above the first dome portion, such that the first dome portion is located between the second dome portion and the substrate. The first dome portion may be made of a first material that is optically transmissive. The second dome portion may have a shape that is configured to direct light from the one or more emitters in a particular direction. The second dome portion may be made of a second material that is optically transmissive and may define an interface surface. For example, the first dome portion may define an interface surface that is substantially parallel to and extends above the surface of the substrate. The emitter assembly may comprise an adhesive located between the interface surface of the first dome portion and the interface surface of the second dome portion that attaches the first dome portion to the second dome portion. In some examples, the emitter assembly may comprise a barrier located on the surface of the substrate and surrounding the one or more emitters. The barrier and the surface of the substrate may define a recess in which the first dome portion is located. For example, the first dome portion may be formed during a curing process.

In addition, a plurality of methods of manufacturing an emitter assembly for a lighting device are described herein. For example, the method may comprise: (1) encapsulating one or more emitters that are mounted to a surface of a substrate in a first dome portion, wherein the first dome portion is made from a first material that is optically transmissive; (2) applying an adhesive to an interface surface of the first dome portion; (3) placing a second dome portion onto the first dome portion, such that the adhesive is captured between the interface of the first dome portion and an interface surface of the second dome portion, wherein the second dome portion has a shape configured to direct light from the one or more emitters in a particular direction and is made from a second material that is optically transmissive; and (4) curing the adhesive to form a full dome from the first dome portion and the second dome portion.

In addition, a method of manufacturing an emitter assembly for a lighting device may comprise: (1) forming a barrier on a surface of a substrate around one or more emitters that are mounted to the substrate, such that the barrier and the surface of the substrate define a recess; (2) depositing a first material into the recess defined by the barrier and the surface of the substrate, where the first material is optically transmissive; (3) curing the first material to form a first dome portion in the recess; (4) applying an adhesive to an interface surface of the first dome portion; (5) placing a second dome portion onto the first dome portion, such that the adhesive is captured between the interface surface of the first dome portion and an interface surface of the second dome portion, wherein the second dome portion has a shape configured to direct light from the one or more emitters in a particular direction and is made from a second material that is optically transmissive; and (6) curing the adhesive to form a full dome from the first dome portion and the second dome portion.

Further, a method of manufacturing an emitter assembly for a lighting device may comprise: (1) forming a barrier on a surface of a substrate around one or more emitters that are mounted to the substrate, such that the barrier and the surface of the substrate define a recess; (2) depositing a first material into the recess defined by the barrier and the surface of the substrate, where the first material is optically transmissive; (3) placing a second dome portion onto the first material in the recess defined by the barrier, wherein the second dome portion has a shape configured to direct light from the one or more emitters in a particular direction and is made from a second material that is optically transmissive; and (4) curing the first material to form a full dome from the first dome portion and the second dome portion.

In addition, a method of manufacturing an emitter assembly for a lighting device may comprise: (1) forming a barrier on an interface surface of a second dome portion, such that the barrier and the interface surface of the second dome portion define a recess; (2) depositing a first material into the recess defined by the barrier and the interface surface of the second dome portion, where the first material is optically transmissive; (3) placing a substrate on the first material in the recess, such that one or more emitters that are mounted to a surface of the substrate are received in the recess; and (4) curing the first material to form a full dome from a first dome portion and the second dome portion. The second dome portion may have a shape configured to direct light from the one or more emitters in a particular direction and may be made from a second material that is optically transmissive.

A light-generation module may include a substrate and an emitter assembly mounted to the substrate. The emitter assembly may include one or more emitters mounted to the substrate. The emitter assembly may include a barrier located on a surface of the substrate and surrounding the one or more emitters. The barrier and the surface of the substrate may define a recess. The emitter assembly may include a first portion (e.g., a first dome portion) formed on the surface of the substrate and located within the recess defined by the barrier and the surface of the substrate. The first dome portion may encapsulate the one or more emitters. The first dome portion may be made of a first material that is optically transmissive. The emitter assembly may include a second portion (e.g., a second dome portion) located above the first dome portion, such that the first dome portion is located between the second dome portion and the substrate. The second dome portion may have a shape configured to direct light from the one or more emitters in a particular direction. The second dome portion may be made of a second material that is optically transmissive and/or may define an interface surface.

The second dome portion may include one or more support members configured to support the second dome portion relative to the first dome portion. The one or more support members may be configured to support the second dome portion above and on top of the first dome portion. The one or more support members may extend from the interface surface of the second dome portion into the recess formed by the barrier and the surface of the substrate. The one or more support members may contact the substrate. The one or more support members may include flange portions that are configured to hold the second dome portion in place relative to the first dome portion. The one or more support members may include outer edges that contact the barrier. The one or more support members may extend from the interface surface of the second dome portion around the outside of the barrier. The one or more support members may extend around the outside of the barrier and contact the substrate.

The first dome portion may be formed during a curing process. In some examples, prior to the curing process, the first material may include a liquid material, and, after the curing process, the first dome portion may be a cured form of the liquid material deposited in the recess defined by the barrier and the surface of the substrate. The first dome portion may be formed by depositing the first material into the recess defined by the barrier and curing the first material. The second dome portion defines an interface surface configured to bond with the first material of the first dome portion during the curing process.

In some examples, the substrate is a printed circuit board. Drive circuitry for the emitters of the emitter assembly may be mounted to the printed circuit board. In some examples, the printed circuit board comprises a metal core printed circuit board. In some examples, the printed circuit board is made from an FR4 material.

The light-generation module may include a printed circuit board, wherein the substrate comprises an intermediate substrate mounted to the printed circuit board. In some examples, the intermediate substrate comprises a ceramic substrate. The emitter assembly may include an adhesive located between the interface surface of the first dome portion and the interface surface of the second dome portion for attaching the first dome portion to the second dome portion.

A light-generation module may include a substrate and an emitter assembly mounted to the substrate. The emitter assembly may include one or more emitters mounted to a surface of the substrate. The emitter assembly may include a first dome portion formed on the surface of the substrate and encapsulating the one or more emitters, the first dome portion made of a first material that is optically transmissive. The first dome portion may define an interface surface that is substantially parallel to and extends above the surface of the substrate. The emitter assembly may include a second dome portion located above the first dome portion, such that the first dome portion is located between the second dome portion and the substrate. The second dome portion may have a shape configured to direct light from the one or more emitters in a particular direction. The second dome portion may be made of a second material that is optically transmissive and/or may define an interface surface. The emitter assembly may include an adhesive located between the interface surface of the first dome portion and the interface surface of the second dome portion that attaches the first dome portion to the second dome portion.

The emitter assembly may include a barrier located on the surface of the substrate and/or may surround the one or more emitters. The barrier and the surface of the substrate may define a recess in which the first dome portion is located.

The first dome portion may be formed during a curing process. In some examples, prior to the curing process, the first material comprises a liquid material, and, after the curing process, the first dome portion comprises a cured form of the liquid material deposited in the recess defined by the barrier and the surface of the substrate. The first dome portion may be formed by depositing the first material into the recess defined by the barrier and curing the first material. The barrier may be formed in a circle, and a perimeter of the interface surface of the second dome portion may be a circle, and a diameter of a centerline of the barrier may be approximately equal to a diameter of the interface surface of the second dome portion. In some examples, the perimeter of the interface surface of the second dome portion is aligned with a centerline of the barrier.

The barrier may be made of a high viscosity, quick setting epoxy material. The first material of the first dome portion and the second material of the second dome portion may be the same material. The first material and the second material may include a translucent thermoset material. The translucent thermoset material may be an optical liquid silicone rubber. The first dome portion may be formed through an injection molding process. The first dome portion may be affixed to the surface of the substrate during the injection molding process. The first dome portion may be made of an optical liquid silicone rubber.

The one or more emitters may be located within the perimeters of the interface surface of the first dome portion and the interface surface of the second dome portion. In some examples, the emitter assembly further comprises one or more detectors mounted to the surface of the substrate within the perimeters of the interface surface of the first dome portion and the interface surface of the second dome portion, and/or the detectors may be configured to detect an amount of light emitted the one or more emitters and reflected back by at least one of the first dome portion or the second dome portion. The emitter assembly may include one or more wires electrically connecting the one or more emitters to electrical traces on the substrate, and the first dome portion may encapsulate the one or more emitters and the wires.

In some examples, ach of the interface surface of the first dome portion and the interface surface of the second dome portion have a circular shape, and a diameter of the interface surface of the first dome portion is approximately equal to a diameter of the interface surface of the second dome portion. A perimeter of the interface surface of the first dome portion may be aligned with a perimeter of the interface surface of the second dome portion. The substrate may include a printed circuit board. In some examples, drive circuitry for the emitters of the emitter assembly are mounted to the printed circuit board. The printed circuit board may include a metal core printed circuit board. The printed circuit board may be made from an FR4 material.

In some examples the light-generation module may include a printed circuit board. The substrate may include an intermediate substrate mounted to the printed circuit board. The intermediate substrate may be a ceramic substrate. In some examples, each of the interface surface of the first dome portion and the interface surface of the second dome portion are substantially flat. The second dome portion may have a hemispherical shape. The second dome portion may have an outer surface that is textured. The second dome portion may be transparent. The adhesive may include an optical bonding silicone.

An emitter assembly may include a substrate, one or more emitters mounted to a surface of the substrate, and an optical structure. The optical structure may include a first portion (e.g., a first dome portion) and a second portion (e.g., a second dome portion). The first dome portion may be formed on the surface of the substrate and encapsulating the one or more emitters. The first dome portion may be made of a first material that is optically transmissive. The first dome portion may define an interface surface that is substantially parallel to and extends above the surface of the substrate. The second dome portion may be located above the first dome portion, such that the first dome portion is located between the second dome portion and the substrate. The second dome portion may have a shape configured to direct light from the one or more emitters in a particular direction. The second dome portion may be made of a second material that is optically transmissive and defining an interface surface. The optical structure may include an adhesive located between the interface surface of the first dome portion and the interface surface of the second dome portion that attaches the first dome portion to the second dome portion.

The emitter assembly may include a barrier located on the surface of the substrate and surrounding the one or more emitters. The barrier and the surface of the substrate may define a recess in which the first dome portion of the optical structure is located. The first dome portion of the optical structure may be formed during a curing process. In some examples, prior to the curing process, the first material comprises a liquid material, and, after the curing process, the first dome portion of the optical structure comprises a cured form of the liquid material deposited in the recess defined by the barrier and the surface of the substrate. The first dome portion of the optical structure may be formed by depositing the first material into the recess defined by the barrier and curing the first material.

The barrier may be formed in a circle, and a perimeter of the interface surface of the second dome portion of the optical structure may be a circle. The diameter of a centerline of the barrier may be approximately equal to a diameter of the interface surface of the second dome portion of the optical structure. The perimeter of the interface surface of the second dome portion of the optical structure may be aligned with a centerline of the barrier.

The barrier may be made of a high viscosity, quick setting epoxy material.

The first material of the first dome portion of the optical structure and the second material of the second dome portion of the optical structure may be the same material. The first material and the second material may both comprise a translucent thermoset material. The translucent thermoset material may include an optical liquid silicone rubber.

The first dome portion of the optical structure may be formed through an injection molding process. The first dome portion of the optical structure may be affixed to the surface of the substrate during the injection molding process. The first dome portion of the optical structure may be made of an optical liquid silicone rubber.

The one or more emitters may be located within a perimeters of the interface surface of the first dome portion of the optical structure and the interface surface of the second dome portion of the optical structure. The emitter assembly may include one or more detectors mounted to the surface of the substrate within the perimeters of the interface surface of the first dome portion of the optical structure and the interface surface of the second dome portion of the optical structure. The detectors may be configured to detect an amount of light emitted the one or more emitters and reflected back by one or more of the first dome portion or the second dome portion. The emitter assembly may include one or more wires electrically connecting the one or more emitters to electrical traces on the substrate. The first dome portion of the optical structure may encapsulate the one or more emitters and the wires.

In some examples, each of the interface surface of the first dome portion of the optical structure and the interface surface of the second dome portion of the optical structure may have a circular shape, and a diameter of the interface surface of the first dome portion may be approximately equal to a diameter of the interface surface of the second dome portion. A perimeter of the interface surface of the first dome portion of the optical structure may be aligned with a perimeter of the interface surface of the second dome portion of the optical structure. Each of the interface surface of the first dome portion of the optical structure and the interface surface of the second dome portion of the optical structure may be substantially flat.

The second dome portion of the optical structure may have a hemispherical shape. The second dome portion of the optical structure may have an outer surface that is textured. The second dome portion of the optical structure may be transparent. The adhesive may include an optical bonding silicone. The substrate may include at least one of a ceramic substrate or a printed circuit board.

DETAILED DESCRIPTION

Figure 1:
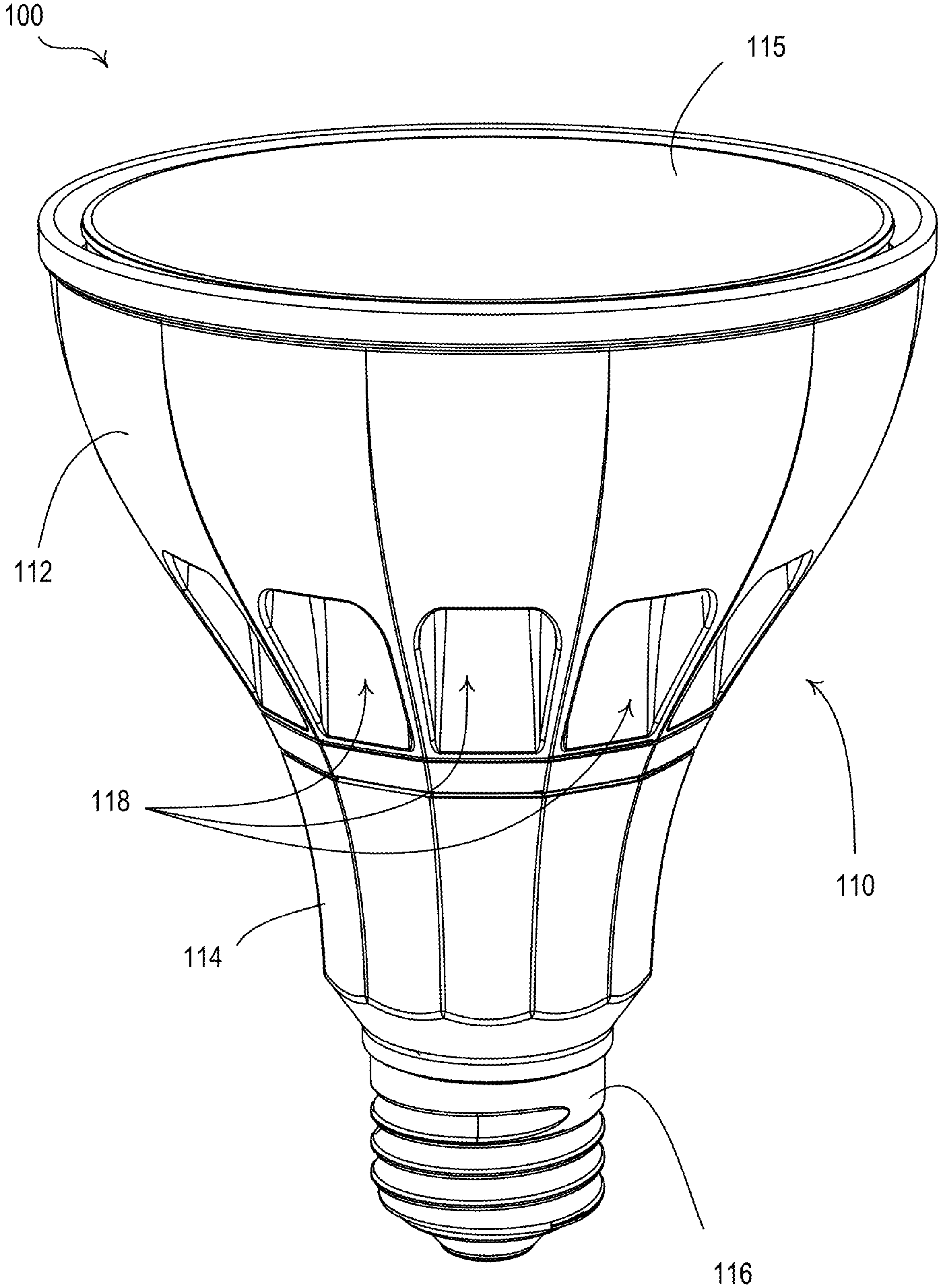
FIG. 1 is a perspective view of an example lighting device.

FIG. 1 is a perspective view of an example illumination device, such as a lighting device 100 (e.g., a controllable LED lighting device). The lighting device 100 may have a parabolic form factor and may be a parabolic aluminized reflector (PAR) lamp. The lighting device 100 may include a housing 110 (e.g., having a housing heat sink 112 and a base portion 114) and a lens 115. The lens 115 may be made of any suitable material, for example glass. The lens 115 may be transparent or translucent and may be flat or domed, for example. The lighting device 100 may include a screw-in base 116 that may be configured to be screwed into a standard Edison socket for electrically coupling the lighting device 100 to an alternating-current (AC) power source. The housing heat sink 112 may comprise vents 118 to allow for cooling of the lighting device 100 (e.g., as will be described in greater detail below).

Figure 2:
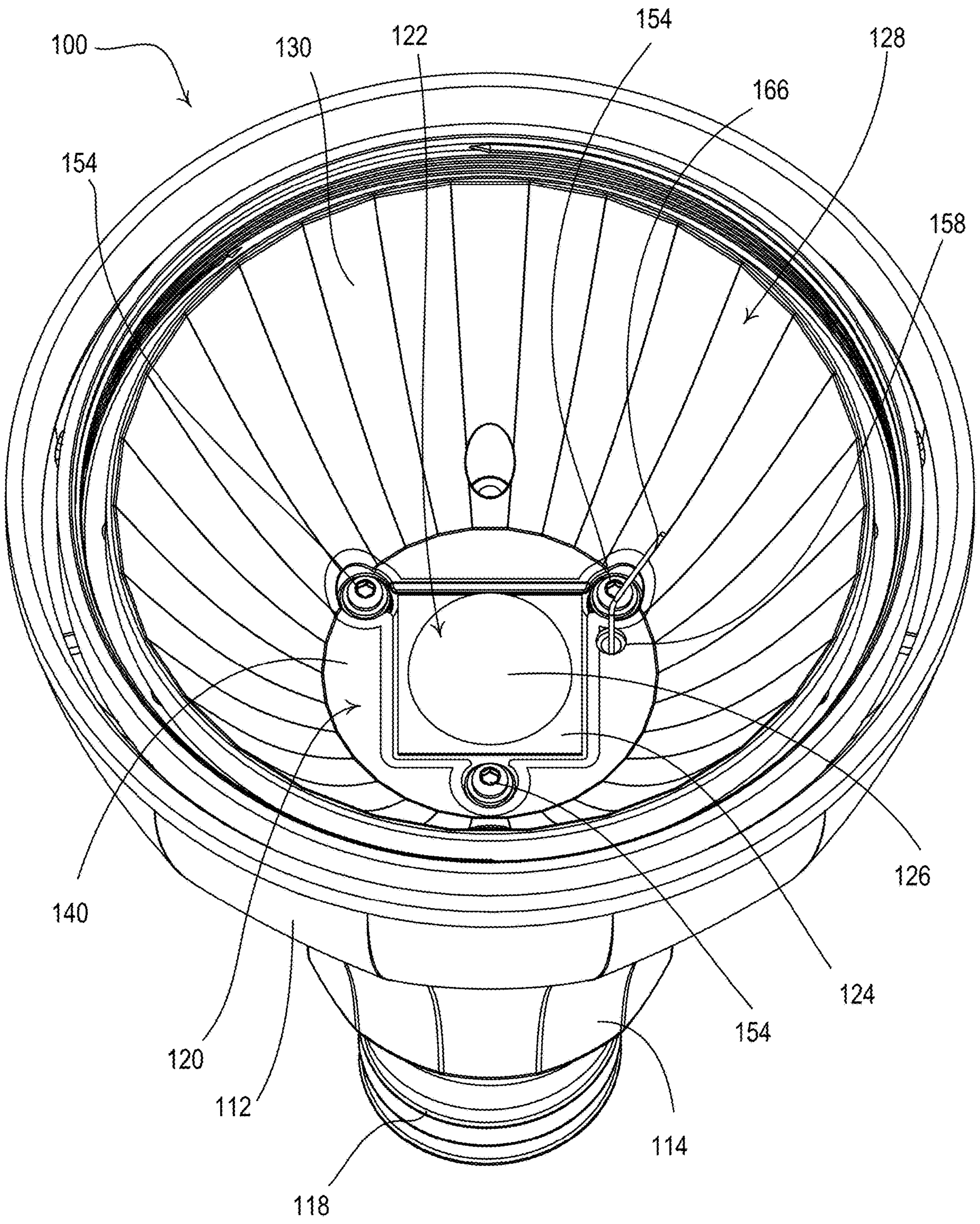
FIG. 2 is a perspective view of the lighting device of FIG. 1 with a lens removed.
Figure 3:
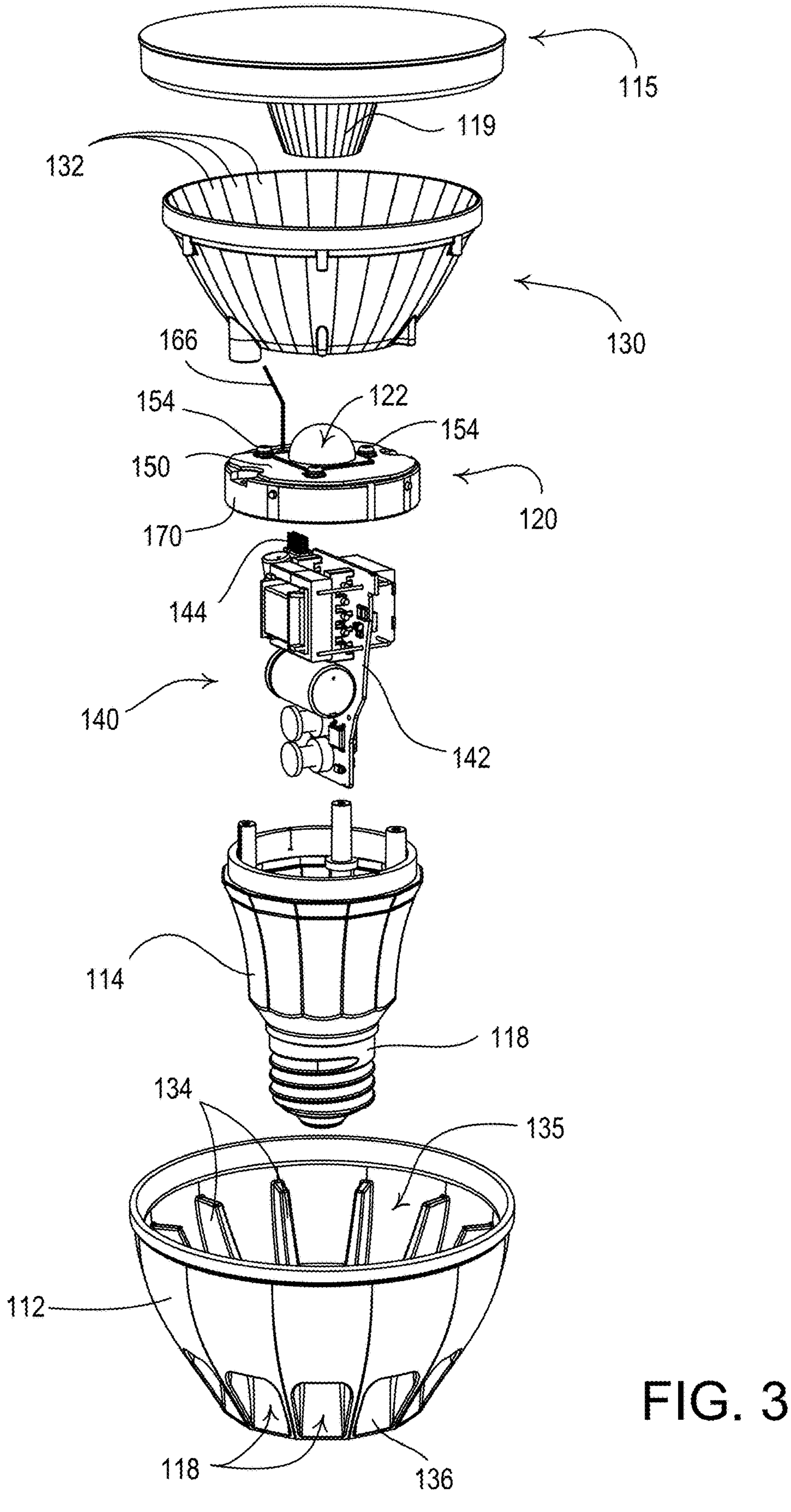
FIG. 3 is an exploded view of the lighting device of FIG. 1.

FIG. 2 is a perspective view of the lighting device 100 with the lens 115 removed. FIG. 3 is an exploded view of the lighting device 100. The lighting device 100 may comprise a light-generation module 120 that has a lighting load, such as an emitter assembly 122 (e.g., an emitter module). The emitter assembly 122 may include one or more emitters (e.g., emission LEDs) and/or one or more detectors (e.g., detection LEDs). The emitters and detectors may be mounted on a substrate 124. The emitter assembly 122 may comprise an optical element, such as a dome 126. As described in more detail herein, the dome 126 is not limited to any particular shape. The dome 126 may have any of a variety of different shapes, such as a hemispherical shape, a rectangular shape, a square shape, or a non-uniform shape. The dome may encapsulate, or form a dome over, one or more components of the light-generation module.

The emitters and detectors of the emitter assembly 122 may be encapsulated by the dome 126. In some examples, the substrate 124 may be an intermediate substrate, such as a ceramic substrate formed from an aluminum nitride or an aluminum oxide material or some other reflective material. For example, the substrate 124 may function to improve output efficiency of the emitter assembly 122 by reflecting light out of the emitter assembly 122 through the dome 126. In some examples, the substrate 124 may comprise a printed circuit board (PCB) (e.g., without an intermediate substrate), such as a rigid PCB (e.g., made from an FR4 material) and/or a metal core PCB. The dome 126 may comprise an optically-transmissive material, such as silicon or the like, and may be formed through an over-molding process, for example. A surface of the dome 126 may be lightly textured to increase light scattering and promote color mixing, as well as to reflect a small amount of the emitted light back toward the detectors mounted on the substrate 124 (e.g., about 5%). In some examples, the dome 126 may be made of a diffusive material.

The emitter assembly 122 may be surrounded by the housing heat sink 112 of the housing 110 in an emitter cavity

128 (e.g., an optical cavity) of the lighting device 100. The emitter cavity 128 may be defined by the lens 115, the reflector 130, and/or the carrier PCB 150. The emitter assembly 122 may be configured to shine light through the lens 115 (e.g., when the lens 115 is attached to the housing heat sink 112 of the housing 110). For example, light from the emitter assembly 122 (e.g., the emission LEDs within the emitter assembly 122) may be emitted through the lens 115. The lens 115 may also comprise a collector 119 (e.g., a cone-shaped collector) configured to direct the light emitted by the emitter assembly 122 into a beam of light. The lens 115 may comprise an array of lenslets (not shown) formed on both sides of the lens. An example of a lighting device having a lens with lenslets is described in greater detail in U.S. Pat. No. 9,736,895, issued Aug. 15, 2017, entitled COLOR MIXING OPTICS FOR LED ILLUMINATION DEVICE, the entire disclosure of which is hereby incorporated by reference.

The lighting device 100 may comprise a reflector 130 that may be located within the housing heat sink 112 of the housing 110. The reflector 130 may be configured to reflect the light emitted by the emitter assembly 122 (e.g., the emission LEDs within the emitter assembly 122) towards the lens 115. The reflector 130 may shape the light produced by the emission LEDs within the emitter assembly 122 to shine out through the lens 115. The reflector 130 may comprise planar facets 132 (e.g., lunes) that may provide some randomization of the reflections of the light rays emitted by the emitter assembly 122 prior to exiting the lighting device 100 through the lens 115. The reflector 130 may be configured to sit on fins 134 inside of the housing heat sink 112 of the housing 110.

The lighting device 100 may comprise a power converter circuit 140 mounted to a power printed circuit board (PCB) 142. The power converter circuit 140 may be enclosed by the base portion 114 of the housing 110. The power converter circuit 140 may be electrically connected to the screw-in base 116, such that the power converter circuit may be an AC mains line voltage generated by the AC power source. The power converter circuit 140 may comprise a bus connector 144 that may be connected to the light-generation module 120. The power converter circuit 140 may be configured to convert the AC mains line voltage received from the AC power source into a direct-current (DC) bus voltage for powering the light-generation module 120. The power converter circuit 140 may comprise a rectifier circuit (e.g., a full-wave bridge rectifier) for converting the AC mains line voltage to a rectified voltage.

The light-generation module 120 may be mounted in a cavity 135 of the housing heat sink 112. The housing heat sink 112 may comprise a support portion 136 that may be connected to the base portion 114 of the housing 110. The light-generation module 120 may be mounted to the support portion 136 inside of the cavity 135 of the housing heat sink 112.

Figure 4:
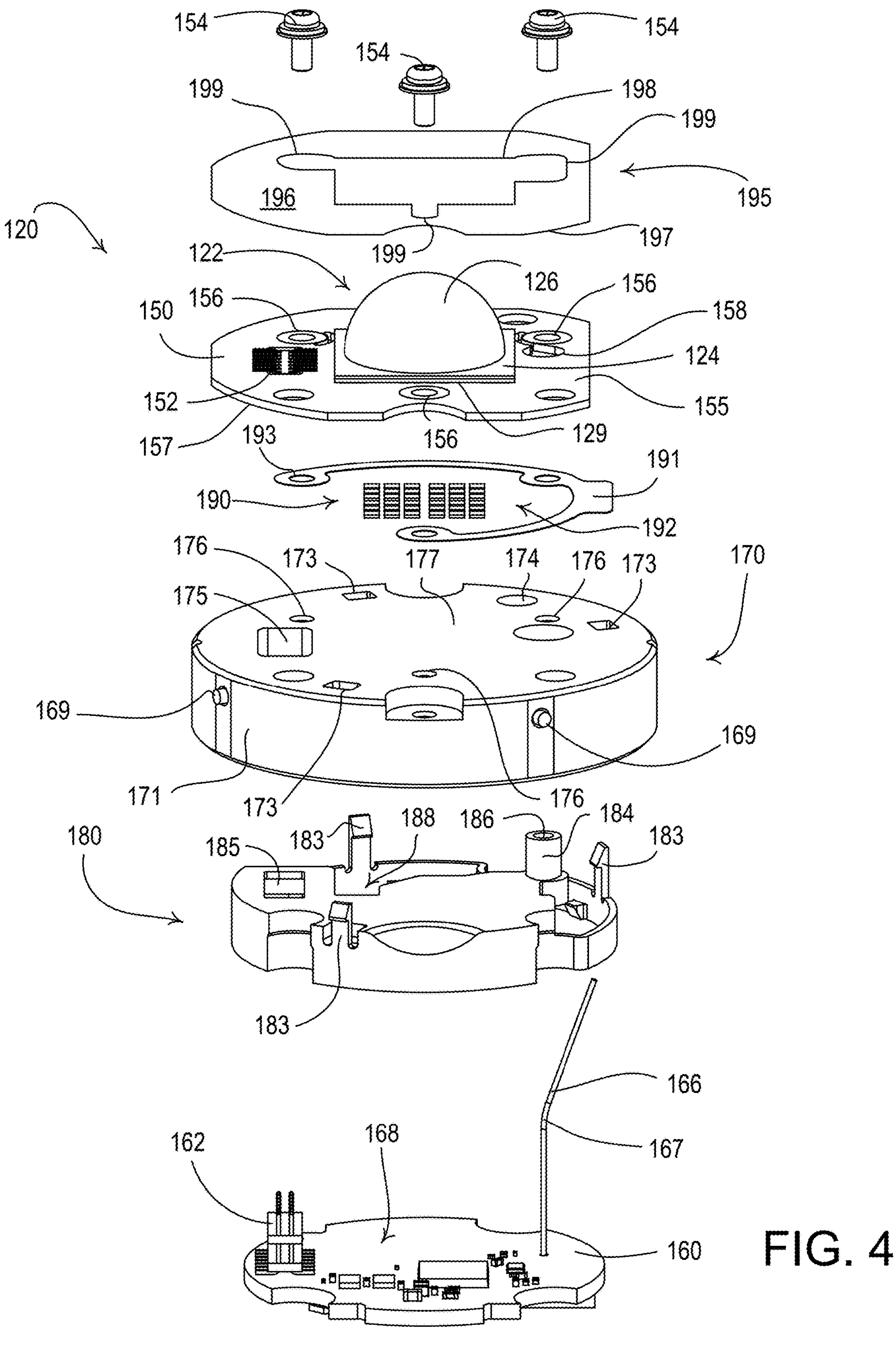
FIG. 4 is a top exploded view of a light-generation module of the lighting device of FIG. 1.
Figure 5:
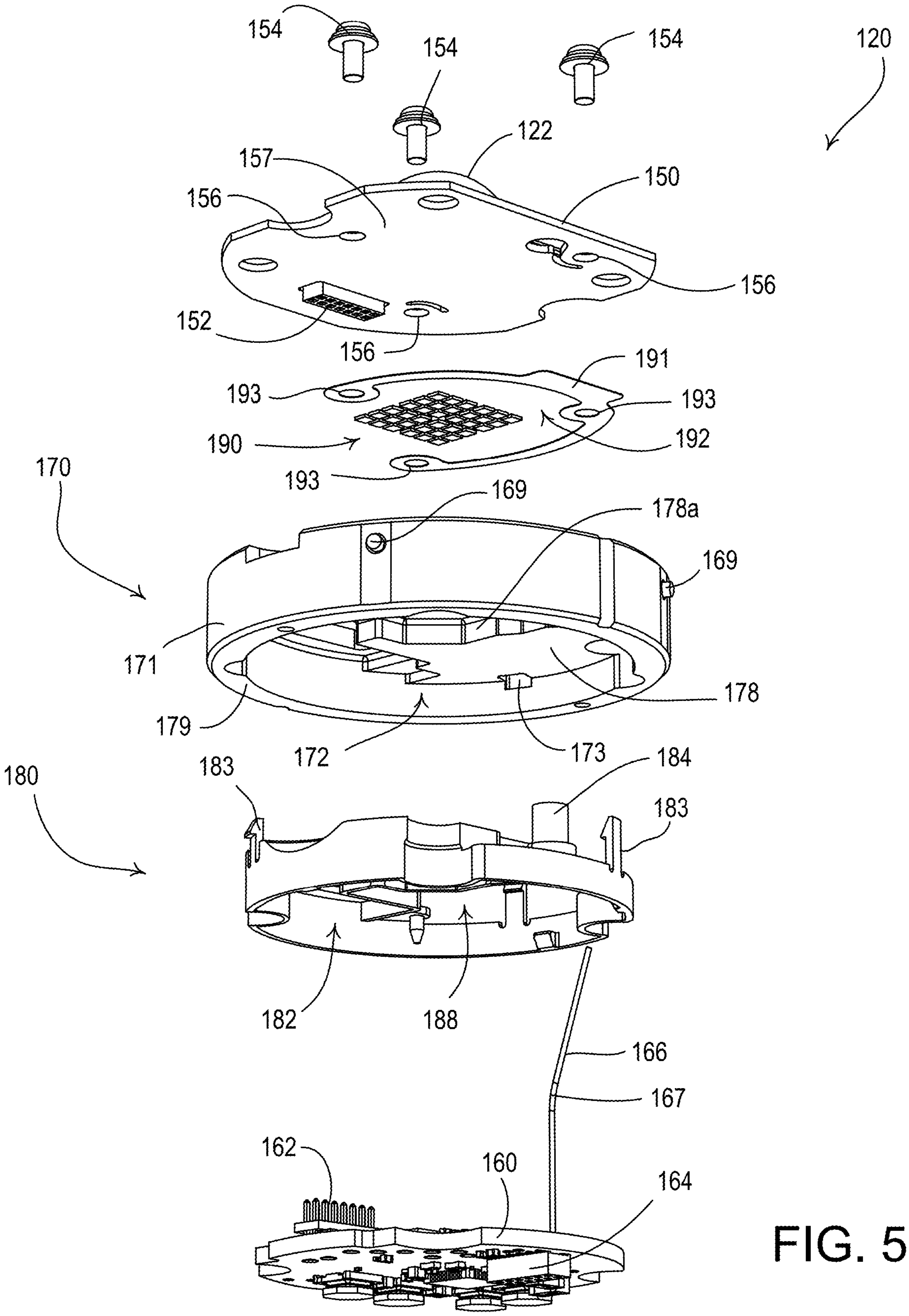
FIG. 5 is a bottom exploded view of the light-generation module of FIG. 4.

FIG. 4 is a top exploded view and FIG. 5 is a bottom exploded view of the light-generation module 120. The light-generation module 120 may comprise a carrier printed circuit board (PCB) 150. For example, the emitter assembly 122 (e.g., the substrate 216 of the emitter assembly 122) may be mounted to a center of the carrier PCB 150 (e.g., when the substrate 124 is an intermediate substrate). In some examples, the emitter assembly 122 may be directly mounted to the carrier PCB 150. When the emitter module 122 is an intermediate substrate (e.g., as shown in FIG. 4), the emitter assembly 122 may comprise electrical pads (not shown) on a bottom surface of the substrate 124 that may be electrically connected (e.g., soldered) to corresponding electrical pads (not shown) on the carrier PCB 150. The light-generation module 120 may also comprise a control PCB 160 on which electrical circuitry may be mounted (e.g., as will be described in greater detail with reference to FIG. 12). The electrical circuitry mounted on the control PCB 160 may include one or more drive circuits for controlling the amount of power delivered to the emitter LEDs of the emitter assembly 122, one or more control circuits for controlling the drive circuits, and one or more wireless communication circuits for communicating wireless signal (e.g., radio-frequency (RF) signals) with external devices. The control PCB 160 may comprise a bus connector 164 configured to be attached to the bus connector 144 on the power PCB 142. The control PCB 160 may be arranged in a plane that is parallel to a plane of the carrier PCB 150. The carrier PCB 150 and the control PCB 160 may each have a circularly-shaped periphery.

The light-generation module 120 may comprise a module heat sink 170 and an insulator 180. The module heat sink 170 may be captured (e.g., sandwiched) between the carrier PCB 150 and the control PCB 160. The module heat sink 170 may be made from a thermally-conductive material (e.g., aluminum). The module heat sink 170 may define a planar front surface 177 having a circular periphery. The module heat sink 170 may have an outer sidewall 171 that extends from the periphery of the front surface 177, such that the module heat sink 170 has a cylindrical shape. Alternatively, the module heat sink 170 may have a truncated cone shape. The module heat sink 170 may comprise pins 169 (e.g., cylindrical pins) that extend from the sidewall 171 and may allow the light-generation module 120 to be connected to the housing heat sink 112 of the housing 110. The module heat sink 170 may also define a recess 172 in a rear surface 179 of the module heat sink 170. The module heat sink 170 may be configured to radiate heat generated by the emitter assembly 122. For example, the module heat sink 170 may be configured to radiate heat generated by the emitter assembly 122 radially out through the sidewall 171. In some examples, the emitter assembly 122 (e.g., the substrate 216) may be mounted to the module heat sink 170 (e.g., and/or another structure of the light-generation module 120) and electrically coupled to the carrier PCB 150, the control PCB 160, and/or the power PCB 142.

The insulator 180 may also have a cylindrical shape and may be configured to be received in the recess 172 in the module heat sink 170. The insulator 180 may include a recess 182. The control PCB 160 may be received in the recess 182 in the insulator 180. The insulator 180 may be made of a suitable electrically insulating material, such as plastic. The insulator 180 may be configured to electrically isolate the control PCB 160 (e.g., the drive circuit, the control circuit, and the wireless communication circuit) from the module heat sink 170. The insulator 180 may comprise snaps 183 configured to attach to tabs (not shown) in openings 173 of the module heat sink 170 for connecting the insulator 180 to the module heat sink 170. The insulator 180 may comprise an extension 184 (e.g., a cylindrical extension) comprising a bore 186. The extension 184 of the insulator 180 may be received in a tunnel 174 (e.g., a cylindrical opening) that extends through the module heat sink 170. The carrier PCB 150 may comprise a carrier PCB connector 152, which may be electrically connected to a control PCB connector 162 on the control PCB 160, for example, to electrically couple the carrier PCB 150 and the control PCB 160. One or more (e.g., both) of the connectors 152, 162 may extend through an opening 175 in the module heat sink 170 and an opening 185 in the insulator 180.

The carrier PCB 150 may be connected to the module heat sink 170, such that a rear surface 157 of the carrier PCB 150 may contact the front surface 177 of the module heat sink 170. A thermally-conductive substance 190 (e.g., a plurality of beads of the thermally-conductive substance as shown in FIGS. 4 and 5) may be disposed between the rear surface 157 of the carrier PCB 150 and the front surface 177. A spacer 191 may also be located between the rear surface 157 of the carrier PCB 150 and the front surface 177 of the module heat sink 170, such that the thermally-conductive substance 190 is located in a void 192 of the spacer 191. The carrier PCB 150 may be connected to the module heat sink 170 via fasteners, such as screws 154. The screws 154 may be received through openings 156 in the carrier PCB 150, openings 193 in the spacer 191, and openings 176 in the module heat sink 170. The spacer 191 may operate to relieve stress on the carrier PCB 150 and the substrate 124 of the emitter assembly 122 as the screws 154 are tightened. For example, if the spacer 191 was not included, the carrier PCB 140 may bend due to the thermally-conductive substance 190 between the rear surface 157 of the carrier PCB 150 and the front surface 177 of the module heat sink 170, which could cause stress on the electrical connections (e.g., solder joints) between the carrier PCB 150 and the substrate 124 of the emitter assembly 122. In addition, the spacer 190 may be integral to the module heat sink 170 (e.g., extending from the front surface 177 of the module heat sink 170). Further, the module heat sink 170 may comprise a shallow recess (not shown) in the front surface 177 in which the thermally-conductive substance 190 may be located (e.g., and the spacer 190 may be omitted).

Figure 6:
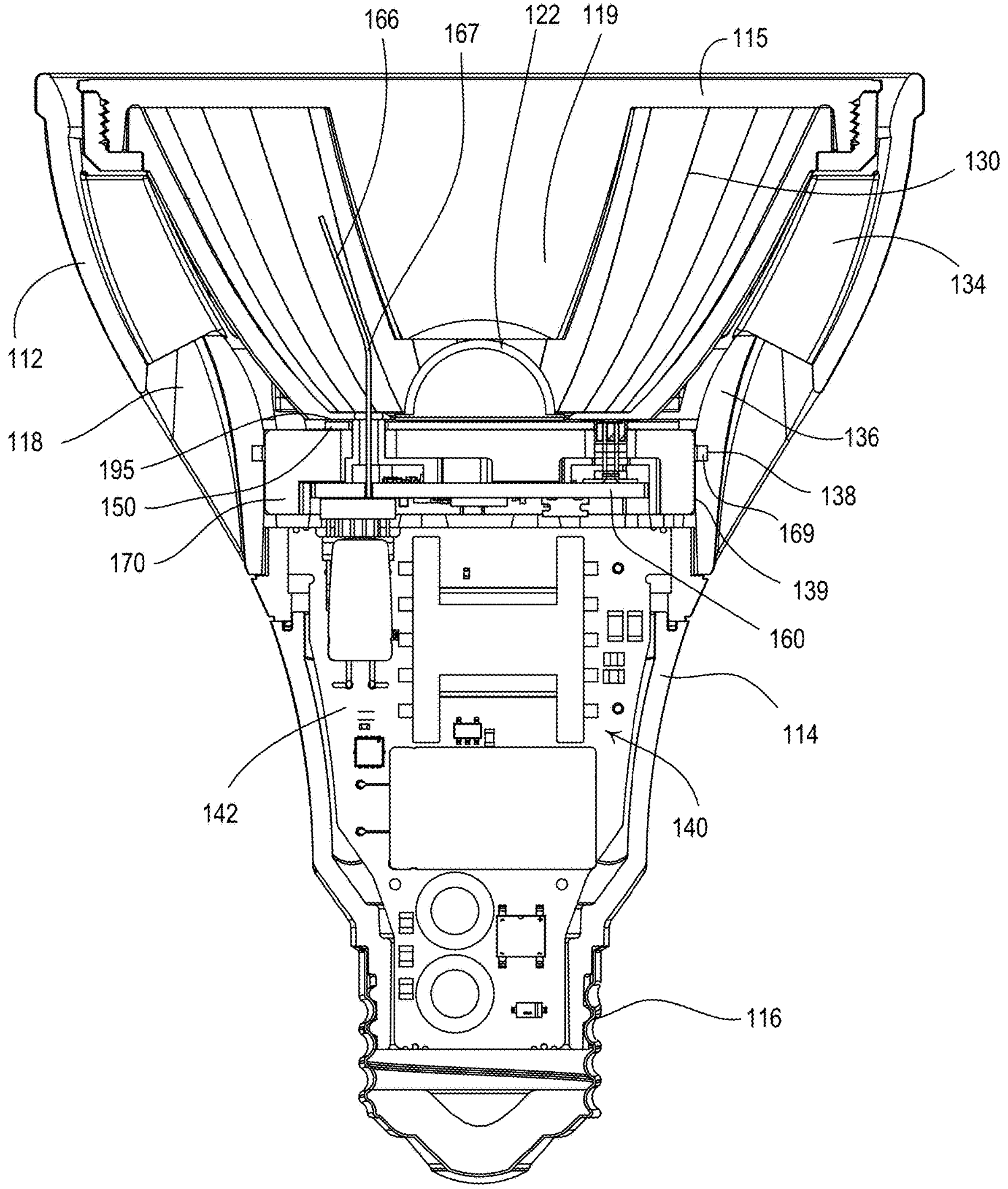
FIG. 6 is a side cross-section view of the lighting device of FIG. 1.
Figure 7:
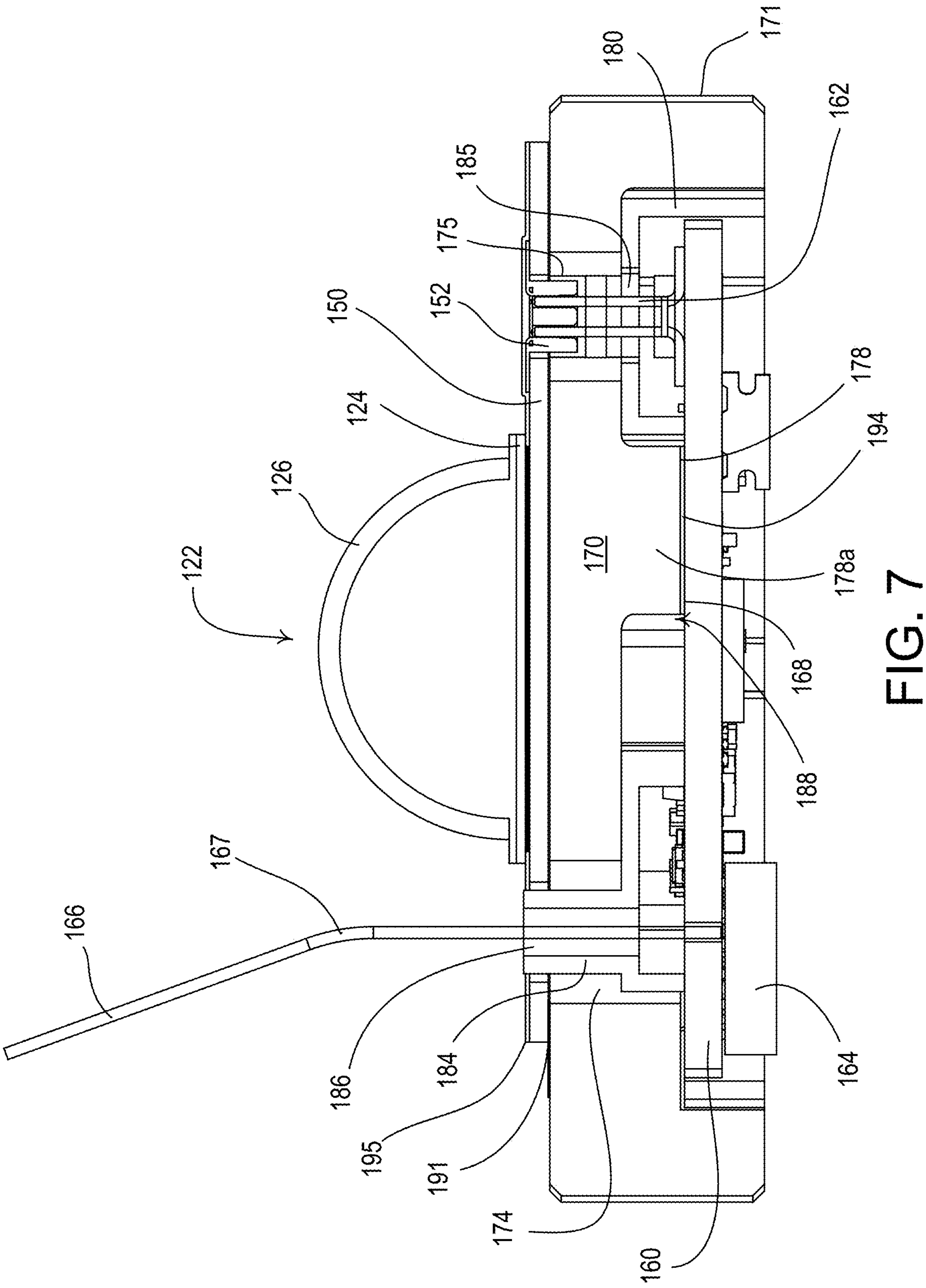
FIG. 7 is a side cross-section view of the light-generation module of FIG. 4.

The light-generation module 120 may comprise an antenna 166 electrically connected to at least one of the wireless communication circuits mounted to the control PCB 160. For example, the antenna 166 may comprise a plated wire. The antenna 166 may be electrically isolated from a control circuit on the control PCB 160. The antenna 166 may be configured to extend through the bore 186 of the extension 184 of the insulator 180 when the module heat sink 170 and the insulator 180 are captured between the carrier PCB 150 and the control PCB 160. For example, the extension 184 may electrically isolate the antenna 166 from the carrier PCB 150. FIG. 6 is a side cross-section view of the lighting device 100 taken through the center of the antenna 166 and through the connectors 152, 162 of the carrier PCB 150 and the control PCB 160, respectively. FIG. 7 is an enlarged side cross-section view of the light-generation module 120 taken through the same line as FIG. 6. The antenna 166 may also extend through an opening 158 in the carrier PCB 150 and into the emitter cavity 128 in which the emitter assembly 122 is located (e.g., as shown in FIG. 2). Since the emitter assembly 122 is mounted to the center of the carrier PCB 150, the antenna 166 may extend from the opening 158 in the carrier PCB towards a perimeter of carrier PCB. The antenna 166 may be in the path of the light that is emitted by the emitter assembly 122 and shines through the lens 115. The antenna 166 may comprise a bend 167 (e.g., a bent portion) to ensure that the antenna does not come into contact with the collector 119 of the lens 115 when the lens 115 is connected to the housing 110 (e.g., as shown in FIG. 6). Although the antenna 166 is shown with the bend 167, it should be appreciated that the antenna 166 may be straight (e.g., not comprise the bend 167). A distal portion of the antenna 166 may be configured to abut an inner surface of the lens 115. The antenna 166 may be capacitively coupled to and electrically isolated from the wireless communication circuit, for example, as described in commonly-assigned U.S. Pat. No. 9,155,172, issued Oct. 6, 2015, entitled LOAD CONTROL DEVICE HAVING AN ELECTRICALLY ISOLATED ANTENNA, the entire disclosure of which is hereby incorporated by reference.

The module heat sink 170 may operate as a counterpoise for the antenna 166. The control PCB 160 may comprise a ground plane to which the antenna 166 may be referenced. The ground plane may be located on a ground plane portion 168 (e.g., a vacant portion) of the control PCB 160, which may be vacant of any electrical components. The module heat sink 170 may be capacitively coupled to the ground plane in the ground plane portion 168 of the control PCB 160. For example, the module heat sink 170 may include an extension 178*a* that may extend towards the control PCB 160 to provide a coupling surface 178 adjacent to the control PCB. The coupling surface 178 may be configured to be capacitively coupled to the ground plane portion 168 of the control PCB 160 (e.g., when the control PCB 160 is located within the recess 182 of the insulator 180), such that the module heat sink 170 is capacitively coupled to the ground plane of the control PCB 160. The insulator 180 may include a void 188. The coupling surface 178 of the module heat sink 170 may extend through the void 188 in the insulator 180 toward the control PCB 160, such that the coupling surface 178 is located close to the ground plane in the ground plane portion 168 of the control PCB 160 (e.g., as shown in FIG. 7). An insulating material 194 (e.g., silicone or Kapton) may be located between the coupling surface 178 of the module heat sink 170 and the control PCB 160 (e.g., the ground plane portion 168 of the control PCB 160). For example, a capacitance of the capacitive coupling (e.g., the coupling surface 178) between the module heat sink 170 and the ground plane may be in the range of approximately 5 pF and 15 pF. In addition, the extension 178*a* may be shortened and/or eliminated such that the coupling surface 178 is located farther away from the ground plane portion 168 on the control PCB 160, which may decrease the capacitive coupling between the module heat sink 170 and the ground plane on the control PCB 160. When the extension 178*a* is shortened and/or eliminated, the void 188 of the insulator 180 may be eliminated (e.g., filled in with plastic between the heat sink 170 and the control PCB 160). In addition, the insulating material 194 may be eliminated. In this configuration, the wireless communication circuit on the control PCB 160 may be configured to transmit the wireless signals via the antenna 166 at a first frequency (e.g., approximately 2.4 GHz). With the extension 178*a* provided on the heat sink 170, such that the coupling surface 178 is adjacent to the ground plane portion 168 (e.g., as shown in FIG. 7), the wireless communication circuit on the control PCB 160 may be configured to transmit the wireless signals via the antenna 166 at a second frequency that is less than the first frequency (e.g., a sub-gigahertz frequency, such as approximately 900 MHz).

As shown in FIG. 4, the light-generation module 120 may further comprise a shield 195. The shield 195 may comprise a conductive top side 196 and a non-conductive bottom side 197. The shield 195 may comprise a central opening 198 (e.g., a square central opening) through which the emitter assembly 122 (e.g., the substrate 124 of the emitter assembly 122) may extend when the shield 195 is installed on the light-generation module 120. The central opening 198 may comprise notches 199 through which the screws 154 are received. The shield 195 may be located over a top surface 155 of the carrier PCB 150 in the emitter cavity 128. The shield 195 may be captured between the screws 154 and a top surface 155 of the carrier PCB 150. The shield 195 may be electrically coupled to the module heat sink 170. The screws 154 may contact the top side 196 of the shield 196 to electrically couple the top side 196 of the shield 195 to the module heat sink 170. The bottom side 197 of the shield may not be electrically conductive, such that the carrier PCB 150 is electrically isolated from (e.g., not electrically coupled to) the shield 195. The antenna 166 may extend through one of the notches 199 in the shield 195 above the opening 158 in the carrier PCB 150, such that the antenna 166 is not electrically coupled to the shield 195. The shield 195 may reduce (e.g., minimize) noise from the drive circuits on the control PCB 160 from coupling to the reflector 130 (e.g., when the shield 195 is electrically coupled to the carrier PCB 150), which may prevent the reflector 130 from reradiating noise (e.g., to the antenna 166).

As shown in FIG. 6, the light-generation module 120 may be mounted to the support portion 136 of the housing heat sink 112 of the housing 110. During installation of the light-generation module 120 into the housing heat sink 112 of the housing 110, the pins 169 of the module heat sink 170 may each be received in a respective vertical slot (not shown) in an inner surface 139 of the support portion 136. The light-generation module 120 may then be turned with respect to the housing heat sink 112, such that the pins 169 may each move through a respective horizontal groove 138 until the light-generation module 120 is locked in place in the housing heat sink 112. In addition, the light-generation module 120 may be installed in the housing heat sink 112 by pressing the module heat sink 170 to fit in the inner surface 139 of the support portion 136 (e.g., a press fit) to provide a large amount of contact surface between the sidewall 171 of the module heat sink 170 and the inner surface 139 of the support portion 136. In some embodiments, the pins 169 may be omitted.

The housing heat sink 112 may operate as an additional heat sink for the lighting device 100. The sidewall 171 of the module heat sink 170 may be thermally coupled to the inner surface 139 of the support portion 136. The module heat sink 170 may transfer heat to the housing heat sink 112 peripherally. The housing heat sink 112 may be made from a material that is cheaper, but less thermally conductive than the material of the module heat sink 170. The housing heat sink 112 may be larger in volume and may have more surface area than the module heat sink 170. When the lighting device 100 is powered and the emitter assembly 122 is generating light, heat may be conducted from the substrate 126 through the carrier PCB 150 through the module heat sink 170 (e.g., in through the front surface 177 and out through the sidewall 171) and into the housing heat sink 112. Air may enter the cavity 135 of the housing heat sink 112 via the vents 118 for cooling the housing heat sink 112 via convection cooling. Additionally or alternatively, the module heat sink 170 of the light-generation module 120 may also be connected to and/or thermally coupled to the base portion 114 of the housing 110. Stated a different way, the lighting device 100 may comprise a first heat sink (e.g., the module heat sink 170) and a second heat sink (e.g., the housing heat sink 112) that are thermally coupled to each other, where the first heat sink may be smaller in volume than the second heat sink, and the first heat sink may be made from a material that is more thermally conductive than a material of the second heat sink.

Figure 8:
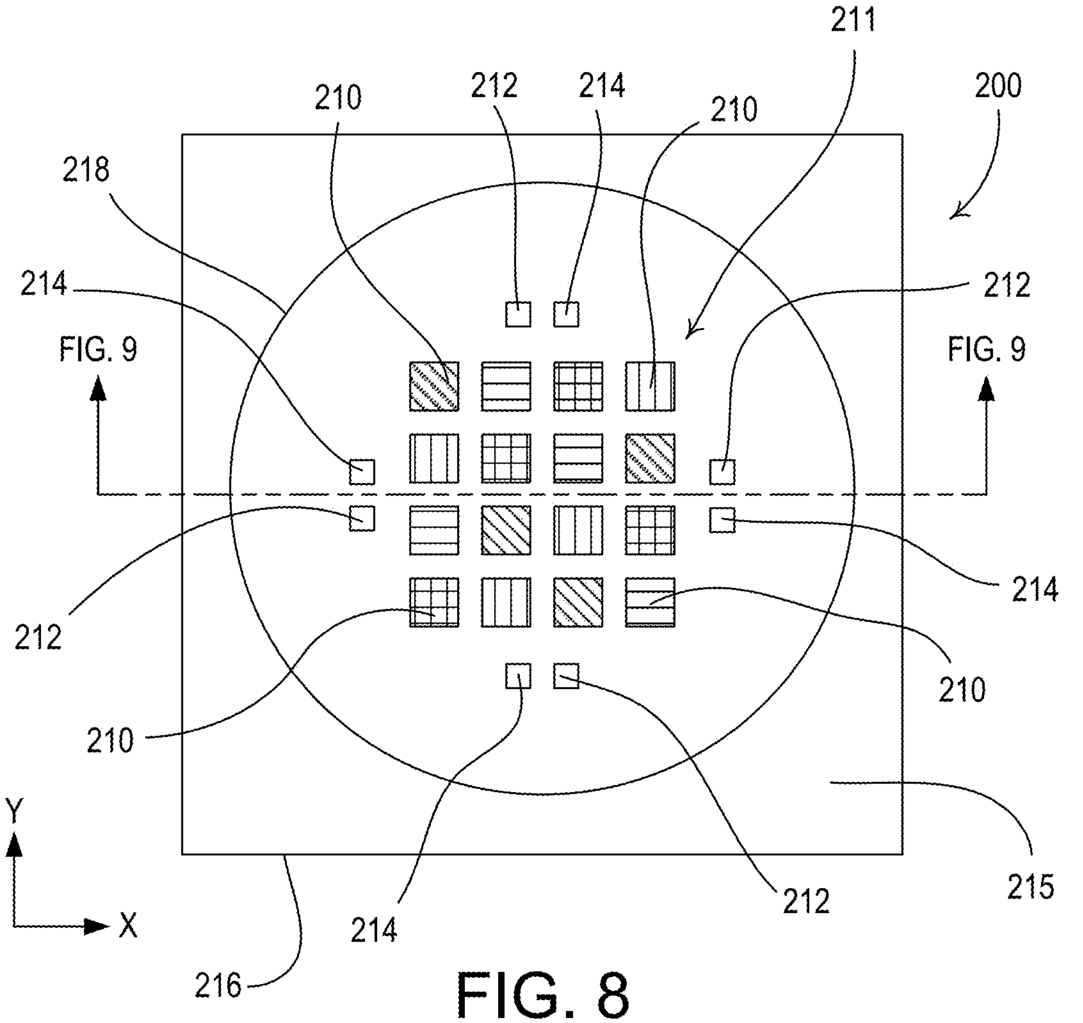
FIG. 8 is a top view of an example emitter assembly of a lighting device, such as the lighting device of FIG. 1.
Figure 9:
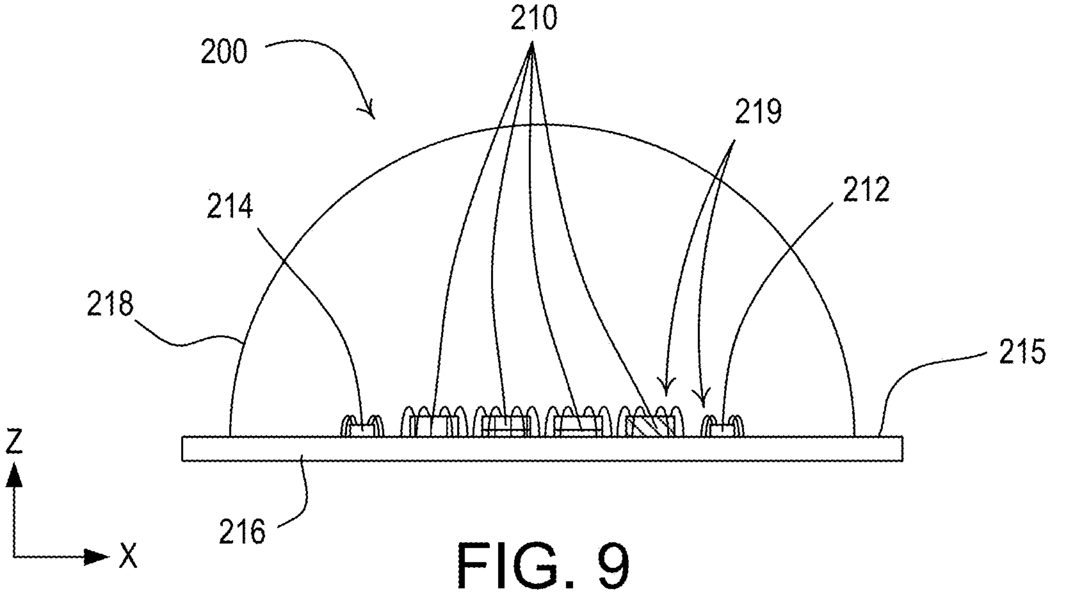
FIG. 9 is a side cross-section view of the emitter assembly of FIG. 8.

FIG. 8 is a top view of an example emitter assembly 200 of a lighting device (e.g., the emitter assembly 122 of the lighting device 100). FIG. 9 is a side cross-section view of the emitter assembly 200 taken through the center of the emitter assembly (e.g., through the line shown in FIG. 8). The emitter assembly 200 may comprise an array 211 of emitters 210 (e.g., emission LEDs). In some examples, the emitter assembly 200 may include (e.g., optionally include) one or more detectors 212, 214 (e.g., detection LEDs) located next to the array 211 of emitters 210. The emitters 210 and/or the detectors 212, 214 may be mounted on a substrate 216 (e.g., to a top surface 215 of the substrate 216), such as a ceramic substrate and/or a printed circuit board (PCB), such as a rigid PCB or a metal core PCB. For example, the substrate 216 may comprise a PCB on which drive circuitry for the emitters 210, control circuitry for the drive circuitry, and/or wireless communication circuitry is mounted. In some examples, the substrate 216 may comprise an intermediate substrate that is mounted to the PCB on which drive circuitry for the emitters 210, control circuitry for the drive circuitry, and/or wireless communication circuitry is mounted. The emitters 210 and the detectors 212, 214 mounted to the substrate 216 may be encapsulated by a dome 218. For example, the emitter assembly 200 may comprise sixteen emitters 210 and eight detectors 212, 214. The emitters 210 and detectors 212, 214 may be electrically connected to electrical traces (not shown) on the substrate 216 via a plurality of electrical wires 219 (e.g., wire bonds) as shown in FIG. 9. The size of the dome 218 (e.g., a diameter of the dome in a plane of the emitters 210) may be generally dependent on the size of the array 211 of emitters 210. The emitters 210, the detectors 212, 214, the substrate 216, and the dome 218 may form an optical system. The detectors 212, 214 may be configured to detect an amount of light emitted one or more of the emitters and reflected back by the dome 218. The emitters 210 may each be characterized by a beam angle (e.g., approximately 120 degrees). The emitters 210 may be arranged in a square array as close as possible together in the center of the dome 218, so as to approximate a centrally located point source.

The emitter assembly 200 may include multiple "chains" of emitters 210 (e.g., series-coupled emitters). The emitters 210 of each chain may be coupled in series and may conduct the same drive current. Each chain may include emitters 210 that produce illumination at the same peak emission wavelength (e.g., emit light of the same color). The emitters 210 of different chains may emit light of different colors. For example, the emitter assembly 200 may comprise four differently-colored chains of emitters 210 (e.g., red, green, blue, and white or yellow). The array 211 of emitters 210 may include a chain of four red emitters, a chain of four green emitters, a chain of four blue emitters, and a chain of four white or yellow emitters. The individual emitters 210 in each chain may be scattered about the array, and arranged so that no color appears twice in any row, column, or diagonal, to improve color mixing within the emitter assembly 200.

The detectors 212, 214 may be located in pairs close to each edge of the array 211 of emitters 210 and/or and in the middle of the array 211 of emitters 210 as shown in FIG. 8. Similar to the emitters 210, the detectors 212, 214 may be LEDs that can be used to emit or receive optical or electrical signals. When the detectors 212, 214 are coupled to receive optical signals and emit electrical signals, the detectors may produce current indicative of incident light from, for example, one of the emitters 210, a plurality of the emitters 210, or a chain of the emitters 210. The detectors 212, 214 may be any devices that produce current indicative of incident light, such as a silicon photodiode or an LED. For example, the detectors 212, 214 may each be an LED having a peak emission wavelength in the range of approximately 550 nm to 700 nm, such that the detectors may not produce photocurrent in response to infrared light (e.g., to reduce interference from ambient light). For example, the first detector 212 of each pair of detectors may comprise a small red, orange or yellow LED, which may be used to measure a luminous flux of the light emitted by the red LEDs of the emitters 210. The second detector 214 may comprise a green LED, which may be used to measure a respective luminous flux of the light emitted by each of the green and blue LEDs of the emitters 210. Both of the first and second detectors 212, 214 may be used to measure the luminous flux of the white LEDs of the emitters 210 at different wavelengths (e.g., to characterize the spectrum of the light emitted by the white LEDs). The first detector 212 may be coupled in parallel in the emitter assembly 200. Similarly, the second detector 214 may be coupled in parallel in the emitter assembly 200.

While FIG. 9 illustrates the emitter assembly 200 having sixteen emitters 210 arranged in an array, the emitter assembly 200 may have more or less emitters 210 and/or detectors 212, 214. In addition, each of the chains of emitters 210 may have a different number of emitters 210, and the emitters 210 may not be arranged in an array. Different configurations of the emitters 210 and/or the detectors 212, 214 may be used. In some examples, the emitter assembly 210 may not comprise the detectors 212, 214. Other variations of numbers of the emitters 210 per chain, the colors of the emitters 210, the numbers of the colors of the emitters 210, the number of chains of the emitters 210, etc., may be used. In addition, patterns other than a square array may be used. Other variations are possible.

Figure 10:
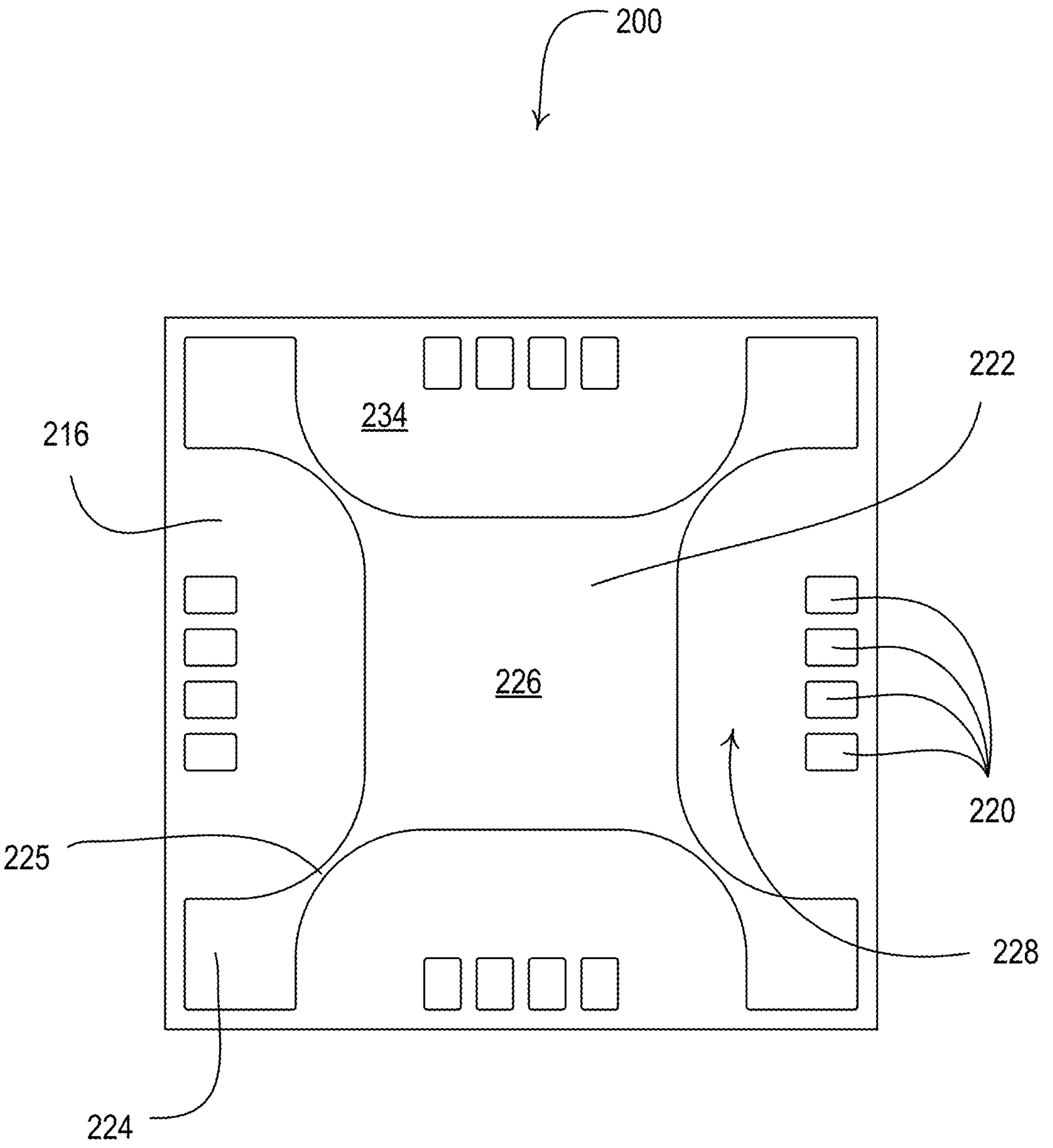
FIG. 10 is a bottom view of the emitter assembly of FIG. 8.

FIG. 10 is a bottom view of the emitter assembly 200 when the substrate 216 of the emitter assembly 200 is an intermediate substrate mounted to a separate printed circuit board (e.g., such as the carrier PCB 150). The emitter assembly 200 may comprise multiple sets of electrical pads 220 around a perimeter of the substrate 216. For example, the emitter assembly 200 may comprise four sets of four electrical pads 220 with each set of electrical pads located near the center of each side of the substrate 216 as shown in FIG. 10. The electrical pads 220 may be connected to the series-connected emitters 210 and the parallel-connected detectors 212, 214 on the top surface 215 of the substrate 216. The electrical pads 220 may be electrically connected (e.g., soldered) to corresponding electrical pads on the separate printed circuit board to provide electrical connection between one or more drive circuits and the emitters 210 and between the detectors 212, 214 and a receiver circuit. One set of the electrical pads 220 may not be connected to the emitters 210 and/or detectors 212, 214, and may simply be soldered to the corresponding pads on the separate printed circuit board to provide support for the substrate 216. For example, the electrical pads 220 that are not connected to the emitters 210 and/or detectors 212, 214 may be located along the side of the emitter assembly 200 that may be located near a mounting screw of the separate printed circuit board (e.g., such as a side 129 located close to one of the openings 156 in the carrier PCB 150 that receives one of the screws 154 as shown in FIG. 4) since those electrical pads may be stressed when the mounting screw is tightened during assembly of the lighting device.

The emitter assembly 200 may also comprise a heat sink pad 222. The heat sink pad 222 may comprise four corner pads 224 (e.g., distal portions) that are connected to a central pad 226 (e.g., a central portion) via respective arms 225 (e.g., when the substrate 216 of the emitter assembly 200 is an intermediate substrate mounted to the separate printed circuit board). The corner pads 224 may be located in the corners of the substrate 216. The heat sink pad 222 may be connected (e.g., soldered to) a corresponding pad on the separate printed circuit board (e.g., the carrier PCB 150), which may be electrically connected to a ground plane of the separate printed circuit board (e.g., which may be coupled to an output circuit common connection of the rectifier circuit of the power converter circuit 140). Since the emitters 210 and the detectors 212, 214 may be electrically isolated from the ground plane of the separate printed circuit board, the heat sink pad 222 may be spaced apart from the electrical pads 220 by keep-out regions 228. The heat sink pad 222 may operate to conduct heat from the emitters 210 and the substrate 216 to the separate printed circuit board and a heat sink (e.g., the module heat sink 170). In addition, the heat sink pad 222 may operate to reduce stress on the solder connections between the electrical pads 220 and the corresponding electrical pads on the separate printed circuit board during installation of the separate printed circuit board (e.g., the carrier PCB 150) to the heat sink. Alternatively, the arms 225 of the heat sink pad 222 may be omitted, such that the corner pads 224 simply comprise square-shaped pads that are not connected to the central pad 226.

The dome 218 of the emitter assembly 210 may be manufactured during, for example, a single manufacturing process (e.g., an injection molding process). For example, the dome 218 may be formed on the substrate 216 around the emitters 210, the detectors 212, 214, and the electrical wires 219 after the emitters 210 and the detectors 212, 214 have been mounted to the substrate 216 and the electrical wires 219 have been electrically connected to the emitters 210, the detectors 212, 214, and the electrical traces on the substrate 216. The substrate 216 with the emitters 210, the detectors 212, 214, and the electrical wires 219 may be positioned within a mold (e.g., an injection mold) that may define the shape (e.g., the hemispherical shape) of the dome 218. A material (e.g., a thermoset material, such as optical liquid silicone rubber) may be injected into a cavity of the mold and then cured to harden the material around and covering of the emitters 210, the detectors 212, 214, and the electrical wires 219 (e.g., as shown in FIG. 9). Due to the amount of material that may be required to form the dome, the pressures required to move the material to fill out the desired geometry and eliminate entrapped air, and/or the temperatures required to cure the material, the injection molding process may possibly damage the emitters 210, the detectors 212, 214, the substrate 216, and/or the electrical wires 219.

As described herein, an emitter assembly for a lighting device may comprise an optical element (e.g., a dome) having a two-part body (e.g., a two-part structure) having a first body portion (e.g., a first dome portion) that encapsulates one or more components of the emitter assembly (e.g., the emitters 210, the detectors 212, 214, and/or the electrical wires 219) and a second body portion (e.g., a second dome portion) that is applied to the first body portion. The two-part body of the dome may provide less stress on the structure of the emitter assembly (e.g., on the emitters 210, the detectors 212, 214, the substrate 216, and/or the electrical wires 219) and thus lead to less damage to the structure of the emitter assembly during creation of the optical element. The dome 218 (e.g., the first dome portion and/or the second dome portion) is not limited to any particular shape. The dome 218 may have any of a variety of different shapes, such as a hemispherical shape, a rectangular shape, a square shape, or a non-uniform shape. Further, in some examples, the first dome portion may have a different shape than the second dome portion. As noted above, the dome 218 may encapsulate, or form a dome over, one or more components of the light-generation module, such as the emitters 210 and the detectors 212, 214.

Figure 11:
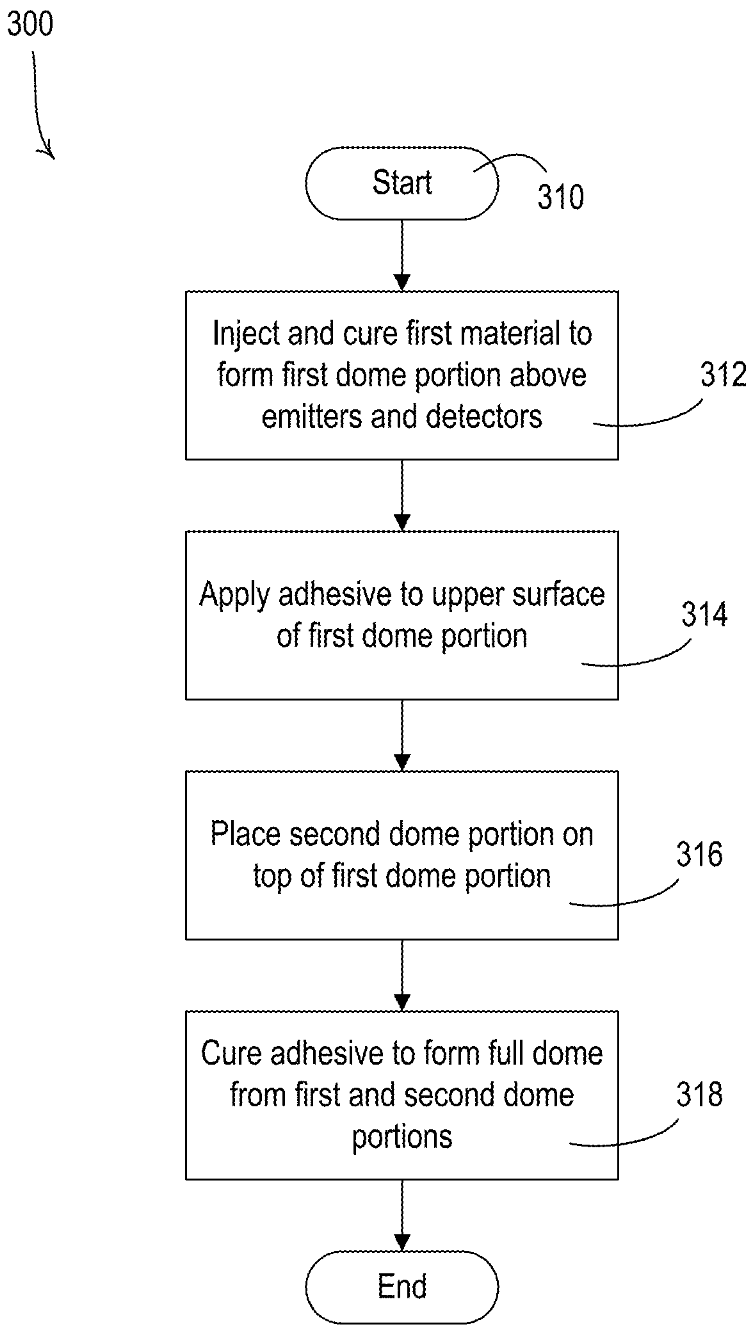
FIG. 11 is a flowchart of an example procedure for building an emitter assembly, such as the emitter assembly of FIG. 9.
Figure 12A:
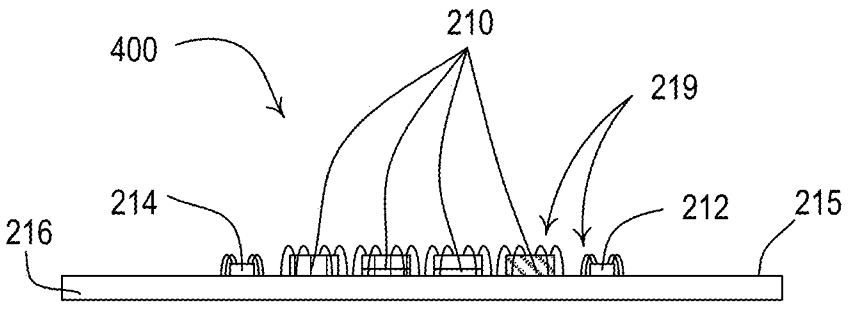
FIGS. 12A-12F are side cross-section views of the emitter assembly (e.g., taken through the center of the emitter assembly) during different steps of the procedure of FIG. 11.
Figure 12B:
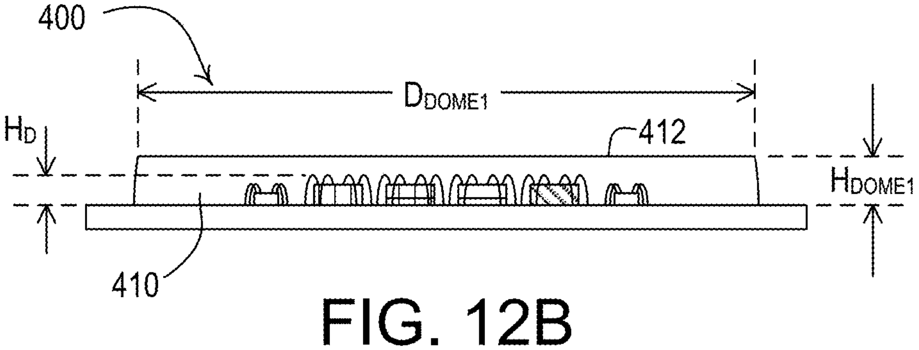

FIG. 11 is a flowchart of an example procedure 300 for building an emitter assembly 400, e.g., such as the emitter assembly 200 shown in FIGS. 8-10. FIGS. 12A-12F illustrate the emitter assembly 400 at different steps during the procedure 300 for the emitter assembly 400. FIGS. 12A-12E are side cross-section views of the emitter assembly 400 taken through the center of the emitter assembly 400 (e.g., similar to the cross-section view of FIG. 9). FIG. 12F is a top view of the emitter assembly 400 fully assembled. For example, the emitter assembly 400 may comprise the emitters 210, the detectors 212, 214, the substrate 216, the dome 218, and the electrical wires 219, which may be arranged and configured to operate as shown and described above with reference to FIGS. 8-10. The procedure 300 may be performed to assemble the dome 218 of the emitter assembly 400 onto the substrate 216. The procedure 300 may begin at 310 with the emitter assembly 400 having the emitters 210 and the detectors 212, 214 mounted to the substrate 216 and the electrical wires 219 electrically connected to the emitters 210, the detectors 212, 214, and the electrical traces on the substrate 216 (e.g., as shown in FIG. 12A).

At 312 of the procedure 300, a first dome portion 410 (e.g., a first body portion) of the dome 218 may be formed around and covering the emitters 210, the detectors 212, 214, and the electrical wires 219 (e.g., through an injection molding process). For example, the substrate 216 may be positioned within a mold (e.g., an injection mold), a first material (e.g., a thermoset material, such as optical liquid silicone rubber) may be injected into a cavity of the mold, and then the first material may be cured to harden the first material around and covering of the emitters 210, the detectors 212, 214, and the electrical wires 219 (e.g., as shown in FIG. 12B). The injection molding process for forming the first dome portion 410 may require less of the first material than when forming the dome 216 (e.g., the entire dome portion), which may result in less complications during the injection molding process. The first dome portion 410 may be fully cured or partially cured (e.g., 70% cured) during the injection molding process. The first dome portion 410 may be optically transmissive (e.g., transparent and/or translucent). The first dome portion 410 may define an interface surface 412 that may be substantially parallel to and extend above the top surface 215 of the substrate 216. The interface surface 412 of the first dome portion 410 may have a smooth or textured finish. The interface surface 412 may have a circular perimeter (e.g., as shown in FIG. 12F) that has a diameter $D_{DOME1}$ for surrounding the emitters 210 and the detectors 212, 214. The emitters 210 and the detectors 212, 214 may be encapsulated in the first dome portion 410. For example, the first dome portion 410 may have a height $H_{DOME1}$ that is greater than a height $H_D$ of the devices and wires mounted to the substrate 216 (e.g., the emitters 210 and the detectors 212, 214 and the electrical wires 219), such that the first dome portion 410 fully surrounds and covers (e.g., encapsulates) the emitters 210, the detectors 212, 214 and the electrical wires 219. The first dome portion 410 may appear as, for example, a disk having the height $H_{DOME1}$ at 312 of the procedure 300. The first dome portion 410 may be affixed to the substrate 216 during the injection molding process.

Figure 12C:
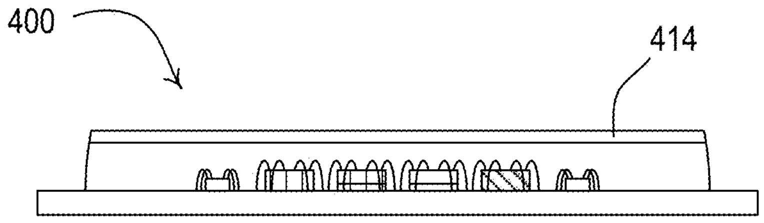
Figure 12D:
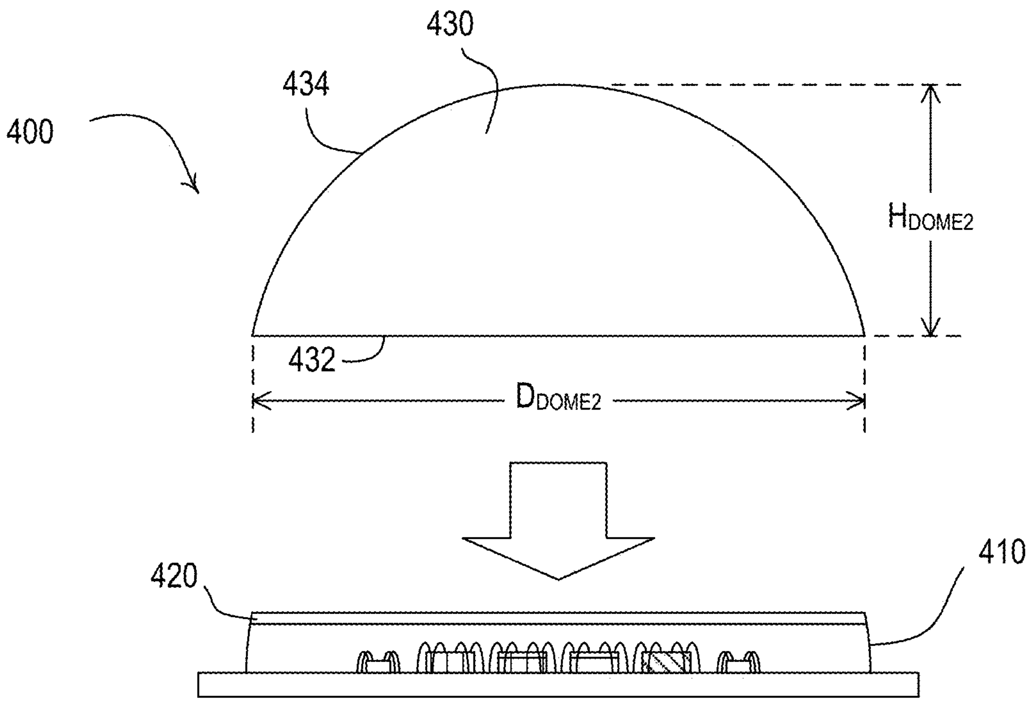

At 314 of the procedure 300, a bonding material 420 (e.g., such as an adhesive) may be applied to the interface surface 412 of the first dome portion 410 (e.g., as shown in FIG. 12C). For example, the bonding material 420 may be an optical bonding silicone. At 316 of the procedure 300, a second dome portion 430 (e.g., a second body portion) may be placed onto the first dome portion 410, e.g., onto the bonding material 430 on the interface surface 412 of the first dome portion 410 (e.g., as shown in FIG. 12D). For example, the second dome portion 430 may be made during a separate manufacturing process (e.g., a separate injection molding process) than the first dome portion 410. The second dome portion 430 may be fully cured or partially cured (e.g., 70% cured) during the injection molding process. The second dome portion 430 may be optically transmissive (e.g., transparent and/or translucent). The second dome portion 430 may be made from a second material, which may be a clear material or a diffusive material. For example, the second material may be the same as the first material (e.g., a thermoset material, such as formed from an optical liquid silicone rubber). In some examples, the second material of the second dome portion 430 may be different from the first material (e.g., the second material of the second dome portion 430 may be glass, while the first material of the first dome portion 410 may be an optical liquid silicone rubber). The second dome portion 430 may have a shape (e.g., contour) that defines an outer surface 434 and operates to direct light from the emitters 210 in a desired and/or optimal direction (e.g., towards a lens of a lighting fixture in which the emitter assembly 400 is installed) and to reduce an amount of light that is reflected back into the dome 218. For example, the second dome portion 430 may have a hemispherical shape and the outer surface 434 that may have a smooth or textured finish.

The second dome portion 430 may define an interface surface 432 that may have a smooth or textured finish. The interface surface 412 of the first dome portion 410 and the interface surface 432 of the second dome portion 430 may have shapes (e.g., contours) that match each other. For example, the interface surface 412 of the first dome portion 410 and the interface surface 432 of the second dome portion 430 may both be substantially flat. In some examples, the interface surface 412 of the first dome portion 410 may have one or more features that are keyed with one or more corresponding features of the interface surface 432 of the second dome portion 430. The interface surface 432 of the second dome portion 430 may have a circular perimeter (e.g., as shown in FIG. 12F) and may have a diameter $D_{DOME2}$ that is substantially the same as the diameter $D_{DOME1}$ of the interface surface 412 of the first dome portion 410. For example, the perimeter of the interface surface 432 of the second dome portion 430 may be aligned with the perimeter of the interface surface 412 of the first dome portion 410. In some examples, the diameter $D_{DOME2}$ of the interface surface 432 of the second dome portion 430 may be smaller than the diameter $D_{DOME1}$ of the interface surface 412 of the first dome portion 410. The emitters 210 and the detectors 212, 214 may be located within the perimeters of the interface surface 412 of the first dome portion 410 and the interface surface 432 of the second dome portion 430. When the second dome portion 430 is placed onto the first dome portion 410, the bonding material 420 may be captured between the interface surface 412 of the first dome portion 410 and the interface surface 432 of the second dome portion 430.

Figure 12E:
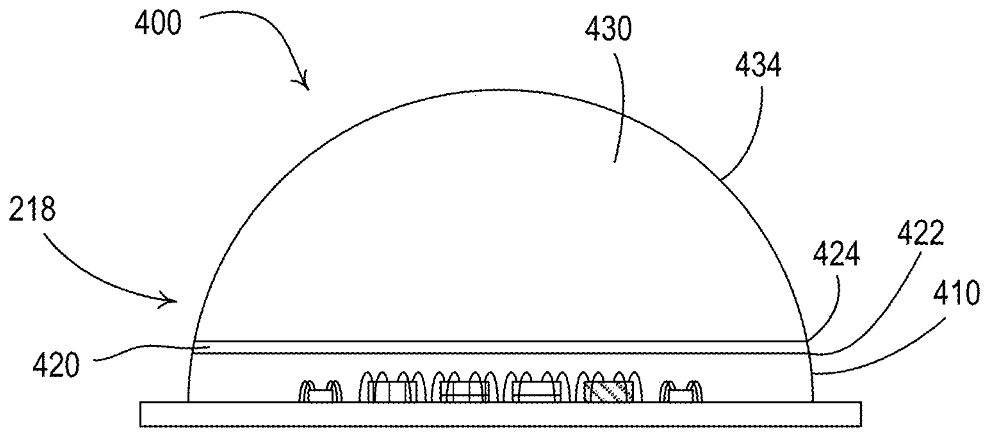
Figure 12F:
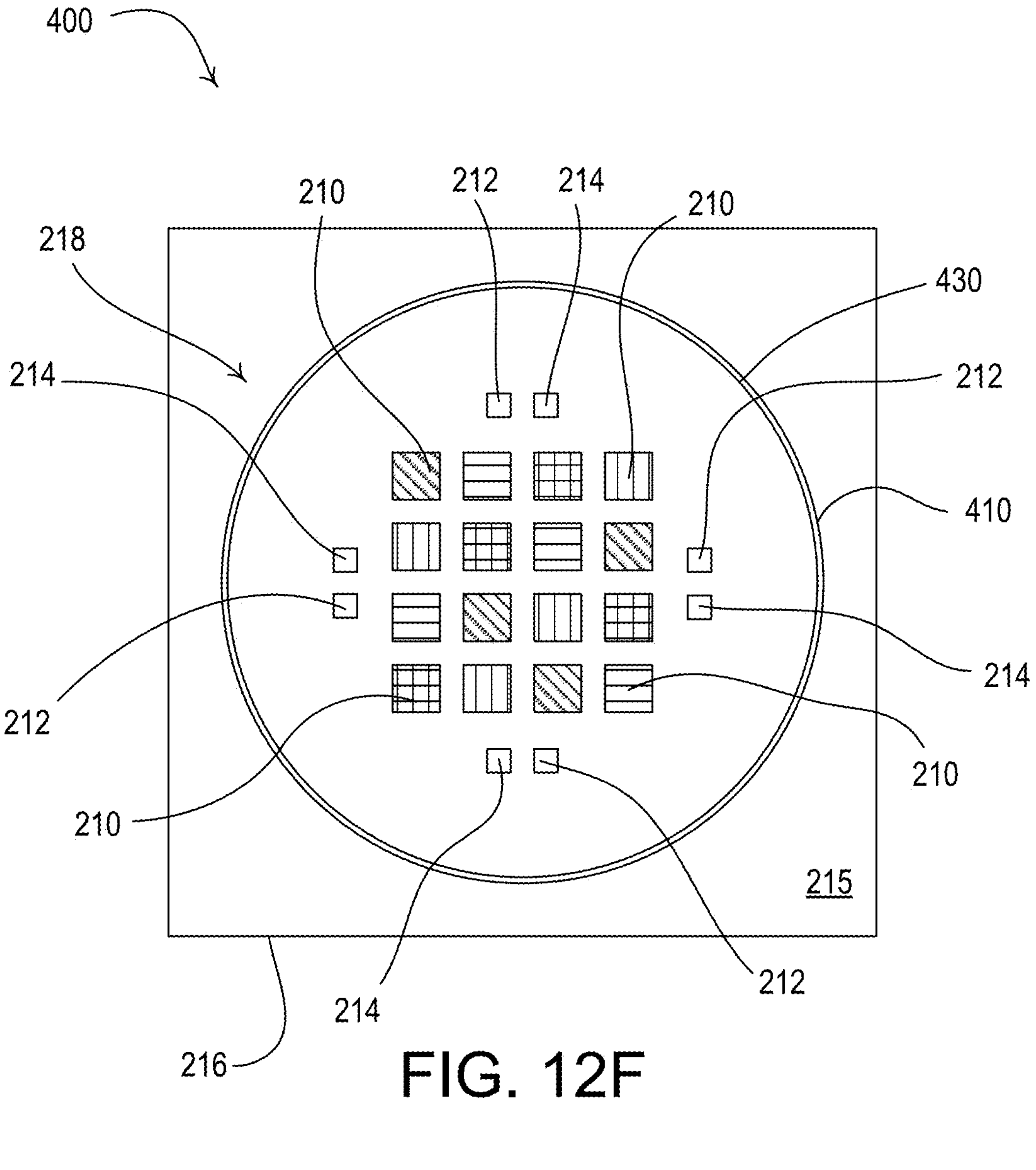

At 318 of the procedure 300, the bonding material 430 may be cured to create (e.g., form) the dome 218 (e.g., the full dome) from the first dome portion 410 and the second dome portion 430 (e.g., as shown in FIG. 12E), and the procedure 300 may end. After the curing process at 318, the second dome portion 430 may be located above the first dome portion 410, such that the first dome portion 410 is located between the second dome portion 430 and the substrate 218. For example, the first dome portion 410, the bonding material 420, and the second dome portion 430 may be made of the same or similar materials, such that light from the emitters 210 may be transmitted through the dome 218 (e.g., as if the dome 218 was fabricated from a single material during a single step manufacturing process). While the first dome portion 410 and the second dome portion 430 may be fabricated as independent parts, the first dome portion 410, the bonding material 420, and the second dome portion 430 may be made of sufficiently similar material and may be brought into contact at appropriate stages of a curing process, such that cross-linking of molecules across the part boundaries may occur at a first intersection 422 (e.g., a first interface) between the first dome portion 410 and the bonding material 420 and at a second intersection 424 (e.g., a second interface) between the second dome portion 430 and the bonding material 420. For example, partial curing of the first dome portion 410 and/or the second dome portion 430 during the separate injection molding processes may allow for stronger cross-linking at the first and second intersections 422, 424. At the end of the procedure 300, the first dome portion 410 and the second dome portion 430 may be, for example, fully cured.

Figure 13:
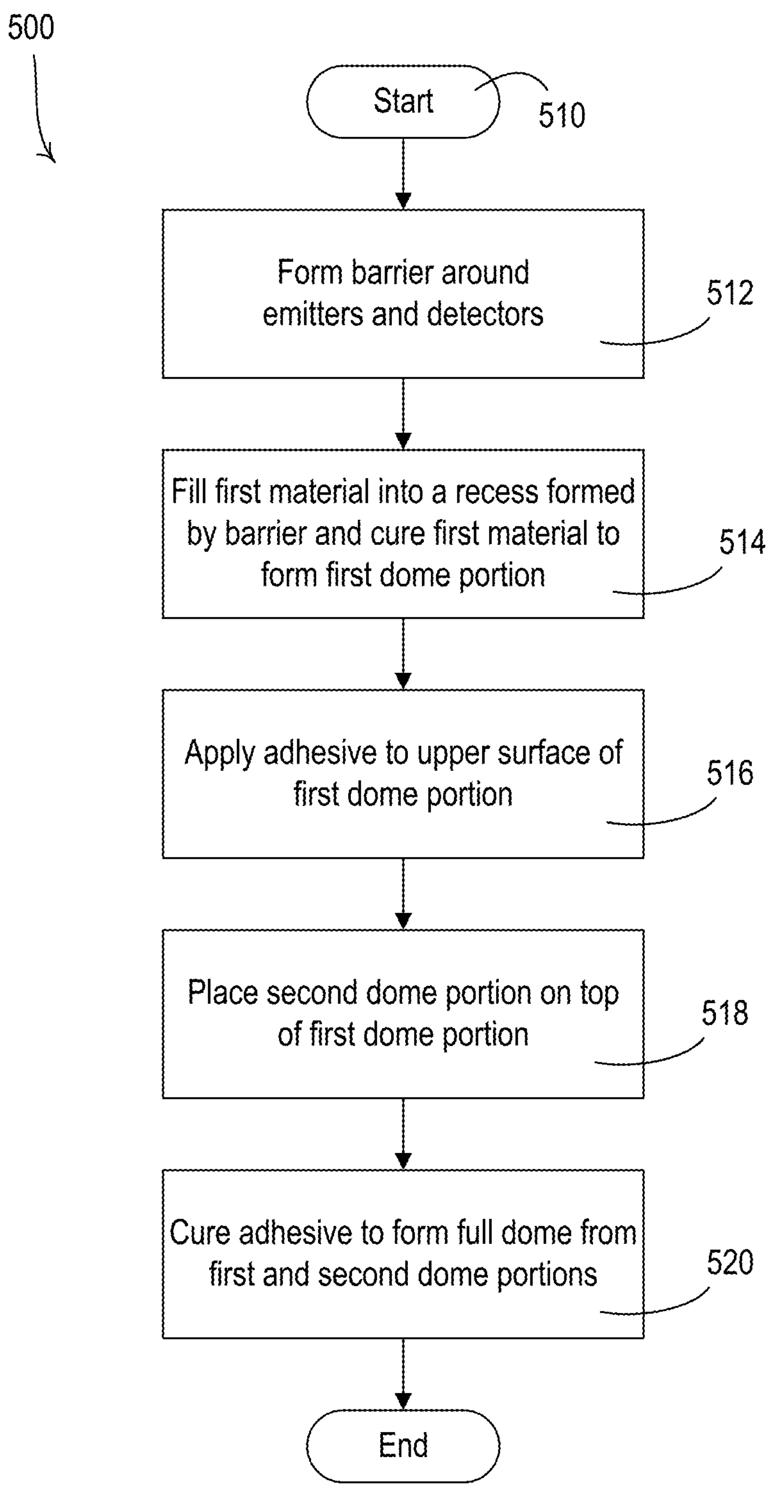
FIG. 13 is a flowchart of another example procedure for building an emitter assembly, such as the emitter assembly of FIG. 9.
Figure 14A:
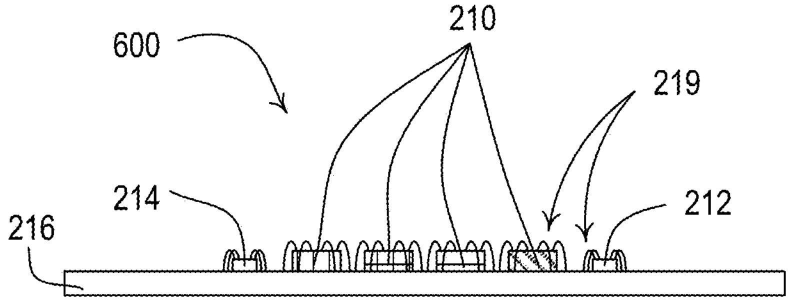
FIGS. 14A-14F are side cross-section views of the emitter assembly (e.g., taken through the center of the emitter assembly) during different steps of the procedure of FIG. 13.

FIG. 13 is a flowchart of an example procedure 500 for building an emitter assembly 600, e.g., such as the emitter assembly 200 shown in FIGS. 8-10. FIGS. 14A-14G illustrate the emitter assembly 600 at different steps during the procedure 500 for the emitter assembly 600. FIGS. 14A-14F are side cross-section views of the emitter assembly 600 taken through the center of the emitter assembly 600 (e.g., similar to the cross-section view of FIG. 9). FIG. 14G is a top view of the emitter assembly 600 fully assembled. For example, the emitter assembly 600 may comprise the emitters 210, the detectors 212, 214, the substrate 216, the dome 218, and the electrical wires 219, which may be arranged and configured to operate as shown and described above with reference to FIGS. 8-10. The procedure 500 may be performed to assemble the dome 218 of the emitter assembly 600 onto the substrate 216. The procedure 500 may begin at 510 with the emitter assembly 600 having the emitters 210 and the detectors 212, 214 mounted to the substrate 216 and the electrical wires 219 electrically connected to the emitters 210, the detectors 212, 214, and the electrical traces on the substrate 216 (e.g., as shown in FIG. 14A).

Figure 14B:
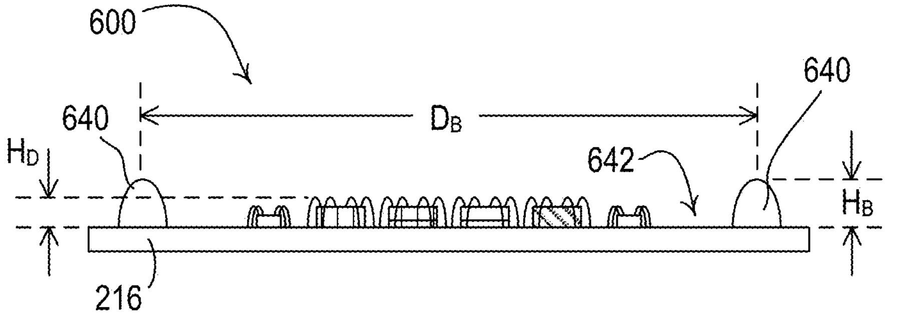

At 512 of the procedure 500, a barrier 640 (e.g., a dam) may be formed on the substrate 216 around the emitters 210 and the detectors 212, 214 (e.g., as shown in FIG. 14B). For example, the barrier 640 may be formed from a high viscosity, quick setting epoxy. The barrier 640 may be formed around one or more parts that are mounted to the substrate 216, such as the emitters 210 and the detectors 212, 214 as shown in FIG. 14G. The barrier 640 may be formed in a shape, such as an ellipse (e.g., a circle or an oval) or a polygon (e.g., a square, a rectangle, or a complex polygon shape), that surrounds the emitters 210 and the detectors 212, 214. For example, the barrier 640 may be formed in the shape of a circle as shown in FIG. 14G. The barrier 640 may have a height $H_B$ that is greater than a height $H_D$ of the devices and wires mounted to the substrate 216 (e.g., the emitters 210 and the detectors 212, 214 and the electrical wires 219). The barrier 640 may form a recess 642 (e.g., a volume) between the barrier 640 and the substrate 216. When the barrier 640 is formed in a circle (e.g., as shown in FIG. 14G), the barrier 640 may be characterized by a diameter $D_B$ (e.g., a diameter of a centerline and/or a peak of the barrier 640). For example, the barrier 640 may have an arc-shaped (e.g., hill-shaped) cross-section (e.g., as shown in FIGS. 14B-14F), although other variations are possible.

Figure 14C:
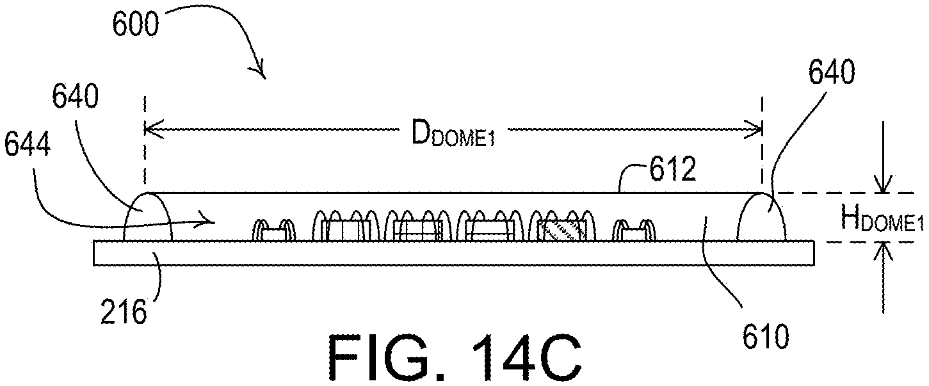

At 514 of the procedure 500, a first material 644 may be deposited (e.g., filled or poured) into the recess 642 formed by the barrier 640 and the substrate 216 and cured to form a first dome portion 610 (e.g., a first body portion) of the dome 218 around and covering and over top of the emitters 210, the detectors 212, 214, and the electrical wires 219 (e.g., as shown in FIG. 14C). The first material 644 may comprise, for example, a thermoset material, such as formed from an optical liquid silicone rubber. Prior to the curing process at 514 of the procedure 500, the first material 644 may comprise a liquid material. The first dome portion 610 may be fully cured or partially cured (e.g., 70% cured) during the curing process. After the curing process, the first dome portion 610 may comprise a cured form of the liquid material (e.g., the first material 644) that is deposited in the recess 642 defined by the barrier 640. The first dome portion 610 may be optically transmissive (e.g., transparent and/or translucent). The first dome portion 610 may define an interface surface 612 that may be substantially parallel to and extend above the top surface 215 of the substrate 216. The interface surface 412 of the first dome portion 410 that may have a smooth or textured finish. The interface surface 612 may have a circular perimeter (e.g., as shown in FIG. 14G) with a diameter $D_{DOME1}$, which may be approximately the same as the diameter $D_B$ of the barrier 640. The emitters 210 and the detectors 212, 214 may be encapsulated in the first dome portion 610. For example, the first dome portion 610 may have a height $H_{DOME1}$ that is large enough such that the first dome portion 610 fully surrounds and covers (e.g., encapsulates) the emitters 210, the detectors 212, 214 and the electrical wires 219. The height $H_{DOME1}$ of the first dome portion 610 may be, for example, approximately equal to the height $H_B$ of the barrier 640 (e.g., as shown in FIG. 14C). In some examples, the height $H_{DOME1}$ of the first dome portion 610 may be less than the height $H_B$ of the barrier 640. The first dome portion 610 may be affixed to the substrate 216 during the curing process at 514 of the procedure 500.

Figure 14D:
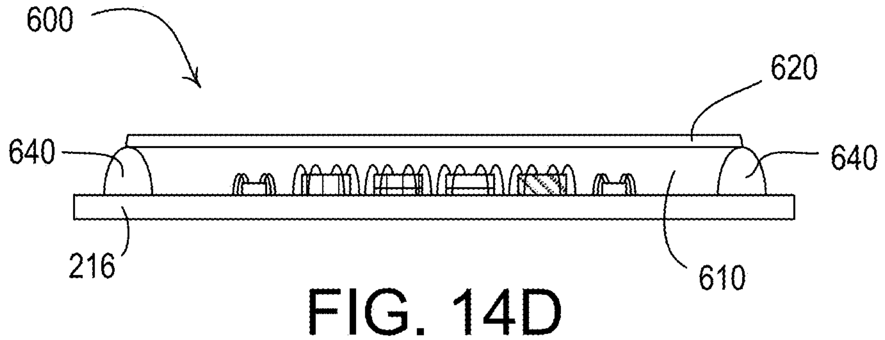
Figure 14E:
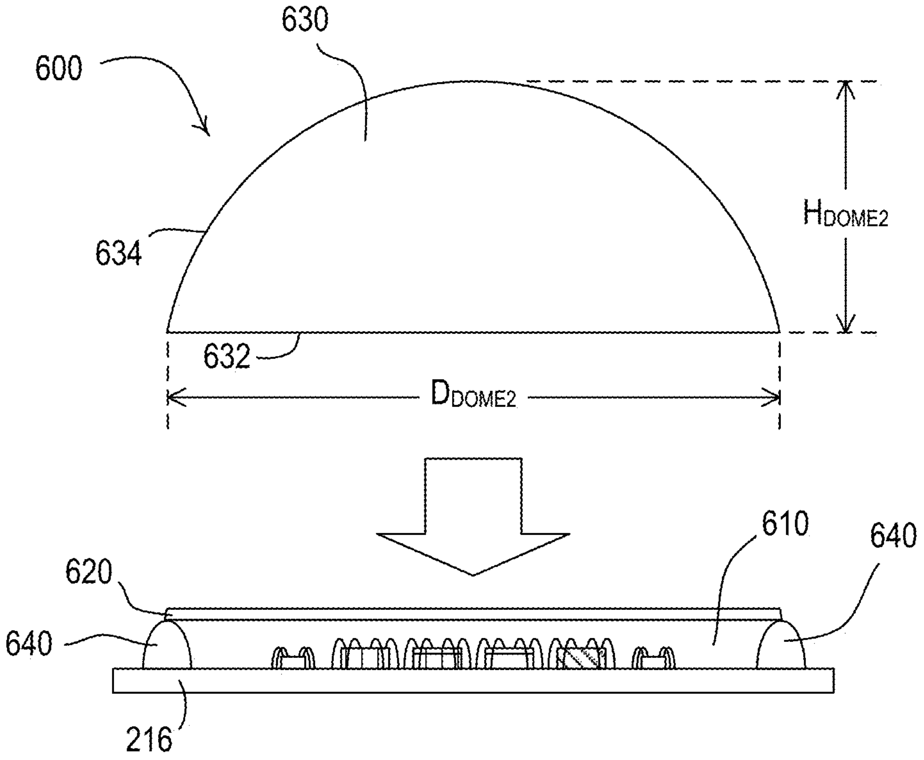

At 516 of the procedure 500, a bonding material 620 (e.g., such as an adhesive) may be applied to the interface surface 612 of the first dome portion 610 (e.g., as shown in FIG. 14D). For example, the bonding material may be an optical bonding silicone. At 516 of the procedure 500, a second dome portion 630 (e.g., a second body portion) may be placed onto the first dome portion 610, e.g., onto the bonding material 630 on the interface surface 612 of the first dome portion 610 (e.g., as shown in FIG. 14E). For example, the second dome portion 630 may be made during a manufacturing process (e.g., an injection molding process) that is separate from the process for making the first dome portion 610 (e.g., the curing process at 514). The second dome portion 630 may be fully cured or partially cured (e.g., 70% cured) during the injection molding process. The second dome portion 630 may be optically transmissive (e.g., transparent and/or translucent). The second dome portion 630 may be made from a second material, which may be a clear material or a diffusive material. For example, the second material of the second dome portion 630 may be the same as the first material 644 of the first dome portion 610 (e.g., a translucent thermoset material, such as formed from an optical liquid silicone rubber). In some examples, the second material of the second dome portion 630 may be different from the first material 644 (e.g., the second material of the second dome portion 630 may be glass, while the first material 644 of the first dome portion 610 may be an optical liquid silicone rubber). The second dome portion 630 may have a shape (e.g., contour) that defines an outer surface 634 and operates to direct light from the emitters 210 in a desired and/or optimal direction (e.g., towards a lens of a lighting fixture in which the emitter assembly 600 is installed) and to reduce an amount of light that is reflected back into the dome 218. For example, the second dome portion 630 may have a hemispherical shape and the outer surface 634 that may have a smooth or textured finish.

The second dome portion 630 may have an interface surface 632 that may have a smooth or textured finish. The interface surface 612 of the first dome portion 610 and the interface surface 432 of the second dome portion 630 may have shapes (e.g., contours) that match each other (e.g., mate with each other). For example, the interface surface 612 of the first dome portion 610 and the interface surface 632 of the second dome portion 630 may both be substantially flat. In some examples, the interface surface 612 of the first dome portion 610 may have a concave shape (e.g., may form a meniscus), and the interface surface 432 of the second dome portion 430 have a convex shape that matches the curvature of the interface surface 612 of the first dome portion 610. The interface surface 632 of the second dome portion 630 may have a circular perimeter (e.g., as shown in FIG. 12F) and may have a diameter $D_{DOME2}$ that is substantially the same as the diameter $D_{DOME1}$ of the interface surface 612 of the first dome portion 610. For example, the perimeter of the interface surface 632 of the second dome portion 630 may be aligned with the perimeter of the interface surface 612 of the first dome portion 610. In some examples, the diameter $D_{DOME2}$ of the interface surface 632 of the second dome portion 630 may be smaller than the diameter $D_{DOME1}$ of the interface surface 612 of the first dome portion 610. The emitters 210 and the detectors 212, 214 may be located within the perimeters of the interface surface 612 of the first dome portion 610 and the interface surface 632 of the second dome portion 630. When the second dome portion 630 is placed onto the first dome portion 610, the bonding material 620 may be captured between the interface surface 612 of the first dome portion 610 and the interface surface 632 of the second dome portion 630.

Figure 14F:
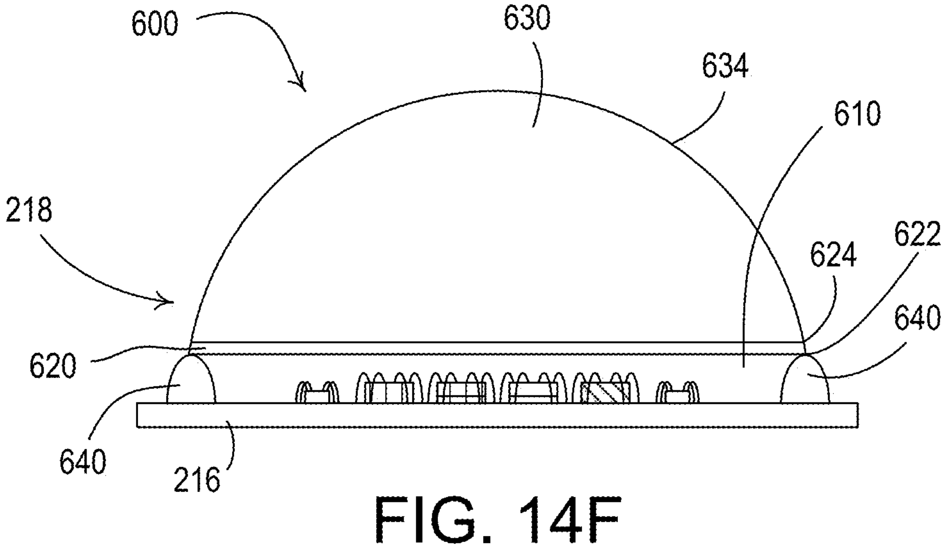
Figure 14G:
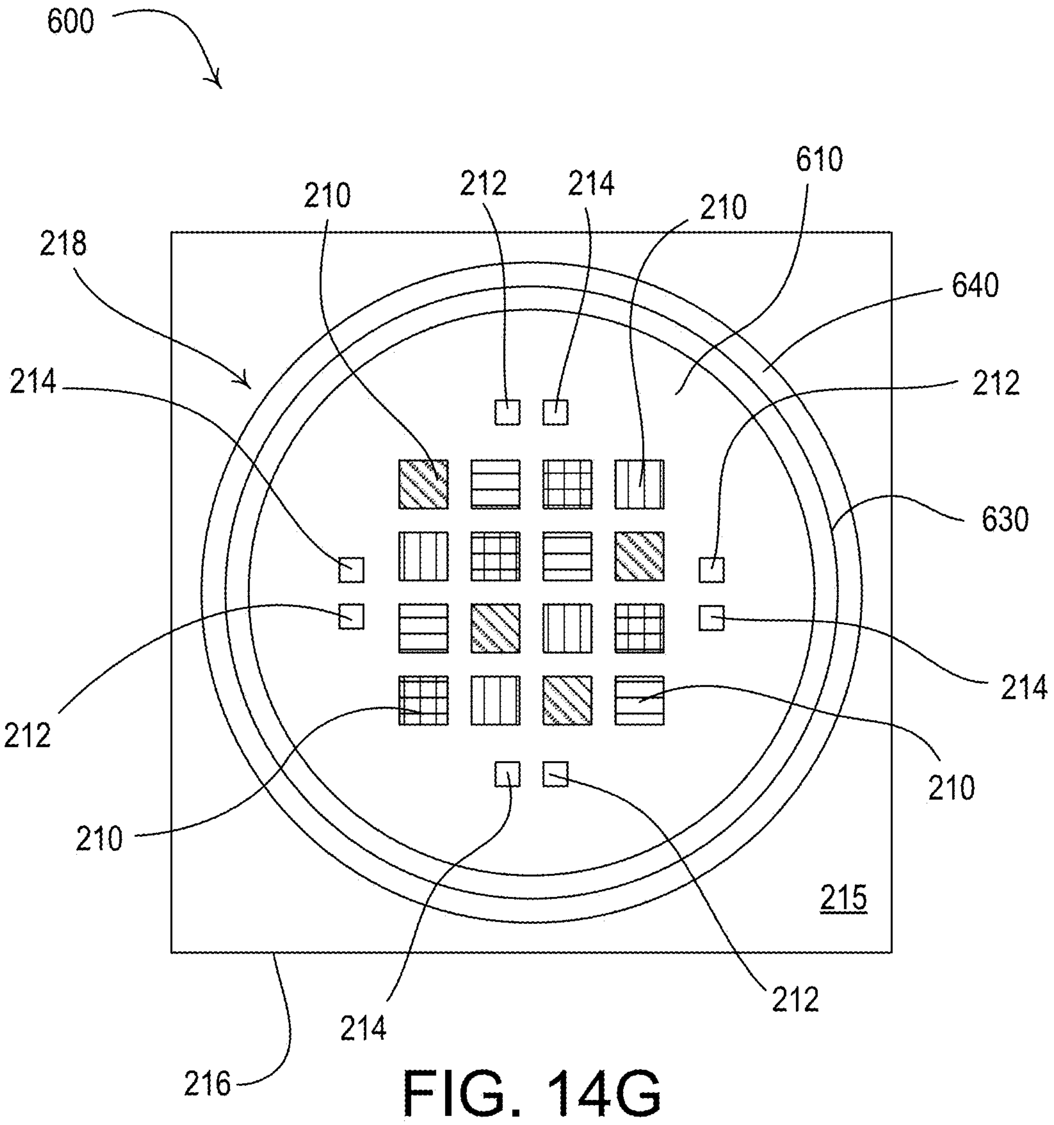
FIG. 14G is a top view of the emitter assembly after being built during the procedure of FIG. 13.

At 518 of the procedure 500, the bonding material 630 may be cured to form the dome 218 (e.g., the full dome) from the first dome portion 610 and the second dome portion 630 (e.g., as shown in FIGS. 14F and 14G), and the procedure 500 may end. After the curing process at 518, the second dome portion 630 may be located above the first dome portion 610, such that the first dome portion 610 is located between the second dome portion 630 and the substrate 218. For example, the first dome portion 610, the bonding material 620, and the second dome portion 630 may be made of materials of substantially similar optical properties, such that light from the emitters 210 may be transmitted through the dome 218 (e.g., as if the dome 218 were fabricated from a single material during a single step manufacturing process). While the first dome portion 610 and the second dome portion 630 may be fabricated as independent parts, the first dome portion 610, the bonding material 620, and the second dome portion 630 may be made of sufficiently similar material and may be brought into contact at appropriate stages of a curing process, such that cross-linking of molecules across the part boundaries may occur at a first intersection 622 (e.g., a first interface) between the first dome portion 610 and the bonding material 620 and at a second intersection 624 (e.g., a second interface) between the second dome portion 630 and the bonding material 620. For example, partial curing of the first dome portion 610 and/or the second dome portion 630 during the separate injection molding processes may allow for stronger cross-linking at the first and second intersections 622, 624. At the end of the procedure 500, the first dome portion 610 and the second dome portion 630 may be, for example, fully cured.

Figure 15:
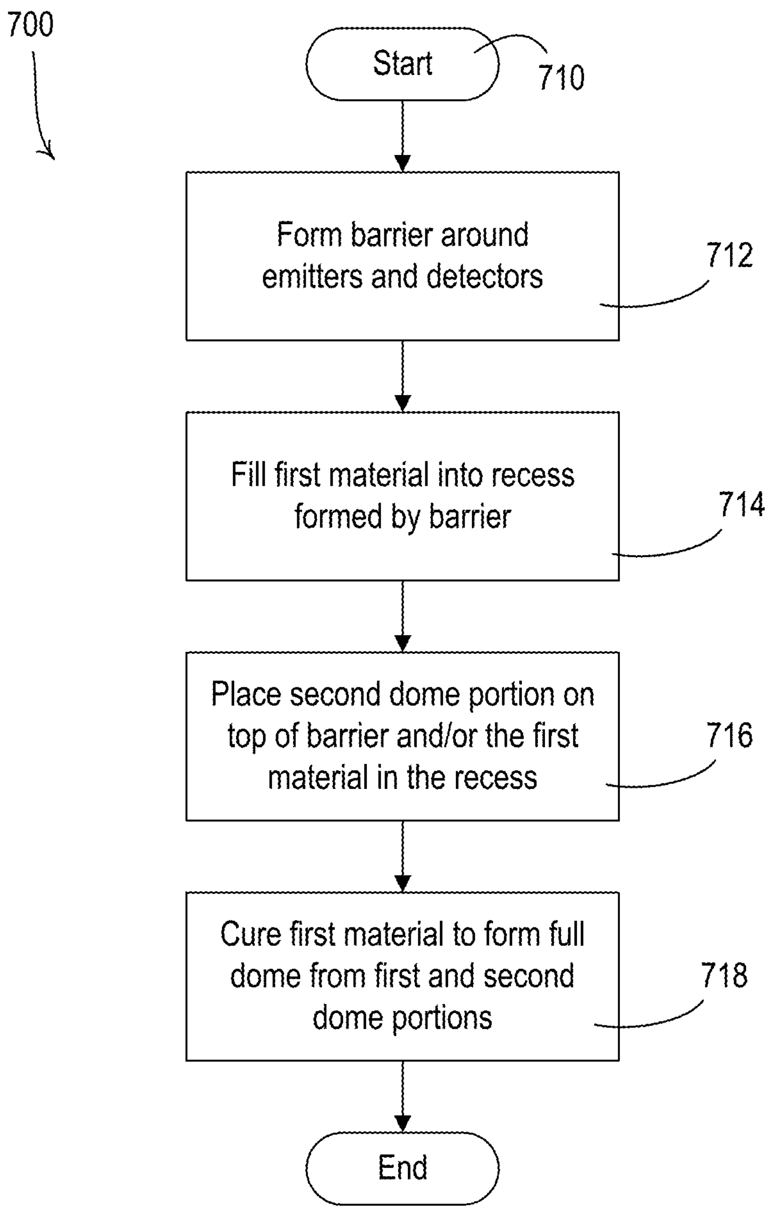
FIG. 15 is a flowchart of another example procedure for building an emitter assembly, such as the emitter assembly of FIG. 9.
Figure 16A:
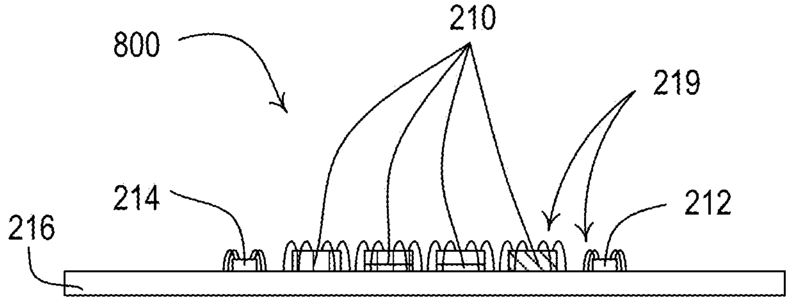
FIGS. 16A-16E are side cross-section views of the emitter assembly (e.g., taken through the center of the emitter assembly) during different steps of the procedure of FIG. 15.

FIG. 15 is a flowchart of an example procedure 700 for building an emitter assembly 800, e.g., such as the emitter assembly 200 shown in FIGS. 8-10. FIGS. 16A-16E illustrate the emitter assembly 800 at different steps during the procedure 700 for the emitter assembly 800. FIGS. 16A-16E are side cross-section views of the emitter assembly 800 taken through the center of the emitter assembly 800 (e.g., similar to the cross-section view of FIG. 9). FIG. 16F is a top view of the emitter assembly 800 fully assembled. For example, the emitter assembly 800 may comprise the emitters 210, the detectors 212, 214, the substrate 216, the dome 218, and the electrical wires 219, which may be arranged and configured to operate as shown and described above with reference to FIGS. 8-10. The procedure 700 may be performed to install the dome 218 of the emitter assembly 800 onto the substrate 216. The procedure 700 may begin at 710 with the emitter assembly 800 having the emitters 210 and the detectors 212, 214 mounted to the substrate 216 and the electrical wires 219 electrically connected to the emitters 210, the detectors 212, 214, and the electrical traces on the substrate 216 (e.g., as shown in FIG. 16A).

Figure 16B:
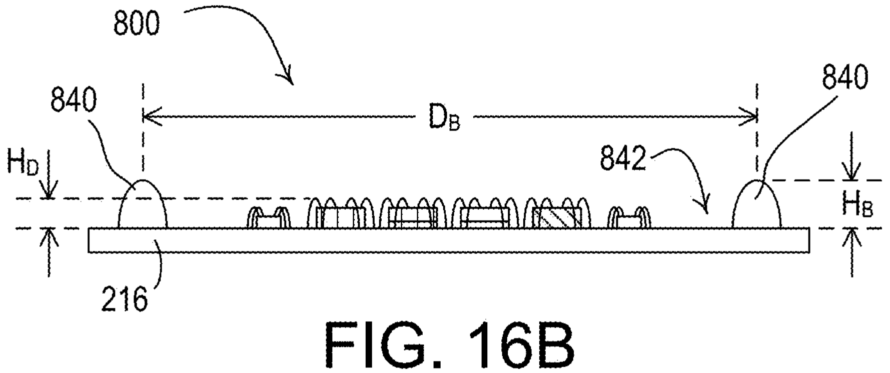

At 712 of the procedure 700, a barrier 840 (e.g., a dam) may be formed on the substrate 216 around the emitters 210 and the detectors 212, 214 (e.g., as shown in FIG. 16B). For example, the barrier 840 may be formed from a high viscosity, quick setting epoxy. The barrier 840 may be formed around one or more parts that are mounted to the substrate 216, such as the emitters 210 and the detectors 212, 214 as shown in FIG. 16F. The barrier 840 may be formed in a shape, such as an ellipse (e.g., a circle or an oval) or a polygon (e.g., a square, a rectangle, or a complex polygon shape), that surrounds the emitters 210 and the detectors 212, 214. For example, the barrier 840 may be formed in the shape of a circle as shown in FIG. 16F. The barrier 840 may have a height $H_B$ that is greater than a height $H_D$ of the devices and wires mounted to the substrate 216 (e.g., the emitters 210 and the detectors 212, 214 and the electrical wires 219). The barrier 840 may form a recess 842 (e.g., an open volume) between the barrier 840 and the substrate 216. When the 840 is formed in a circle (e.g., as shown in FIG. 16F), the barrier 840 may be characterized by a diameter $D_B$ (e.g., a diameter of a centerline and/or a peak of the barrier 840). For example, the barrier 840 may have an arc-shaped (e.g., hill-shaped) cross-section (e.g., as shown in FIGS. 16B-16E), although other variations are possible.

Figure 16C:
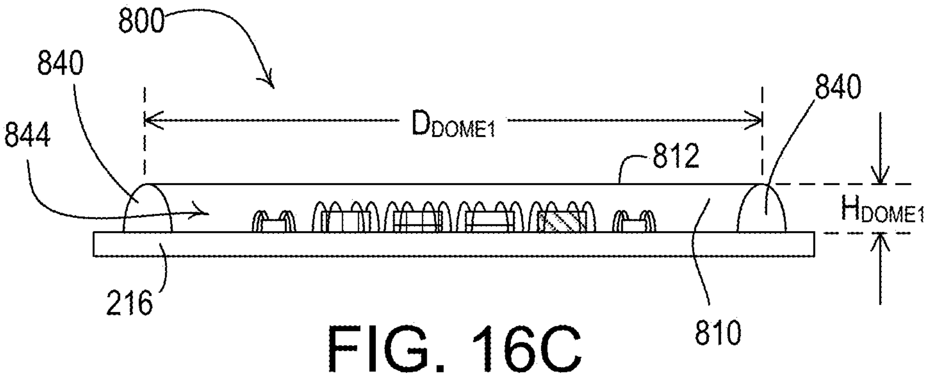

At 714 of the procedure 700, a first material 844 may be deposited (e.g., filled or poured) into the recess 842 formed by the barrier 840 and the substrate 216 (e.g., as shown in FIG. 16C). The first material 844 in the recess 842 may be configured to form a first dome portion 810 (e.g., a first body portion) (e.g., after curing the first material 844 at 718 of the procedure 700 as described in greater detail below). For example, the first material 844 may comprise a thermoset material, such as formed from an optical liquid silicone rubber. The first material 844 may be filled to a level such that the first material 844 fully surrounds the emitters 210, the detectors 212, 214 and the electrical wires 219 (e.g., such that the first dome portion 810 may have a height $H_{DOME1}$ that is large enough that the first dome portion 810 fully surrounds and covers (e.g., encapsulates) the emitters 210, the detectors 212, 214 and the electrical wires 219). In some examples, the first material 844 may be filled up to approximately the height $H_B$ of the barrier 840 (e.g., such that the height $H_{DOME1}$ of the first dome portion 810 may be approximately equal to the height $H_B$ of the barrier 840, and a diameter $D_{DOME1}$ of the first dome portion 810 may be approximately the equal to the diameter $D_B$ of the barrier 840).

Figure 16D:
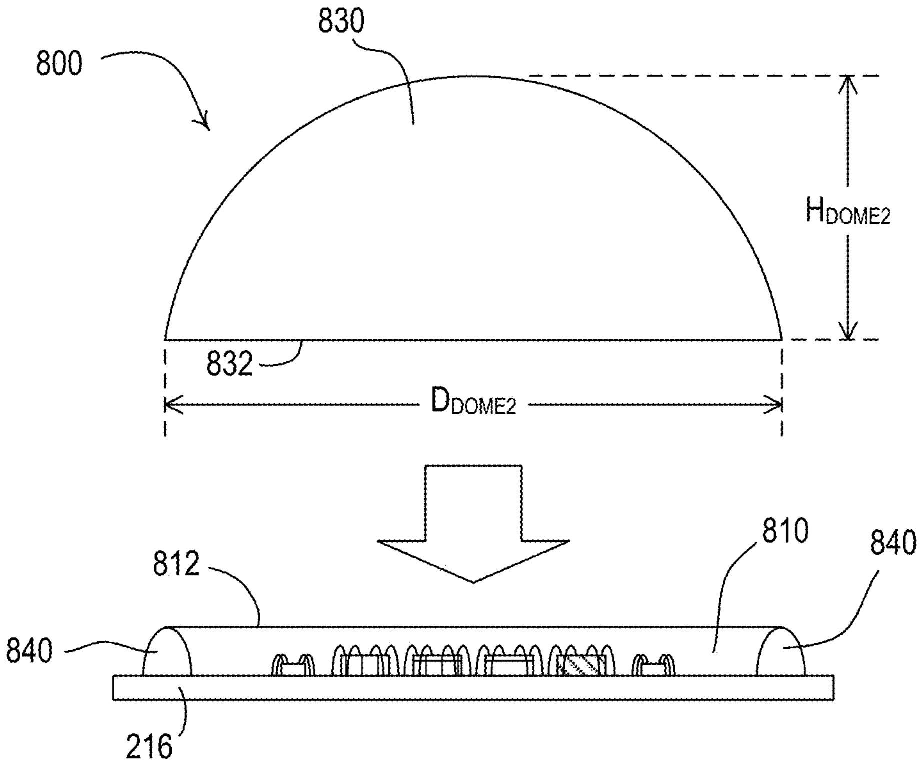

At 716 of the procedure 700, a second dome portion 830 (e.g., a second body portion) may be placed onto the barrier 840 and/or the first material 844 within the recess 842 (e.g., as shown in FIG. 16D). For example, the second dome portion 830 may be made during a manufacturing process (e.g., an injection molding process) that is separate from the process for making the first dome portion 810 (e.g., the curing process at 718 of the procedure 700 as will be described in greater detail below). The second dome portion 830 may be fully cured or partially cured (e.g., 70% cured) during the injection molding process. The second dome portion 830 may be optically transmissive (e.g., transparent and/or translucent). The second dome portion 830 may be made from a second material, which may be a clear material or a diffusive material. For example, the second material of the second dome portion 830 may be the same as the first material 844 of the first dome portion 810 (e.g., a translucent thermoset material, such as formed from an optical liquid silicone rubber). In some examples, the second material of the second dome portion 830 may be different from the first material 844 (e.g., the second material of the second dome portion 830 may be glass, while the first material 844 of the first dome portion 810 may be an optical liquid silicone rubber). The second dome portion 830 may have a shape (e.g., contour) that defines an outer surface 834 and operates to direct light from the emitters 210 in a desired and/or optimal direction (e.g., towards a lens of a lighting fixture in which the emitter assembly 800 is installed) and to reduce an amount of light that is reflected back into the dome 218. For example, the second dome portion 830 may have a hemispherical shape and the outer surface 834 that may have a smooth or textured finish.

The second dome portion 830 may define an interface surface 832 that may have a smooth or textured finish. For example, the interface surface 832 of the second dome portion 830 may both be substantially flat. The interface surface 832 of the second dome portion 830 may have a circular perimeter (e.g., as shown in FIG. 12F) and may have a diameter $D_{DOME2}$ that is substantially the same as diameter $D_B$ of the barrier 840 (e.g., substantially the same as the diameter $D_{DOME1}$ of the first dome portion 810). For example, the perimeter of the interface surface 832 of the second dome portion 830 may be aligned with the barrier 840 (e.g., aligned with the centerline of the barrier 840 and/or falling within an area defined by a width of the barrier 840). In some examples, the diameter $D_{DOME2}$ of the interface surface 832 of the second dome portion 830 may be smaller than the diameter $D_B$ of the barrier 840. The emitters 210 and the detectors 212, 214 may be located within the perimeters of the interface surface 812 of the first dome portion 810 and the interface surface 832 the second dome portion 830.

Figure 16E:
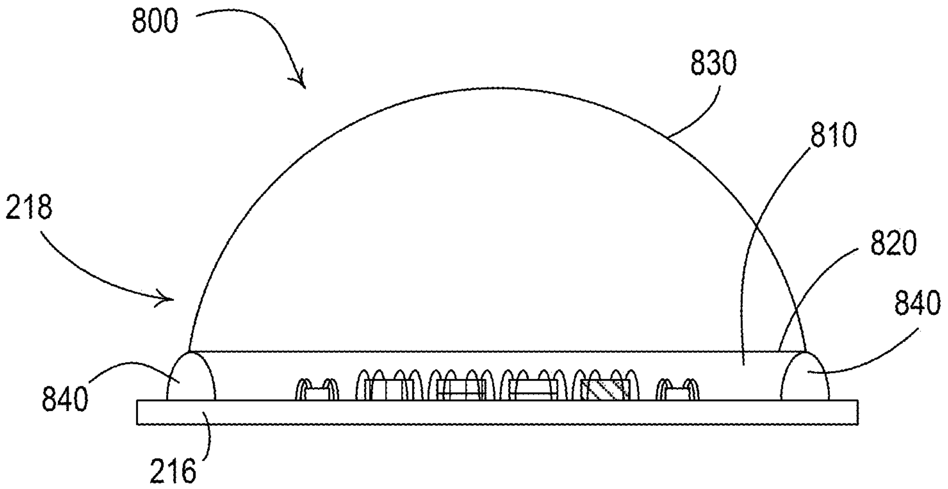
Figure 16F:
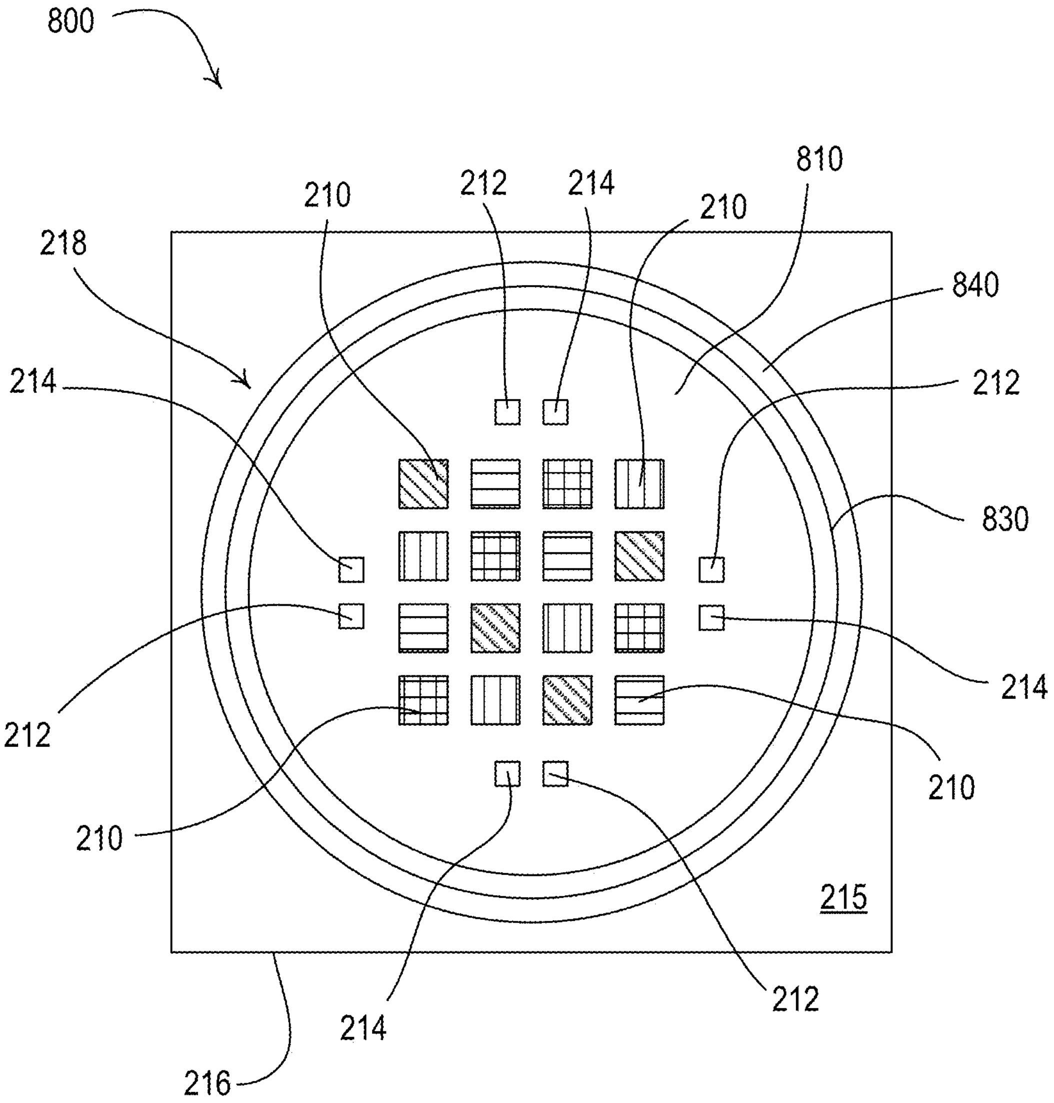
FIG. 16F is a top view of the emitter assembly after being built during the procedure of FIG. 15.

At 718 of the procedure 700, the first material 844 may be cured to form the dome 218 (e.g., the full dome) from the first dome portion 810 and the second dome portion 830 (e.g., as shown in FIG. 16E). Prior to the curing process at 718, the first material 844 may comprise a liquid material. For example, the interface surface 832 of the second dome portion 830 may bond with the first material 844 of the first dome portion 810 during the curing process. After the curing process, the first dome portion 810 may comprise a cured form of the liquid material (e.g., the first material 844) that is deposited in the recess 842 defined by the barrier 840. When the dome 218 is fully formed, the second dome portion 830 may be located above the first dome portion 810, such that the first dome portion 810 is located between the second dome portion 830 and the substrate 218. The emitters 210 and the detectors 212, 214 may be encapsulated in the first dome portion 810 after the curing process. The first dome portion 810 may be affixed to the substrate 216 and the second dome portion 830 may be affixed to the first dome portion 810 during the curing process.

For example, the first dome portion 810 and the second dome portion 830 may be made of the same or similar materials, such that light from the emitters 210 may be transmitted through the dome 218 (e.g., as if the dome 218 were fabricated from a single material during a single step manufacturing process). While the first dome portion 810 and the second dome portion 830 may be fabricated as independent parts, the first dome portion 810 and the second dome portion 830 may be made of sufficiently similar material and may be brought into contact at appropriate stages of a curing process, such that cross-linking of molecules across the part boundaries may occur at an intersection 820 (e.g., an interface) between the first dome portion 810 and the second dome portion 830. For example, partial curing of the second dome portion 830 during the injection molding process may allow for stronger cross-linking at the intersection 820 between the first dome portion 810 and the second dome portion 830. At the end of the procedure 700, the first dome portion 810 and the second dome portion 830 may be, for example, fully cured.

Figure 17:
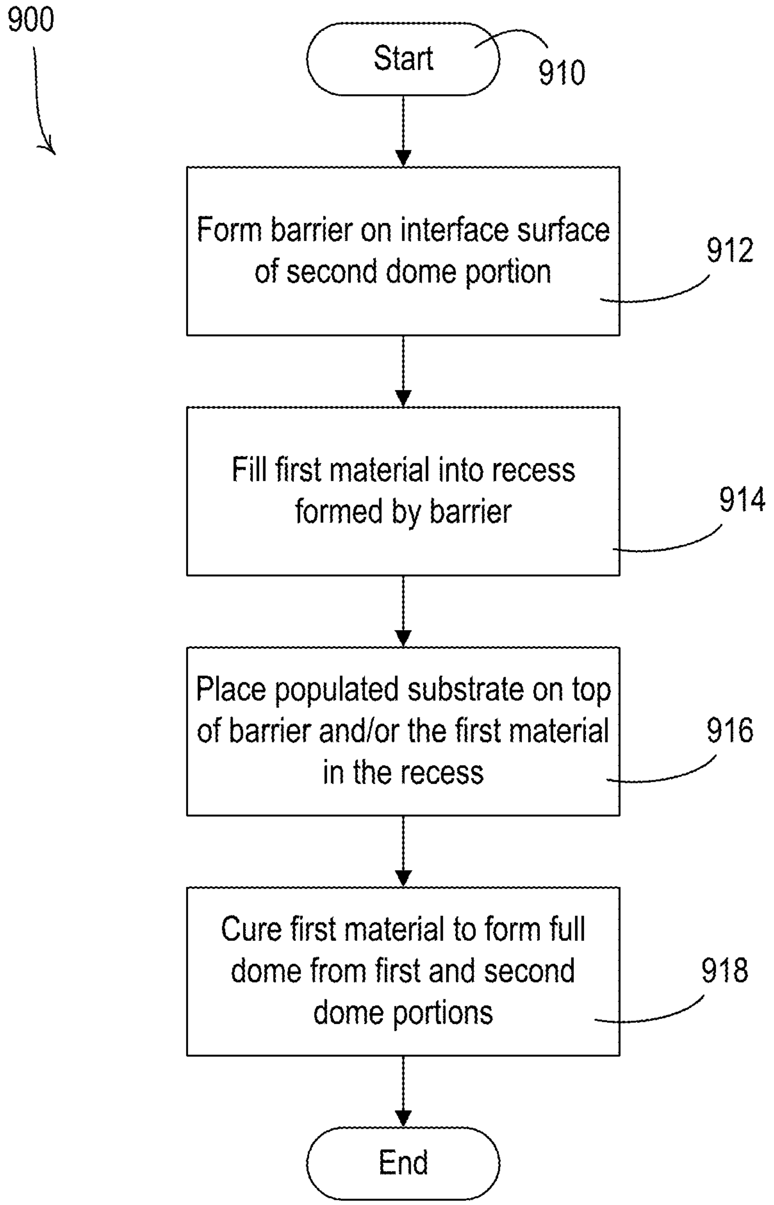
FIG. 17 is a flowchart of another example procedure for building an emitter assembly, such as the emitter assembly of FIG. 9.

FIG. 17 is a flowchart of an example procedure 900 for building an emitter assembly 1000, e.g., such as the emitter assembly 200 shown in FIGS. 8-10. FIGS. 18A-18E illustrate the emitter assembly 1000 at different steps during the procedure 900 for the emitter assembly 1000. FIGS. 18A-18E are side cross-section views of the emitter assembly 1000 taken through the center of the emitter assembly 1000 (e.g., similar to the cross-section view of FIG. 9). FIG. 18F is a top view of the emitter assembly 1000 fully assembled. For example, the emitter assembly 1000 may comprise the emitters 210, the detectors 212, 214, the substrate 216, the dome 218, and the electrical wires 219, which may be arranged and configured to operate as shown and described above with reference to FIGS. 8-10. The procedure 900 may be performed to install the dome 218 of the emitter assembly 1000 onto the substrate 216. The dome 218 of the emitter assembly 1000 may comprise a first dome portion 1010 (e.g., a first body portion) and a second dome portion 1030 (e.g., a second body portion).

Figure 18A:
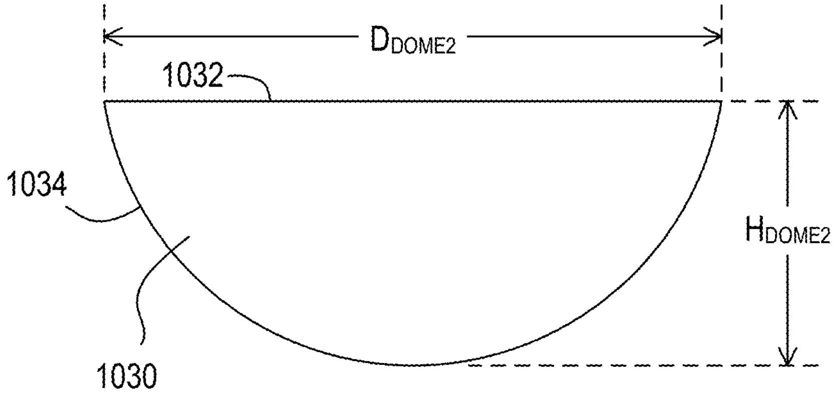
FIGS. 18A-18E are side cross-section views of the emitter assembly (e.g., taken through the center of the emitter assembly) during different steps of the procedure of FIG. 17.

The procedure 900 may begin at 910 with the second dome portion 1030 oriented such that an interface surface 1032 (e.g., a boundary surface) of the second dome portion 1030 is positioned up (e.g., located at the top of the second dome portion 1030) as shown in FIG. 18A. For example, the second dome portion 1030 may be made during a manufacturing process (e.g., an injection molding process) that is separate from the process for making the first dome portion 1010 (e.g., the curing process at 918 as will be described in greater detail below). The second dome portion 1030 may be fully cured or partially cured (e.g., 70% cured) during the injection molding process. The second dome portion 1030 may be optically transmissive (e.g., transparent and/or translucent). The second dome portion 1030 may be made from a second material, which may be a clear material or a diffusive material. For example, the second material may be a thermoset material, such as optical liquid silicone rubber. The second dome portion 1030 may have a shape (e.g., contour) that defines an outer surface 1034 and operates to direct light from the emitters 210 in a desired and/or optimal direction (e.g., towards a lens of a lighting fixture in which the emitter assembly 1000 is installed) and to reduce an amount of light that is reflected back into the dome 218. For example, the second dome portion 1030 may have a hemispherical shape and the outer surface 1034 that may have a smooth or textured finish. The second dome portion 1030 may also define an interface surface 1032 that may have a smooth or textured finish. For example, the interface surface 1032 of the second dome portion 1030 may both be substantially flat. The interface surface 1032 of the second dome portion 1030 may have a circular perimeter (e.g., as shown in FIG. 18F) having a diameter $D_{DOME2}$.

Figure 18B:
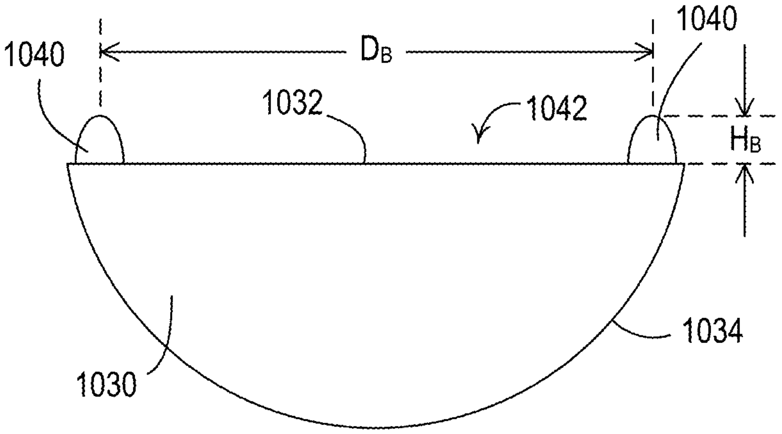

At 912 of the procedure 900, a barrier 1040 (e.g., a dam) may be formed on the interface surface 1032 of the second dome portion 1030 (e.g., as shown in FIG. 18B). For example, the barrier 1040 may be formed from a high viscosity, quick setting epoxy. The barrier 1040 may be formed in a shape, such as an ellipse (e.g., a circle or an oval) or a polygon (e.g., a square, a rectangle, or a complex polygon shape), that surrounds the emitters 210 and the detectors 212, 214 on the substrate 216 when the emitter assembly 1000 is fully assembled. For example, the barrier 1040 may be formed in the shape of a circle as shown in FIG. 18F. The barrier 1040 may form a recess 1042 (e.g., an open volume) between the barrier 1040 and the interface surface 1032 of the second dome portion 1030. When the barrier 1040 is formed in a circle, the barrier 1040 may be characterized by a diameter $D_B$ (e.g., a diameter of a centerline and/or a peak of the barrier 1040), which may be smaller than the diameter $D_{DOME2}$ of the second dome portion 1030, but large enough to surround the emitters 210 and the detectors 212, 214 on the substrate 216 when the emitter assembly 1000 is fully assembled. The barrier 1040 may have a height $H_B$ that is greater than a height $H_D$ of the emitters 210 and the detectors 212, 214 on the substrate 216. In some examples, the second dome portion 1030 may be designed and manufactured to have a geometry that includes the barrier 1040 as an integral feature (e.g., the barrier 1040 may be integral to the second dome portion 1030, such that 912 of the procedure 900 may be omitted). For example, the barrier 1040 may have an arc-shaped (e.g., hill-shaped) cross-section (e.g., as shown in FIGS. 18B-18E), although other variations are possible.

Figure 18C:
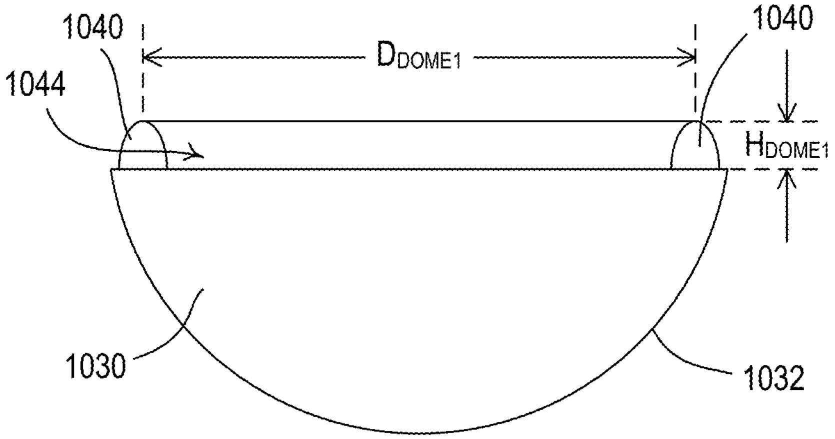

At 914 of the procedure 900, a first material 1044 may be deposited (e.g., filled or poured) into the recess 1042 formed by the barrier 1040 and the interface surface 1032 of the second dome portion 1030 (e.g., as shown in FIG. 18C). The first material 1044 in the recess 1042 may be configured to form a first dome portion 1010 (e.g., a first body portion) (e.g., after curing the first material at 718 as described in greater detail below). For example, the first material 1044 of the first dome portion 1010 may be, for example, the same as a second material of the second dome portion 1030 (e.g., a translucent thermoset material, such as formed from an optical liquid silicone rubber). In some examples, the first material 1044 of the first dome portion 1010 may be different from the second material of the second dome portion 1030 (e.g., the first material 1044 of the first dome portion 1010 may be an optical liquid silicone rubber, while the second material of the second dome portion 1030 may be glass). For example, the first material 1044 may be filled into the recess 1042 until a height $H_{DOME1}$ of the first dome portion 1010 may be approximately equal to the height $H_B$ of the barrier 1040 (e.g., and a diameter $D_{DOME1}$ of the first dome portion 1010 may be approximately the equal to the diameter $D_B$ of the barrier 1040).

Figure 18D:
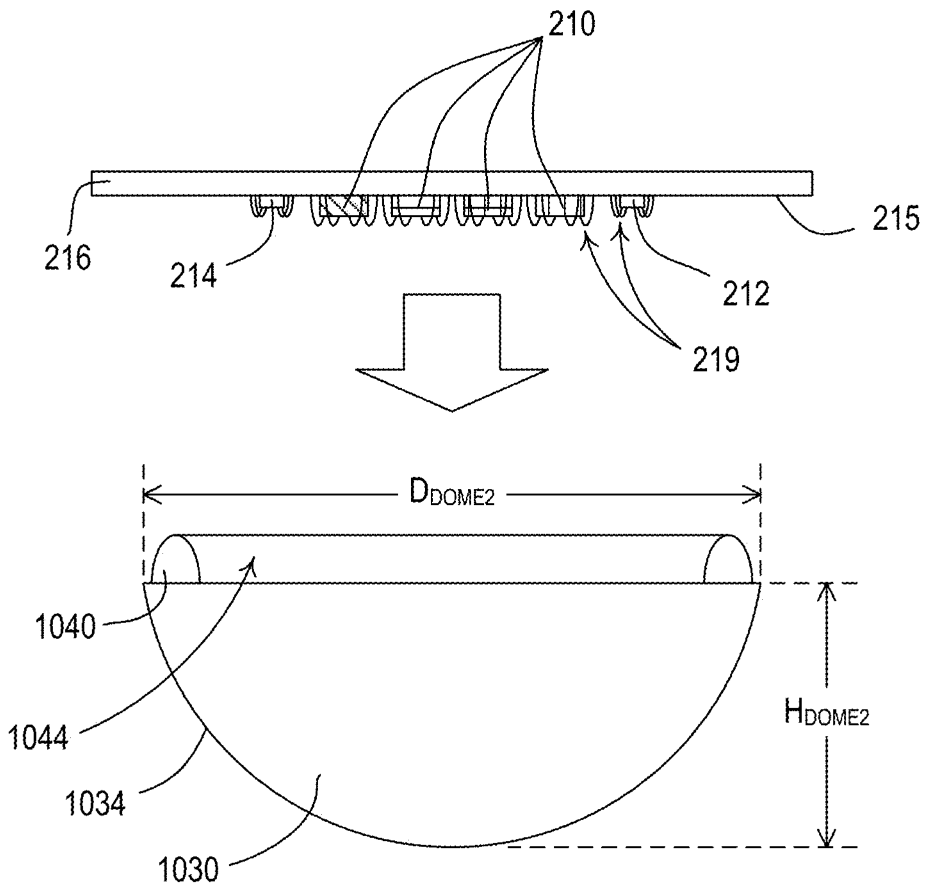
Figure 18E:
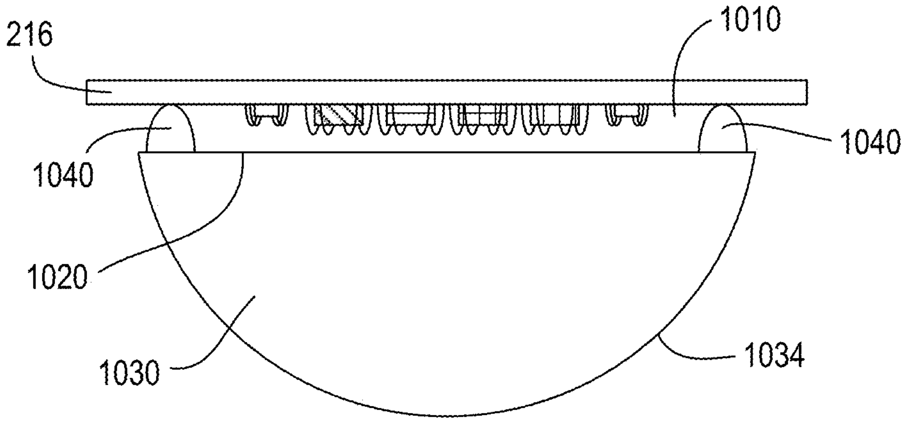
Figure 18F:
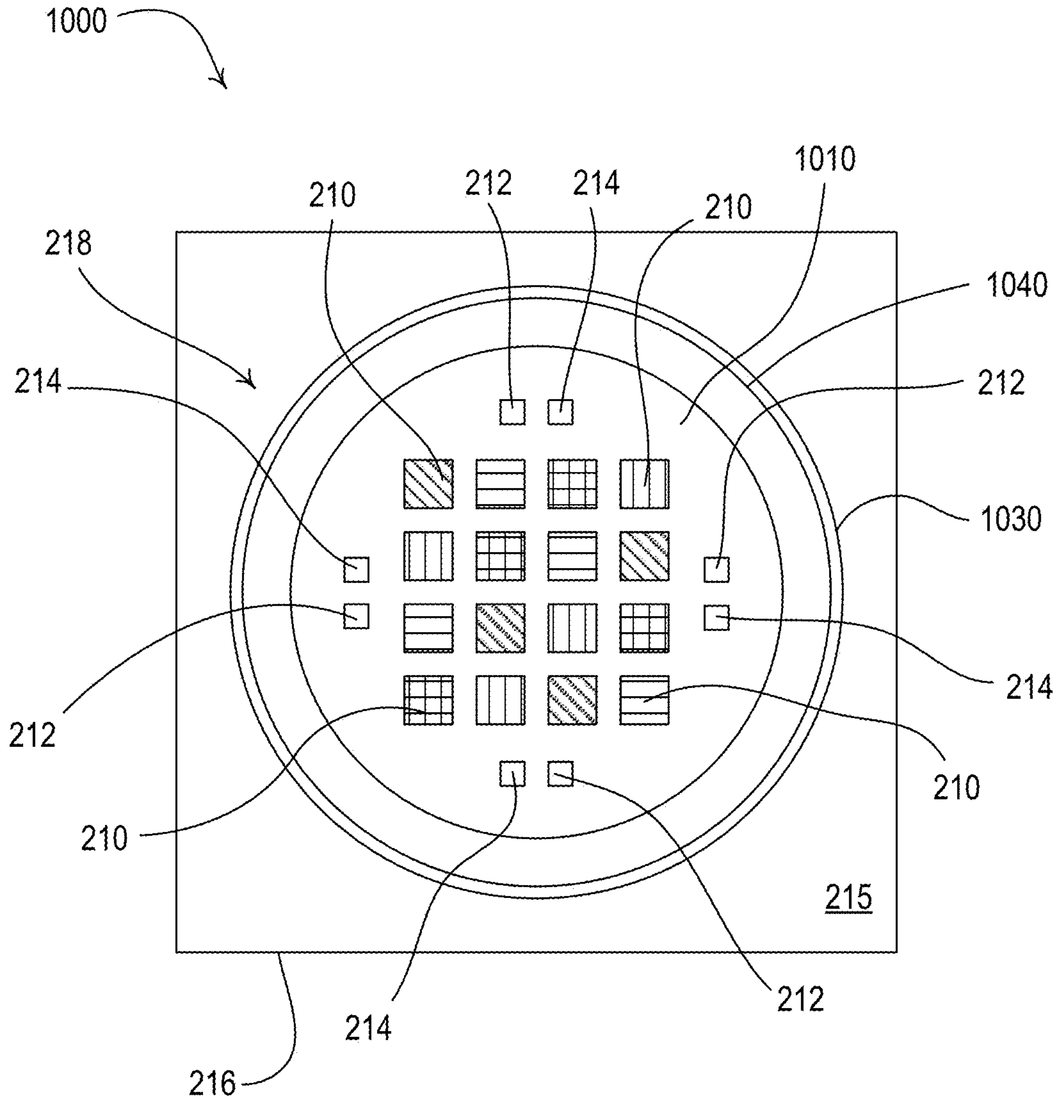
FIG. 18F is a top view of the emitter assembly after being built during the procedure of FIG. 17.

At 916 of the procedure 900, the substrate 216 may be placed onto the barrier 1040 and/or the first material 1044 within the recess 1042 (e.g., as shown in FIG. 18D), such that the emitters 210 and the detectors 212, 214 on the substrate 216 are positioned in the first material 1044 within the barrier 1040 (e.g., as shown in FIG. 18E). At 918 of the procedure 900, the first material 1044 may be cured to form the dome 218 (e.g., the full dome) from the first dome portion 1010 and the second dome portion 1030 (e.g., as shown in FIG. 18E). Prior to the curing process at 918, the first material 1044 may comprise a liquid material. For example, the interface surface 1032 of the second dome portion 1030 may bond with the first material 1044 of the first dome portion 1010 during the curing process. After the curing process, the first dome portion 1010 may comprise a cured form of the liquid material (e.g., the first material 1044) that is deposited in the recess 1042 defined by the barrier 1040. When the dome 218 is fully formed, the second dome portion 1030 may be located above the first dome portion 1010 (e.g., or below the first dome portion 1010 when the emitter assembly 1000 is inverted as shown in FIG. 18E), such that the first dome portion 1010 is located between the second dome portion 1030 and the substrate 218. The emitters 210 and the detectors 212, 214 may be encapsulated in the first dome portion 1010 after the curing process. The first dome portion 1010 may be affixed to the substrate 216 and the second dome portion 1030 may be affixed to the first dome portion 1010 during the curing process.

For example, the first dome portion 1010 and the second dome portion 1030 may be made of the same or similar materials, such that light from the emitters 210 may be transmitted through the dome 218 (e.g., as if the dome 218 were fabricated from a single material during a single step manufacturing process). While the first dome portion 1010 and the second dome portion 1030 may be fabricated as independent parts, the first dome portion 1010 and the second dome portion 1030 may be made of sufficiently similar material and may be brought into contact at appropriate stages of a curing process, such that cross-linking of molecules across the part boundaries may occur at an intersection 1020 (e.g., an interface) between the first dome portion 1010 and the second dome portion 1030. For example, partial curing of the second dome portion 1030 during the injection molding process may allow for stronger cross-linking at the intersection 1020 between the first dome portion 1010 and the second dome portion 1030. At the end of the procedure 900 for the emitter assembly 1000, the first dome portion 1010 and the second dome portion 1030 may be, for example, fully cured.

Figure 19A:
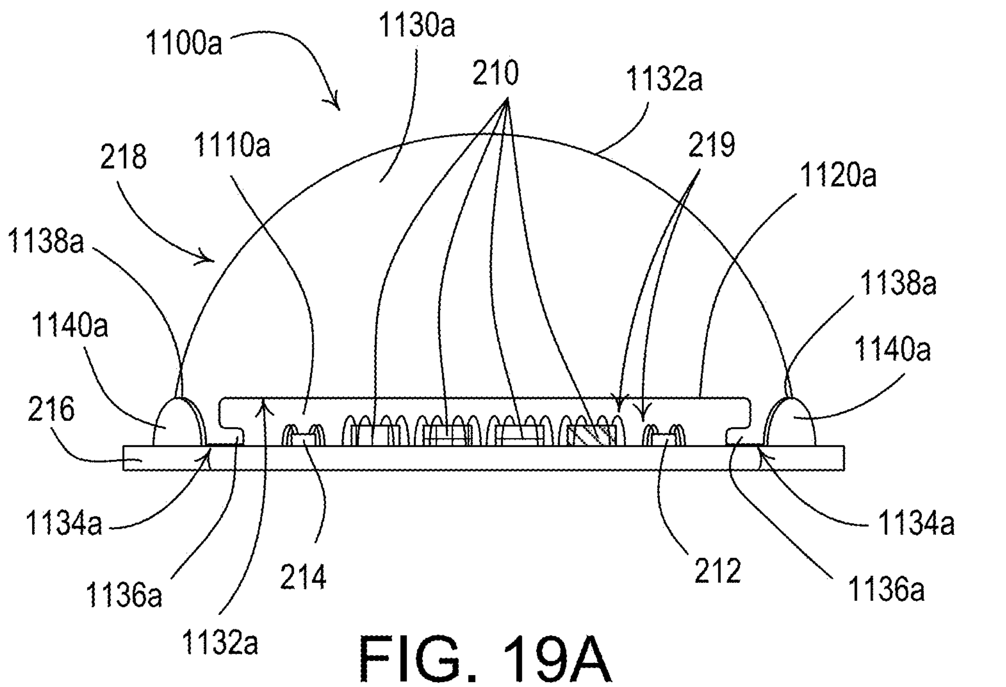
FIGS. 19A-20B are side cross-section views of other emitter assemblies (e.g., taken through the center of each emitter assembly).

FIG. 19A is a side cross-section view of another example emitter assembly 1100*a* (e.g., taken through the center of the emitter assembly). For example, the emitter assembly 1100*a* may comprise the emitters 210, the detectors 212, 214, the substrate 216, the dome 218, and the electrical wires 219, which may be arranged and configured to operate as shown and described above with reference to FIGS. 8-10. For example, the procedure 700 may be performed to form the dome 218 of the emitter assembly 1100*a*. The emitter assembly 1100*a* may comprise a barrier 1140*a* (e.g., a dam) that may be formed on the substrate 216 around the emitters 210 and the detectors 212, 214 (e.g., at 712 of the procedure 700). For example, the barrier 1140*a* may be formed from a high viscosity, quick setting epoxy. The barrier 1140*a* may be formed around one or more parts that are mounted to the substrate 216, such as the emitters 210 and the detectors 212, 214 (e.g., in a similar manner as the barrier 840 is formed). The barrier 1140*a* may form a recess (e.g., similar to the recess 842) between the barrier 1140*a* and the substrate 216. For example, the barrier 1140*a* may have an arc-shaped (e.g., hill-shaped) cross-section (e.g., as shown in FIG. 19A), although other variations are possible.

The dome 218 of the emitter assembly 1100*a* may also comprise a first dome portion 1110*a* (e.g., a first body portion) and a second dome portion 1130*a* (e.g., a second body portion). The first dome portion 1110*a* may be formed by depositing (e.g., filling or pouring) a first material (e.g., a thermoset material, such as formed from an optical liquid silicone rubber) into the recess defined by the barrier 1140*a* (e.g., at 714 of the procedure 700) and curing the first material (e.g., at 718 of the procedure 700). Prior to the curing process, the first material may comprise a liquid material. After the curing process, the first dome portion 1110*a* may comprise a cured form of the liquid material (e.g., the first material) that is deposited in the recess defined by the barrier 1140*a*. For example, the second dome portion 1130*a* may be made during a manufacturing process (e.g., an injection molding process) that is separate from the process for making the first dome portion 1110*a* (e.g., the curing process at 718 of the procedure 700). The second dome portion 1130*a* may be made from a second material, which may be, for example, different from or the same as the first material (e.g., a thermoset material, such as formed from an optical liquid silicone rubber). The second dome portion 1130*a* may have a shape (e.g., contour) that defines an outer surface 1134*a* and operates to direct light from the emitters 210 in a desired and/or optimal direction (e.g., towards a lens of a lighting fixture in which the emitter assembly 1100*a* is installed) and to reduce an amount of light that is reflected back into the dome 218. The second dome portion 1130*a* may also define an interface surface 1132*a* that may have a smooth or textured finish.

The second dome portion 1130*a* may comprise the one or more support members 1134*a* (e.g., feet) configured to support the second dome portion 1130*a* relative to the first dome portion 1110*a* (e.g., above and on top of the first dome portion 1110*a*). In some examples, the one or more support members 1134*a* may contact the substrate 216 for supporting the second dome portion 1130*a* relative to the first dome portion 1110*a*. As shown in FIG. 19A, the one or more support members 1134*a* may extend from the interface surface 1132*a* of the second dome portion 1130*a* and into the recess defined by the barrier 1140*a*. The one or more support members 1134*a* may comprise one or more respective flange portions 1136*a* configured to hold the second dome portion 1130*a* in position relative to the first dome portion 1110*a* after the first material is cured to form the first dome portion 1110*a*. The one or more support members 1134*a* may comprise one or more respective ledge portions 1138*a* that may be supported on the barrier 1140*a* when the one or more support members 1134*a* are received in the recess defined by the barrier 1140*a*. The one or more support members 1134*a* may comprise, for example, a single support member that extends around the perimeter of the interface surface 1132*a* of the second dome portion 1130*a* or a plurality of support members spaced apart around the perimeter of the interface surface 1132*a* of the second dome portion 1130*a*.

The second dome portion 1130*a* may be placed onto the barrier 1140*a* and/or the first material in the recess (e.g., at 716 of the procedure 700) after depositing the first material into the recess and then the first material within the recess may be cured to form the dome 218. For example, the first dome portion 1110*a* and the second dome portion 1130*a* may be made of the same or similar materials, such that light from the emitters 210 may be transmitted through the dome 218 (e.g., as if the dome 218 were fabricated from a single material during a single step manufacturing process). While the first dome portion 1110*a* and the second dome portion 1130*a* may be fabricated as independent parts, the first dome portion 1110*a* and the second dome portion 1130*a* may be made of sufficiently similar material and may be brought into contact at appropriate stages of a curing process, such that cross-linking of molecules across the part boundaries may occur at an intersection 1120*a* (e.g., an interface) between the first dome portion 1110*a* and the second dome portion 1130*a*. While the emitter assembly 1100*a* is described herein as being assembled using the procedure 700, an emitter assembly similar to the emitter assembly 1100*a* (e.g., having the second dome portion 1130*a*) may also be assembled using the procedure 900.

Figure 19B:
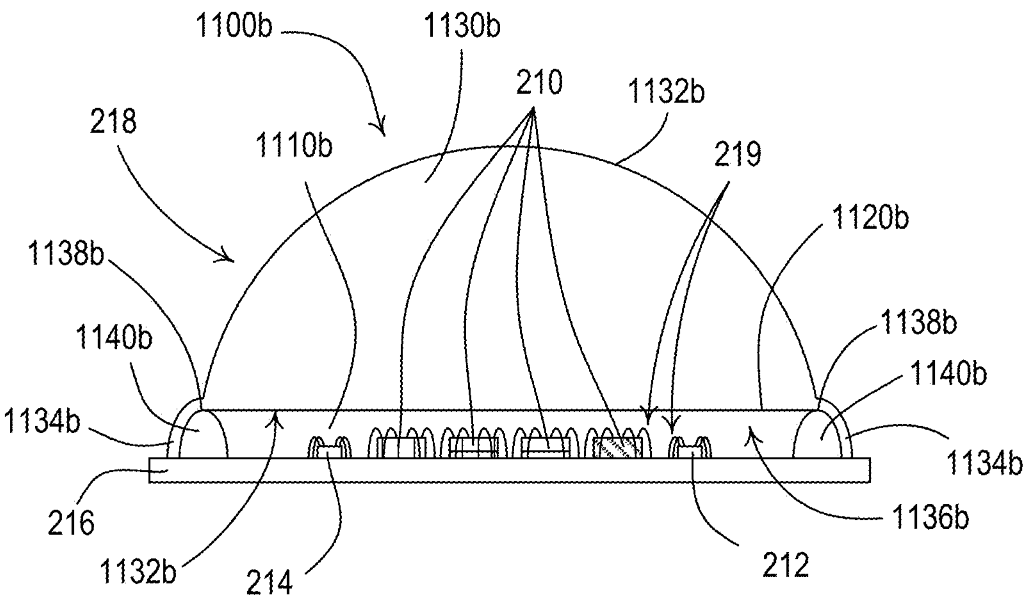

FIG. 19B is a side cross-section view of another example emitter assembly 1100*b* (e.g., taken through the center of the emitter assembly). For example, the emitter assembly 1100*b* may comprise the emitters 210, the detectors 212, 214, the substrate 216, the dome 218, and the electrical wires 219, which may be arranged and configured to operate as shown and described above with reference to FIGS. 8-10. For example, the procedure 700 may be performed to form the dome 218 of the emitter assembly 1100*b*. The emitter assembly 1100*b* may comprise a barrier 1140*b* (e.g., a dam) that may be formed on the substrate 216 around the emitters 210 and the detectors 212, 214 (e.g., at 712 of the procedure 700). For example, the barrier 1140*b* may be formed from a high viscosity, quick setting epoxy. The barrier 1140*b* may be formed around one or more parts that are mounted to the substrate 216, such as the emitters 210 and the detectors 212, 214 (e.g., in a similar manner as the barrier 840 is formed). The barrier 1140*b* may form a recess (e.g., similar to the recess 842) between the barrier 1140*b* and the substrate 216. For example, the barrier 1140*b* may have an arc-shaped (e.g., hill-shaped) cross-section (e.g., as shown in FIG. 19B), although other variations are possible.

The dome 218 of the emitter assembly 1100*b* may also comprise a first dome portion 1110*b* (e.g., a first body portion) and a second dome portion 1130*b* (e.g., a second body portion). The first dome portion 1110*b* may be formed by depositing (e.g., filling or pouring) a first material (e.g., a thermoset material, such as formed from an optical liquid silicone rubber) into the recess (e.g., at 714 of the procedure 700) and curing the first material (e.g., at 718 of the procedure 700). Prior to the curing process, the first material may comprise a liquid material. After the curing process, the first dome portion 1110*b* may comprise a cured form of the liquid material (e.g., the first material) that is deposited in the recess defined by the barrier 1140*b*. For example, the second dome portion 1130*b* may be made during a manufacturing process (e.g., an injection molding process) that is separate from the process for making the first dome portion 1110*b* (e.g., the curing process at 718 of the procedure 700). The second dome portion 1130*b* may be made from a second material, which may be, for example, different from or the same as the first material (e.g., a thermoset material, such as formed from an optical liquid silicone rubber). The second dome portion 1130*b* may have a shape (e.g., contour) that defines an outer surface 1134*b* and operates to direct light from the emitters 210 in a desired and/or optimal direction (e.g., towards a lens of a lighting fixture in which the emitter assembly 1100*b* is installed) and to reduce an amount of light that is reflected back into the dome 218. The second dome portion 1130*b* may also define an interface surface 1132*b* that may have a smooth or textured finish.

The second dome portion 1130*b* may comprise one or more support members 1134*b* (e.g., wall portions) configured to support the second dome portion 1130*b* relative to the first dome portion 1110*b* (e.g., above and on top of the first dome portion 1110*b*). In some examples, the one or more support members 1134*b* may contact the substrate 216 for supporting the second dome portion 1130*b* relative to the first dome portion 1110*b*. As shown in FIG. 19B, the one or more support members 1134*b* may extend from the interface surface 1132*b* and around the outside of the barrier 1140*a*. The one or more support members 1134*b* may comprise, for example, a single support member that extends around the perimeter of the interface surface 1132*b* of the second dome portion 1130*b* or a plurality of support members spaced apart around the perimeter of the interface surface 1132*b* of the second dome portion 1130*b*. When the one or more support members 1134*b* are a single support member 1134*b* that extends around the perimeter of the interface surface 1132*b* of the second dome portion 1130*b*, the single support member may define a recess 1136*b* and may be configured to contain the first material and/or the barrier 1140*b*. The one or more support members 1134*b* may comprise one or more respective ledge portions 1138*b* that may be supported on the barrier 1140*b* as the one or more support members 1134*b* extend around the barrier 1140*b*.

The second dome portion 1130*b* may be placed onto the barrier 1140*b* and/or the first material in the recess (e.g., at 716 of the procedure 700) after depositing the first material into the recess and then the first material within the recess may be cured to form the dome 218. For example, the first dome portion 1110*b* and the second dome portion 1130*b* may be made of the same or similar materials, such that light from the emitters 210 may be transmitted through the dome 218 (e.g., as if the dome 218 were fabricated from a single material during a single step manufacturing process). While the first dome portion 1110*b* and the second dome portion 1130*b* may be fabricated as independent parts, the first dome portion 1110*b* and the second dome portion 1130*b* may be made of sufficiently similar material and may be brought into contact at appropriate stages of a curing process, such that cross-linking of molecules across the part boundaries may occur at an intersection 1120*b* (e.g., an interface) between the first dome portion 1110*b* and the second dome portion 1130*b*. While the emitter assembly 1100*b* is described herein as being assembled using the procedure 700, an emitter assembly similar to the emitter assembly 1100*b* (e.g., having the second dome portion 1130*b*) may also be assembled using the other procedures 300, 500, 900 described herein.

Figure 20A:
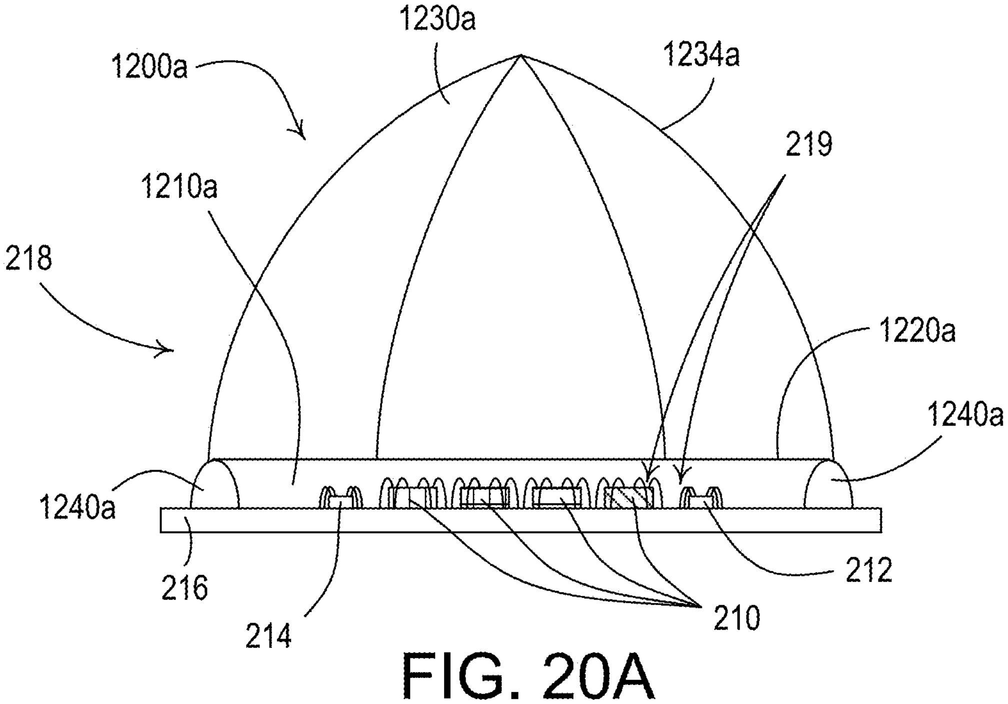
Figure 20B:
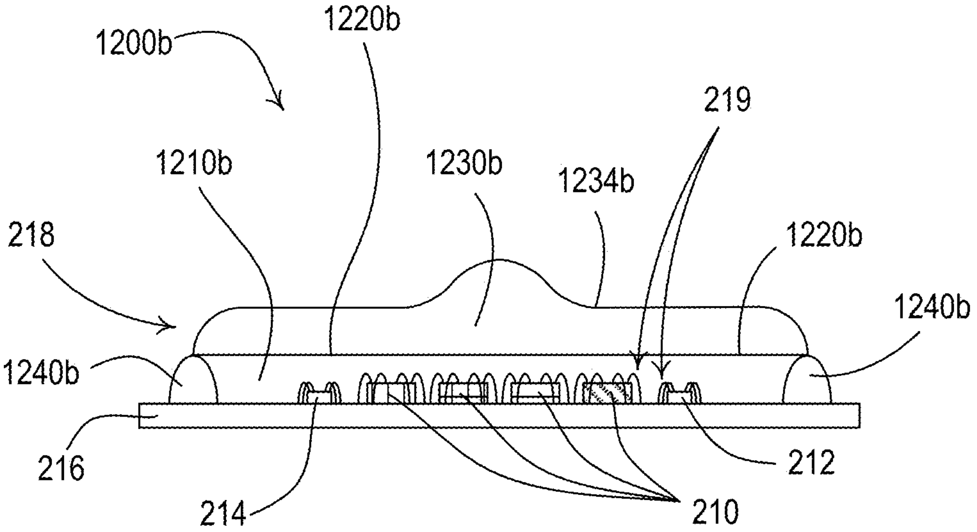

While the emitter assemblies 400, 600, 800, 1000 are shown having respective second dome portions 430, 630, 830, 1030 with a hemispherical shape, the procedures 300, 500, 700, 900 allow for the fabrication of emitter assemblies having domes (e.g., second dome portions) with different shapes (e.g., contours), sizes, and materials. FIGS. 20A and 20B are side cross-section views of example emitter assemblies 1200*a*, 1200*b* (e.g., taken through the center of each emitter assembly), where the emitter assemblies 1200*a*, 1200*b* having second dome portions 1230*a*, 1230*b* with differing shapes and size. For example, each emitter assembly 1200*a*, 1200*b* may comprise the emitters 210, the detectors 212, 214, the substrate 216, the dome 218, and the electrical wires 219, which may be arranged and configured to operate as shown and described above with reference to FIGS. 8-10. For example, the procedure 700 may be performed to form the domes 218 of the emitter assemblies 1200*a*, 1200*b*. The emitter assemblies 1200*a*, 1200*b* may each comprise a respective barrier 1240*a*, 1240*b* (e.g., a dam) that may be formed on the substrate 216 around the emitters 210 and the detectors 212, 214 (e.g., at 712 of the procedure 700). For example, the barriers 1240*a*, 1240*b* may each be formed from a high viscosity, quick setting epoxy. The barriers 1240*a*, 1240*b* may each be formed around one or more parts that are mounted to the substrate 216, such as the emitters 210 and the detectors 212, 214 (e.g., in a similar manner as the barrier 840 is formed). The barriers 1240*a*, 1240*b* may form respective recesses (e.g., similar to the recess 842). For example, the barriers 1240*a*, 1240*b* each may have an arc-shaped (e.g., hill-shaped) cross-section (e.g., as shown in FIGS. 20A and 20B), although other variations are possible.

The emitter assemblies 1200*a*, 1200*b* may each comprise a respective first dome portion 1210*a*, 1210*b*. The first dome portions 1210*a*, 1210*b* may each be formed by depositing (e.g., filling or pouring) a first material (e.g., a thermoset material, such as formed from an optical liquid silicone rubber) into the respective recess 1242*a* 1242*b* (e.g., at 714 of the procedure 700) and curing the first material (e.g., at 718 of the procedure 700). Prior to the curing process, the first material may comprise a liquid material. After the curing process, the first dome portions 1210*a*, 1210*b* may each comprise a cured form of the liquid material (e.g., the first material) that is deposited in the recesses defined by the respective barriers 1140*a*, 1140*b*. For example, the second dome portions 1230*a*, 1230*b* may be made during a manufacturing process (e.g., an injection molding process) that is separate from the process for making the first dome portions 1210*a*, 1210*b* (e.g., the curing process at 718 of the procedure 700). The second dome portions 1230*a*, 1230*b* may each be made from a second material, which may be, for example, different from or the same as the first material (e.g., a thermoset material, such as formed from an optical liquid silicone rubber). The second dome portions 1230*a*, 1230*b* may each have a shape (e.g., contour) that operates to direct light from the emitters 210 in a desired and/or optimal direction (e.g., towards a lens of a lighting fixture in which the respective emitter assembly 1200*a*, 1200*b* is installed) and to reduce an amount of light that is reflected back into the dome 218.

The second dome portions 1230*a*, 1230*b* may each be placed onto the respective barrier 1240*a*, 1240*b* and/or the first material in the recess (e.g., at 716 of the procedure 700) after depositing the first material into the recess, and then the first material within the recess may be cured to form the respective domes 218 (e.g., at 718 of the procedure 700). For example, the first dome portions 1210*a*, 1210*b* and the respective second dome portions 1230*a* 1230*b* may be made of the same or similar materials, such that light from the emitters 210 may be transmitted through the dome 218 (e.g., as if the dome 218 were fabricated from a single material during a single step manufacturing process). While the first dome portions 1210*a*, 1210*b* and the second dome portions 1230*a*, 1230*b* may be fabricated as independent parts, the first dome portions 1210*a*, 1210*b* and the second dome portions 1230*a*, 1230*b* may be made of sufficiently similar material and may be brought into contact at appropriate stages of a curing process, such that cross-linking of molecules across the part boundaries may occur at respective intersections 1220*a*, 1220*b* between the first and second dome portions. While the emitter assemblies 1200*a*, 1200*b* are described herein as being assembled using the procedure 700, emitter assemblies similar to the emitter assemblies 1200*a*, 1200*b* (e.g., having the respective second dome portion 1230*a*, 1230*b*) may also be assembled using the other procedures 300, 500, 900 described herein.

Figure 21:
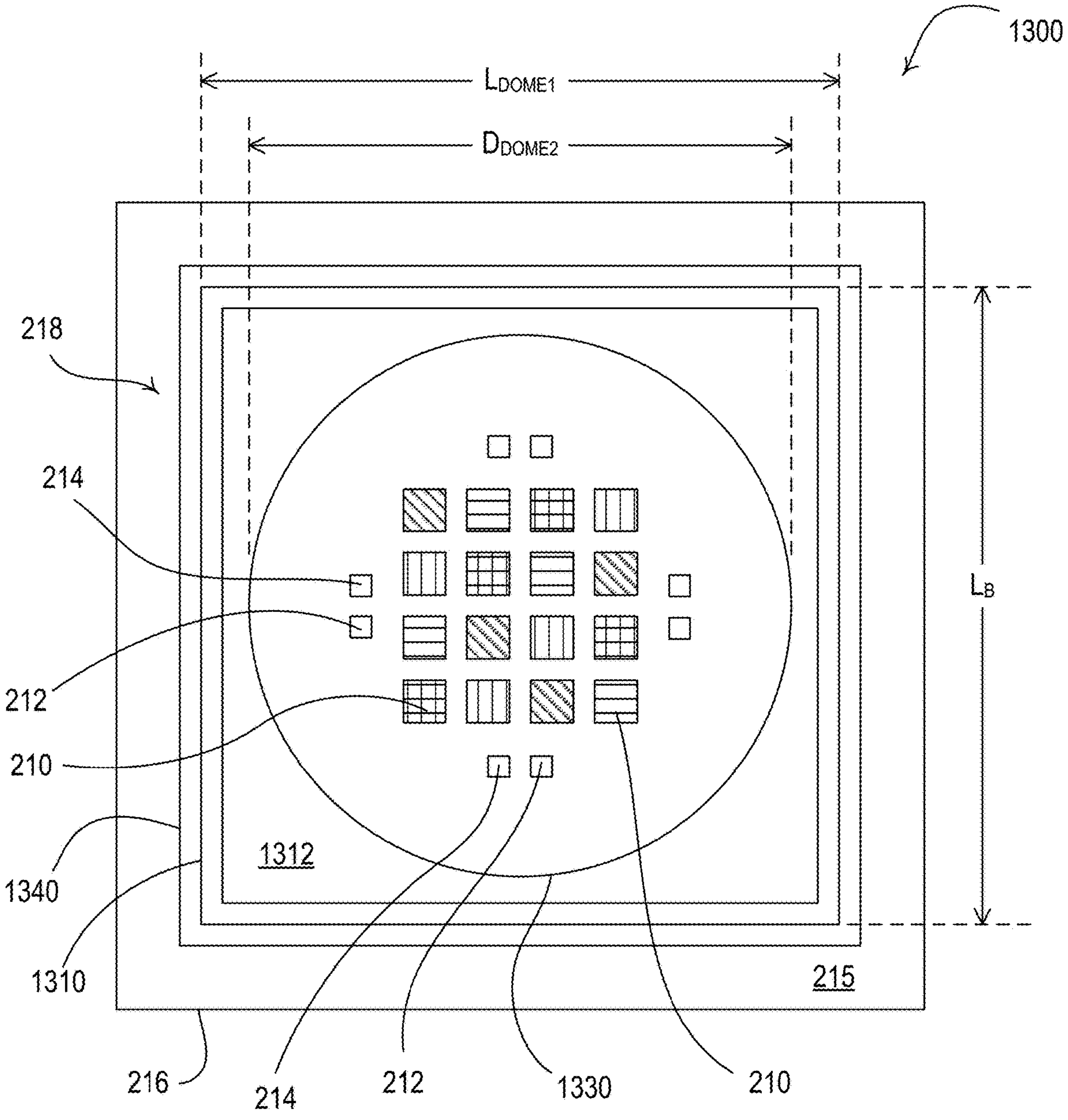
FIG. 21 is a top view of another emitter assembly (e.g., taken through the center of the emitter assembly).

The interface surfaces of the first and second dome portions, respectively, of the emitter assemblies 400, 600, 800, 1000, 1100*a*, 1100*b*, 1200*a*, 1200*b* are shown in FIGS. 8-20B as having circular perimeters that are aligned with each other. FIG. 21 is a top view of another example emitter assembly 1300 that has a first dome portion 1310 (e.g., a first body portion) with an interface surface 1312 that has differently-shaped perimeter and is not aligned with an interface surface (not shown) of a second dome portion 1330 (e.g., a second body portion). For example, the emitter assembly 1300 may comprise the emitters 210, the detectors 212, 214, the substrate 216, the dome 218, and the electrical wires 219, which may be arranged and configured to operate as shown and described above with reference to FIGS. 8-10. For example, the procedure 700 may be performed to form the dome 218 of the emitter assembly 1300. The emitter assembly 1300 may comprise a barrier 1340 (e.g., a dam) that may be formed on the substrate 216 around the emitters 210 and the detectors 212, 214 (e.g., at 712 of the procedure 700). For example, the barrier 1340 may be formed from a high viscosity, quick setting epoxy. The barrier 1340 may be formed around one or more parts that are mounted to the substrate 216, such as the emitters 210 and the detectors 212, 214 (e.g., in a similar manner as the barriers 640 and 840 are formed). As shown in FIG. 21, the barrier 1340 may be formed in a shape, such as a square, which surrounds the emitters 210 and the detectors 212, 214. Additionally or alternatively, the barrier 1340 may be formed in the shape of an ellipse (e.g., a circle or an oval) or a polygon (e.g., a rectangle or a complex polygon shape). The barrier 1340 may form a recess (e.g., similar to the recess 842). When the barrier 1340 is formed in a square (e.g., as shown in FIG. 21), the barrier 1340 may be characterized by a length $L_B$ on each side (e.g., a length at a centerline and/or a peak of the barrier 840).

The first dome portion 1310 may be formed by depositing (e.g., filling or pouring) a first material (e.g., a translucent thermoset material, such as formed from an optical liquid silicone rubber) into the recess formed by the barrier 1340 (e.g., at 714 of the procedure 700) and curing the first material (e.g., at 718 of the procedure 700). Prior to the curing process, the first material may comprise a liquid material. After the curing process, the first dome portion 1310 may comprise a cured form of the liquid material (e.g., the first material) that is deposited in the recess defined by the barrier 1340. The first dome portion 1310 be in the shape of a square characterized by a length $L_{DOME1}$ (e.g., as shown in FIG. 21), which may be equal to the length $L_B$ of the sides of the square formed by the barrier 1340. For example, the second dome portion 1330 may be made during a manufacturing process (e.g., an injection molding process) that is separate from the process for making the first dome portion 1310 (e.g., the curing process at 718 of the procedure 700). The second dome portion 1330 may be made from a second material, which may be, for example, different from or the same as the first material (e.g., a thermoset material, such as formed from an optical liquid silicone rubber). The second dome portion 1330 may have a shape (e.g., contour) that operates to direct light from the emitters 210 in a desired and/or optimal direction (e.g., towards a lens of a lighting fixture in which the emitter assembly 1300 is installed) and to reduce an amount of light that is reflected back into the dome 218. The perimeter of the interface surface of the second dome portion 1330 may have a diameter $D_{DOME2}$, which may be less than or equal to the length $L_{DOME1}$ of the first dome portion 1310 (e.g., the length $L_B$ of the barrier 1140).

When the interface surface 1312 of the first dome portion 1310 and the interface surface of the second dome portion 1330 are not the same size, are not the same shape, and/or are not aligned, an area of the interface surface of the second dome portion 1330 may fall within the interface surface 1312 of the first dome portion 1310 (e.g., the perimeter of the interface surface 1312 of the first dome portion 1310 may surround the perimeter of the interface surface of the second dome portion 1330) as shown in FIG. 21. The emitters 210 and the detectors 212, 214 may be located within perimeters of the interface surface 1312 of the first dome portion 1310 and the interface surface of the second dome portion 1330. The second dome portion 1330 may be positioned on the interface surface 1312 of the first dome portion 1310 (e.g., within the perimeter of the interface surface 1312), such that the light emitted by the emitters 210 falls within the perimeter of the interface surface of the second dome portion 1330 (e.g., due to the beam angle of the emitters 210). In some examples, the perimeter of the interface surface of the second dome portion 1330 may have other shapes (e.g., other than a circle as shown in FIG. 18F). For example, the perimeter of the interface surface of the second dome portion 1330 may be shaped as an ellipse (e.g., an oval) or a polygon (e.g., a square, a rectangle or a complex polygon shape). When the area of the interface surface 1312 is larger than the area of the interface surface of the second dome portion 1330, the second dome portion 1330 may comprise one or more support members (e.g., such as the support members 1134*a*, 1134*b*) for supporting the second dome portion relative to the first dome portion prior to curing of the first material.

The second dome portion 1330 may be placed onto the barrier 1340 and/or the first material in the recess (e.g., at 716 of the procedure 700) after depositing the first material into the recess and then the first material within the recess may be cured to form the dome 218. For example, the first dome portion 1310 and the second dome portion 1330 may be made of the same or similar materials, such that light from the emitters 210 may be transmitted through the dome 218 (e.g., as if the dome 218 were fabricated from a single material during a single step manufacturing process). While the first dome portion 1310 and the second dome portion 1330 may be fabricated as independent parts, the first dome portion 1310 and the second dome portion 1330 may be made of sufficiently similar material and may be brought into contact at appropriate stages of a curing process, such that cross-linking of molecules across the part boundaries may occur at an intersection (not shown) between the first dome portion 1310 and the second dome portion 1330. While the emitter assembly 1300 is described herein as being assembled using the procedure 700, an emitter assembly similar to the emitter assembly 1300 (e.g., having the second dome portion 1330) may also be assembled using the other procedures 300, 500, 900 described herein.

Figure 22:
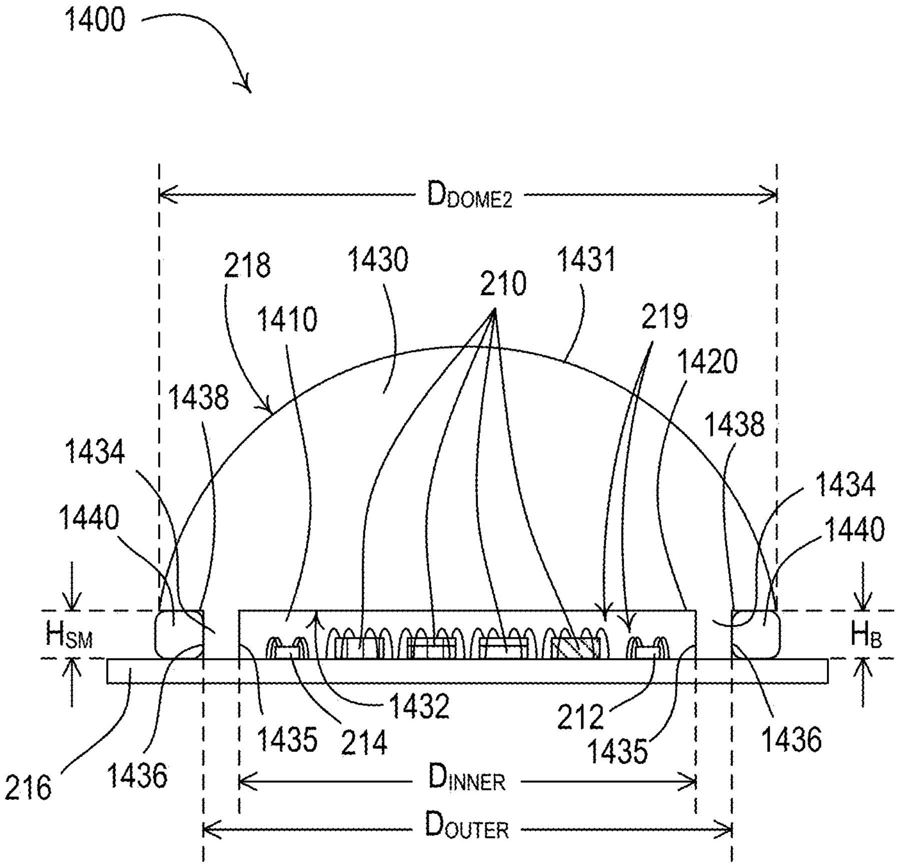
FIG. 22 is a side cross-section view of another emitter assembly (e.g., taken through the center of the emitter assembly).

FIG. 22 is a side cross-section view of another example emitter assembly 1400 (e.g., taken through the center of the emitter assembly). For example, the emitter assembly 1400 may comprise the emitters 210, the detectors 212, 214, the substrate 216, the dome 218, and the electrical wires 219, which may be arranged and configured to operate as shown and described above with reference to FIGS. 8-10. For example, the procedure 700 may be performed to form the dome 218 of the emitter assembly 1400. The emitter assembly 1400 may comprise a barrier 1440 (e.g., a dam) that may be formed on the substrate 216 around the emitters 210 and the detectors 212, 214 (e.g., at 712 of the procedure 700). For example, the barrier 1440 may be formed from a high viscosity, quick setting epoxy. The barrier 1440 may be formed around one or more parts that are mounted to the substrate 216, such as the emitters 210 and the detectors 212, 214 (e.g., in a similar manner as the barrier 840 is formed). The barrier 1440 may be formed in a shape, such as an ellipse (e.g., a circle or an oval) or a polygon (e.g., a square, a rectangle, or a complex polygon shape), that surrounds the emitters 210 and the detectors 212, 214. The barrier 1440 may have a height $H_B$ that is greater than a height of the devices and wires mounted to the substrate 216 (e.g., the emitters 210 and the detectors 212, 214 and the electrical wires 219). The barrier 1440 may form a recess (e.g., similar to the recess 842) between the barrier 1440 and the substrate 216. For example, the barrier 1440 may have a rectangular-shaped (e.g., square-shaped) cross-section (e.g., as shown in FIG. 22), although other variations are possible.

The dome 218 of the emitter assembly 1400 may also comprise a first dome portion 1410 (e.g., a first body portion) and a second dome portion 1430 (e.g., a second body portion). The first dome portion 1410 may be formed by depositing (e.g., filling or pouring) a first material (e.g., a thermoset material, such as formed from an optical liquid silicone rubber) into the recess defined by the barrier 1440 (e.g., at 714 of the procedure 700) and curing the first material (e.g., at 718 of the procedure 700). Prior to the curing process, the first material may comprise a liquid material. After the curing process, the first dome portion 1410 may comprise a cured form of the liquid material (e.g., the first material) that is deposited in the recess defined by the barrier 1440. For example, the second dome portion 1430 may be made during a manufacturing process (e.g., an injection molding process) that is separate from the process for making the first dome portion 1410 (e.g., the curing process at 718 of the procedure 700). The second dome portion 1430 may be fully cured or partially cured (e.g., 70% cured) during the injection molding process. The second dome portion 1430 may be optically transmissive (e.g., transparent and/or translucent). The second dome portion 1430 may be made from a second material, which may be a clear material or a diffusive material. For example, the second material of the second dome portion 1430 may be the same as the first material of the first dome portion 1410 (e.g., a translucent thermoset material, such as formed from an optical liquid silicone rubber). For example, the second dome portion 1430 may be made during a manufacturing process (e.g., an injection molding process) that is separate from the process for making the first dome portion 1410. The second dome portion 1430 may have a shape (e.g., contour) that defines an outer surface 1431 and operates to direct light from the emitters 210 in a desired and/or optimal direction (e.g., towards a lens of a lighting fixture in which the emitter assembly 1400 is installed) and to reduce an amount of light that is reflected back into the dome 218. For example, the second dome portion 1430 may have a hemispherical shape and the outer surface 1431 that may have a smooth or textured finish. The second dome portion 1430 may also define an interface surface 1432 that may have a smooth or textured finish. The interface surface 1432 of the second dome portion 1430 may have a circular perimeter and may have a diameter $D_{DOME2}$ that is sized such that the barrier 1440 extends (e.g., slightly extends) past the perimeter of the interface surface 1432.

The second dome portion 1430 may comprise the one or more support members 1434 (e.g., feet) configured to support the second dome portion 1430 relative to the first dome portion 1410 (e.g., above and on top of the first dome portion 1410). In some examples, the one or more support members 1434 may contact the substrate 216 for supporting the second dome portion 1430 relative to the first dome portion 1410. As shown in FIG. 22, the one or more support members 1434 may extend from the interface surface 1432 of the second dome portion 1430 and into the recess defined by the barrier 1440. For example, the support members 1434 may have a height $H_{SM}$ that is approximately the same as the height $H_B$ of the barrier 1440. The one or more support members 1434 may comprise one or more respective ledge portions 1438 that may be supported on the barrier 1440 when the one or more support members 1434 are received in the recess defined by the barrier 1440. The one or more support members 1434 may comprise, for example, a plurality of support members (e.g., four support members of equal lengths) spaced apart (e.g., evenly spaced apart) around the perimeter of the interface surface 1432 of the second dome portion 1430. In some examples, the second dome portion 1430 may comprise more (e.g., five or more) or less (e.g., three) support members 1434 around the perimeter of the interface surface 1432. In addition, the one or more support members 1434 may comprise, for example, a single support member that extends around the perimeter of the interface surface 1432 of the second dome portion 1430.

The second dome portion 1430 may be placed onto the barrier 1440 and/or the first material in the recess (e.g., at 716 of the procedure 700) after depositing the first material into the recess and then the first material within the recess may be cured to form the dome 218. For example, the first dome portion 1410 and the second dome portion 1430 may be made of the same or similar materials, such that light from the emitters 210 may be transmitted through the dome 218 (e.g., as if the dome 218 were fabricated from a single material during a single step manufacturing process). While the first dome portion 1410 and the second dome portion 1430 may be fabricated as independent parts, the first dome portion 1410 and the second dome portion 1430 may be made of sufficiently similar material and may be brought into contact at appropriate stages of a curing process, such that cross-linking of molecules across the part boundaries may occur at an intersection 1420 (e.g., an interface) between the first dome portion 1410 and the second dome portion 1430. An inner diameter $D_{INNER}$ between inner edges 1435 of the support members 1434 may be sized to avoid interference with the electrical wires 219 connected to the emitters 210 and the detectors 212, 214 (e.g., when the second dome portion 1430 is placed onto the barrier 1440). An outer diameter $D_{OUTER}$ between outer edges 1436 of the support members 1434 may be sized such that the outer edges 1436 of the support members 1434 contact the barrier 1440, which may prevent side-to-side movement of the second dome portion 1430 (e.g., prior to the curing process). In some examples, the interface surface 1432 of the second dome portion 1430 may be convex (e.g., slightly convex), such that the interface surface 1432 extends into the first material of the first dome portion 1410 (e.g., which may help with forming the interface 1420 between the first dome portion 1410 and the second dome portion 1430). While the emitter assembly 1400 is described herein as being assembled using the procedure 700, an emitter assembly similar to the emitter assembly 1400 (e.g., having the second dome portion 1430) may also be assembled using the procedure 900.

Figure 23:
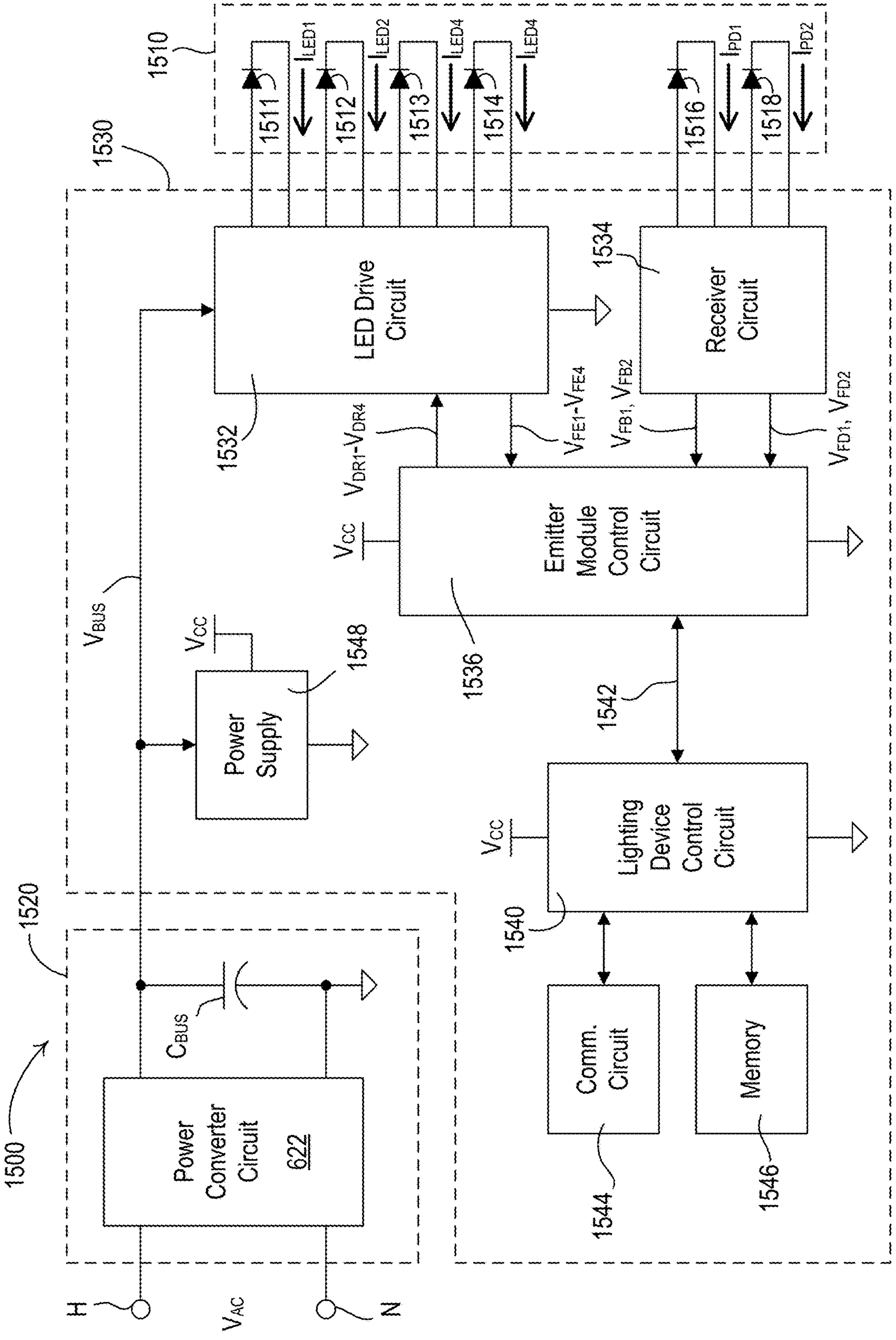
FIG. 23 is a simplified block diagram of an example lighting device, such as the lighting device of FIG. 1.

FIG. 23 is a simplified block diagram of an example electrical device, such as a lighting device 1500 (e.g., the lighting device 140 shown in FIG. 1). The lighting device 1500 may comprise one or more emitter assemblies 1510 (e.g., the emitter assembly 200 shown in FIGS. 8 and 9, the emitter assembly 400 shown in FIGS. 12A-12F, the emitter assembly 600 shown in FIGS. 14A-14G, the emitter assembly 800 shown in FIGS. 16A-16F, emitter assembly 1000 shown in FIGS. 18A-18F, the emitter assembly 1100*a* shown in FIG. 19A, the emitter assembly 1100*b* shown in FIG. 19B, the emitter assembly 1200*a* shown in FIG. 20A, the emitter assembly 1200*b* shown in FIG. 20B, the emitter assembly 1300 shown in FIG. 21, and/or the emitter assembly 1400 shown in FIG. 22). For example, the lighting device 1500 may comprise an emitter assembly 1510 that may include one or more emitters 1511, 1512, 1513, 1514. Each of the emitters 1511, 1512, 1513, 1514 is shown in FIG. 23 as a single LED, but may each comprise a plurality of LEDs connected in series (e.g., a chain of LEDs), a plurality of LEDs connected in parallel, or a suitable combination thereof, depending on the particular lighting system. In addition, each of the emitters 1511, 1512, 1513, 1514 may comprise one or more organic light-emitting diodes (OLEDs). For example, the first emitter 1511 may represent a chain of red LEDs, the second emitter 1512 may represent a chain of blue LEDs, the third emitter 1513 may represent a chain of green LEDs, and the fourth emitter 1514 may represent a chain of white or amber LEDs. The emitters 1511, 1512, 1513, 1514 may be controlled to adjust a brightness (e.g., a luminous flux or an intensity) and/or a color (e.g., a color temperature) of a cumulative light output of the lighting device 1500. The emitter assembly 1510 may also comprise one or more detectors 1516, 1518 (e.g., photodiodes) that may produce respective photodiode currents $I_{PD1}$, $I_{PD2}$ (e.g., detector signals) in response to incident light. For example, the first detector 1516 may represent a single red, orange or yellow LED or multiple red, orange or yellow LEDs in parallel (e.g., the first detectors 212 of the emitter assembly 200), and the second detector 1518 may represent a single green LED or multiple green LEDs in parallel (e.g., the second detectors 214 of the emitter assembly 200). The emitter assembly 1510 may be mounted on a carrier PCB (e.g., the carrier PCB 150) of the lighting device 1500.

The lighting device 1500 may comprise a power-board circuit 1520 (e.g., the power converter circuit 140 and/or the power converter circuit 340). The power-board circuit 1520 may be mounted to a power PCB (e.g., the power PCB 142) of the lighting device 1500. The power-board circuit 1520 may comprise a power converter circuit 1522, which may receive a source voltage, such as an AC mains line voltage $V_{AC}$, via a hot connection H and a neutral connection N (e.g., via the screw-in base 116). The power converter circuit 1522 may generate a DC bus voltage $V_{BUS}$ (e.g., approximately 15-20V) across a bus capacitor $C_{BUS}$. The power converter circuit 1522 may comprise, for example, a boost converter, a buck converter, a buck-boost converter, a flyback converter, a single-ended primary-inductance converter (SEPIC), a Ćuk converter, or any other suitable power converter circuit for generating an appropriate bus voltage. The power converter circuit 1522 may provide electrical isolation between the AC power source and the emitters 1511, 1512, 1513, 1514, and may operate as a power factor correction (PFC) circuit to adjust the power factor of the lighting device 1500 towards a power factor of one.

The lighting device 1500 may comprise a control-board circuit 1530. The control-board circuit 1530 may be mounted to a control PCB (e.g., the control PCB 160) of the lighting device 1500. The control-board circuit 1530 may comprise an LED drive circuit 1532 for controlling (e.g., individually controlling) the power delivered to and the luminous flux of the light emitted of each of the emitters 1511, 1512, 1513, 1514 of the emitter assembly 1510. The LED drive circuit 1532 may receive the bus voltage $V_{BUS}$ and may adjust magnitudes of respective LED drive currents $I_{LED1}$, $I_{LED2}$, $I_{LED3}$, $I_{LED4}$ conducted through the emitters 1511, 1512, 1513, 1514. The LED drive circuit 1532 may comprise one or more regulation circuits (e.g., four regulation circuits), such as switching regulators (e.g., buck converters) for controlling the magnitudes of the respective LED drive currents $I_{LED1}$-$I_{LED4}$. An example of the LED drive circuit 1532 is described in greater detail in U.S. Pat. No. 9,485,813, issued Nov. 1, 2016, entitled ILLUMINATION DEVICE AND METHOD FOR AVOIDING AN OVER-POWER OR OVER-CURRENT CONDITION IN A POWER CONVERTER, the entire disclosure of which is hereby incorporated by reference.

The control-board circuit 1530 may comprise a receiver circuit 1534 that may be electrically coupled to the detectors 1516, 1518 of the emitter assembly 1510 for generating respective optical feedback signals $V_{FB1}$, $V_{FB2}$ in response to the photodiode currents $I_{PD1}$, $I_{PD2}$. The receiver circuit 1534 may comprise one or more trans-impedance amplifiers (e.g., two trans-impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The control-board circuit 1530 may comprise an emitter assembly control circuit 1536 for controlling the LED drive circuit 1532 to control the intensities of the emitters 1511, 1512, 1513, 1514 of the emitter assembly 1510. The emitter assembly control circuit 1536 may comprise, for example, a microprocessor, a microcontroller, a programmable logic device (PLD), an application specific integrated circuit (ASIC), a field-programmable gate array (FPGA), or any other suitable processing device or controller. The emitter assembly control circuit 1536 may generate one or more drive signals $V_{DR1}$, $V_{DR2}$, $V_{DR3}$, $V_{DR4}$ for controlling the respective regulation circuits in the LED drive circuit 1532. The emitter assembly control circuit 1536 may receive the optical feedback signals $V_{FB1}$, $V_{FB2}$ from the receiver circuit 1534 for determining the luminous flux $L_E$ of the light emitted by the emitters 1511, 1512, 1513, 1514.

The emitter assembly control circuit 1536 may receive a plurality of emitter forward-voltage feedback signals $V_{FE1}$, $V_{FE2}$, $V_{FE3}$, $V_{FE4}$ from the LED drive circuit 1532 and a plurality of detector forward-voltage feedback signals $V_{ED1}$, $V_{ED2}$ from the receiver circuit 1534. The emitter forward-voltage feedback signals $V_{HE1}$-$V_{FE4}$ may be representative of the magnitudes of the forward voltages of the respective emitters 1511, 1512, 1513, 1514, which may indicate temperatures $T_{E1}$, $T_{E2}$, $T_{E3}$, $T_{E4}$ of the respective emitters. If each emitter 1511, 1512, 1513, 1514 comprises multiple LEDs electrically coupled in series, the emitter forward-voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward-voltage feedback signals $V_{FD1}$, $V_{FD2}$ may be representative of the magnitudes of the forward voltages of the respective detectors 1516, 1518, which may indicate temperatures $T_{D1}$, $T_{D2}$ of the respective detectors. For example, the detector forward-voltage feedback signals $V_{FD1}$, $V_{FD2}$ may be equal to the forward voltages $V_{FD}$ of the respective detectors 1516, 1518.

The lighting device 1500 may comprise a lighting device control circuit 1540 that may be electrically coupled to the emitter assembly control circuit 1536 via a communication bus 1542 (e.g., an $I^2C$ communication bus). The lighting device control circuit 1540 may be configured to control the emitter assembly 1510 to control the brightness (e.g., the luminous flux) and/or the color (e.g., the color temperature) of the cumulative light emitted by the lighting device 1500. The lighting device control circuit 1540 may comprise, for example, a microprocessor, a microcontroller, a programmable logic device (PLD), an application specific integrated circuit (ASIC), a field-programmable gate array (FPGA), or any other suitable processing device or controller. The lighting device control circuit 1540 may be configured to adjust (e.g., dim) a present intensity $L_{PRES}$ (e.g., a present brightness) of the cumulative light emitted by the lighting device 1500 towards a target intensity $L_{TRGT}$ (e.g., a target brightness), which may range across a dimming range of the lighting device, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). The lighting device control circuit 1540 may be configured to adjust a present color temperature $T_{PRES}$ of the cumulative light emitted by the lighting device 1500 towards a target color temperature $T_{TRGT}$, which may range between a cool-white color temperature (e.g., approximately 3100-4500 K) and a warm-white color temperature (e.g., approximately 2000-3000 K).

The lighting device 1500 may comprise a communication circuit 1544 coupled to the lighting device control circuit 1540. The communication circuit 1544 may comprise a wireless communication circuit, such as, for example, a radio-frequency (RF) transceiver coupled to an antenna for transmitting and/or receiving RF signals. The wireless communication circuit may be an RF transmitter for transmitting RF signals, an RF receiver for receiving RF signals, or an infrared (IR) transmitter and/or receiver for transmitting and/or receiving IR signals. The communication circuit 1544 may be coupled to the hot connection H and the neutral connection N of the lighting device 1500 for transmitting a control signal via the electrical wiring using, for example, a power-line carrier (PLC) communication technique. The lighting device control circuit 1540 may be configured to determine the target intensity $L_{TRGT}$ for the lighting device 1500 in response to messages (e.g., digital messages) received via the communication circuit 1534.

The lighting device 1500 may comprise a memory 1546 configured to store operational characteristics of the lighting device 1500 (e.g., the target intensity $L_{TRGT}$, the target color temperature $T_{TRGT}$, the low-end intensity $L_{LE}$, the high-end intensity $L_{HE}$, etc.). The memory may be implemented as an external integrated circuit (IC) or as an internal circuit of the lighting device control circuit 1540. The lighting device 1500 may comprise a power supply 1548 that may receive the bus voltage $V_{BUS}$ and generate a supply voltage $V_{CC}$ for powering the lighting device control circuit 1540 and other low-voltage circuitry of the lighting device.

When the lighting device 1500 is on, the light source control circuit 1540 may be configured to control the emitter assemblies 1510 to emit light substantially all of the time. The lighting device control circuit 1540 may be configured to control the emitter assemblies 1510 to disrupt the normal emission of light to measure one or more operational characteristics of the emitter assemblies during periodic measurement intervals. For example, during the measurement intervals, the emitter assembly control circuit 1536 may be configured to individually turn on each of the different-colored emitters 1511, 1512, 1513, 1514 of the emitter assemblies 1510 (e.g., while turning of the other emitters) and measure the luminous flux of the light emitted by that emitter using one of the two detectors 1516, 1518. For example, the emitter assembly control circuit 1536 may turn on the first emitter 1511 of the emitter assembly 1510 (e.g., at the same time as turning off the other emitters 1512, 1513, 1514 and determine the luminous flux $L_E$ of the light emitted by the first emitter 1511 in response to the first optical feedback signal $V_{FB1}$ generated from the first detector 1516. In addition, the emitter assembly control circuit 1536 may be configured to drive the emitters 1511, 1512, 1513, 1514 and the detectors 1516, 1518 to generate the emitter forward-voltage feedback signals $V_{FE1}$-$V_{FE4}$ and the detector forward-voltage feedback signals $V_{FD1}$, $V_{FD2}$ during the measurement intervals.

Methods of measuring the operational characteristics of emitter assemblies in a lighting device are described in greater detail in U.S. Pat. No. 9,332,598, issued May 3, 2016, entitled INTERFERENCE-RESISTANT COMPENSATION FOR ILLUMINATION DEVICES HAVING MULTIPLE EMITTER MODULES; U.S. Pat. No. 9,392,660, issued Jul. 12, 2016, entitled LED ILLUMINATION DEVICE AND CALIBRATION METHOD FOR ACCURATELY CHARACTERIZING THE EMISSION LEDS AND PHOTODETECTOR(S) INCLUDED WITHIN THE LED ILLUMINATION DEVICE; and U.S. Pat. No. 9,392,663, issued Jul. 12, 2016, entitled ILLUMINATION DEVICE AND METHOD FOR CONTROLLING AN ILLUMINATION DEVICE OVER CHANGES IN DRIVE CURRENT AND TEMPERATURE, the entire disclosures of which are hereby incorporated by reference.

Calibration values for the various operational characteristics of the lighting device 1500 may be stored in the memory 1546 as part of a calibration procedure performed during manufacturing of the lighting device 1500. Calibration values may be stored for each of the emitters 1511, 1512, 1513, 1514 and/or the detectors 1516, 1518 of each of the emitter assemblies 1510. For example, calibration values may be stored for measured values of luminous flux (e.g., in lumens), x-chromaticity, y-chromaticity, emitter forward voltage, photodiode current, and detector forward voltage. For example, the luminous flux, x-chromaticity, and y-chromaticity measurements may be obtained from the emitters 1511, 1512, 1513, 1514 using an external calibration tool, such as a spectrophotometer. The values for the emitter forward voltages, photodiode currents, and detector forward voltages may be measured internally to the lighting device 1500. The calibration values for each of the emitters 1511, 1512, 1513, 1514 and/or the detectors 1516, 1518 may be measured at a plurality of different drive currents, and/or at a plurality of different operating temperatures.

After installation, the lighting device control circuit 1540 of the lighting device 1500 may use the calibration values stored in the memory 1546 to maintain a constant light output from the emitter assemblies 1510. The lighting device control circuit 1540 may determine target values for the luminous flux to be emitted from the emitters 1511, 1512, 1513, 1514 to achieve the target intensity $L_{TRGT}$ and/or the target color temperature $T_{TRGT}$ for the lighting device 1500. The lighting device control circuit 1540 may determine the magnitudes for the respective drive currents $I_{LED1}$-$I_{LED4}$. for the emitters 1511, 1512, 1513, 1514 based on the determined target values for the luminous flux to be emitted from the emitters 1511, 1512, 1513, 1514. When the age of the lighting device 1400 is zero, the magnitudes of the respective drive currents $I_{LED1}$-$I_{LED4}$ for the emitters 1511, 1512, 1513, 1514 may be controlled to initial magnitudes $I_{LED\text{-}INITIAL}$.

The light output of the emitter assemblies 1510 may decrease as the emitters 1511, 1512, 1513, 1514 age. The lighting device control circuit 1540 may be configured to increase the magnitudes of the drive current IDR for the emitters 1511, 1512, 1513, 1514 to adjusted magnitudes $I_{LED\text{-}ADJUSTED}$ to achieve the determined target values for the luminous flux of the target intensity $L_{TRGT}$ and/or the target color temperature $T_{TRGT}$. Methods of adjusting the drive currents of emitters to achieve a constant light output as the emitters age are described in greater detail in U.S. Pat. No. 9,769,899, issued Sep. 19, 2017, entitled ILLUMINATION DEVICE AND AGE COMPENSATION METHOD, the entire disclosure of which is hereby incorporated by reference.

What is claimed is:

1. A light-generation module comprising:

a substrate; and an emitter assembly mounted to the substrate, the emitter assembly comprising:

one or more emitters mounted to the substrate;

a barrier located on a surface of the substrate and surrounding the one or more emitters, the barrier and the surface of the substrate defining a recess, the barrier characterized by a height measured from the substrate to a farthest point of the barrier from the substrate;

a first dome portion formed on the surface of the substrate and located within the recess defined by the barrier and the surface of the substrate, the first dome portion encapsulating the one or more emitters and characterized by a height measured from the substrate to a farthest point of the first dome portion from the substrate, the first dome portion made of a first material that is optically transmissive; and a second dome portion located above the first dome portion, such that the first dome portion is located between the second dome portion and the substrate, the second dome portion having a shape configured to direct light from the one or more emitters, the second dome portion made of a second material that is optically transmissive;

wherein the height of the first dome portion is approximately equal to the height of the barrier, such that the first dome portion is located within the recess defined by the barrier and the surface of the substrate;

wherein the second dome portion comprises one or more support members that extend from an interface surface of the second dome portion into the recess defined by the barrier and the surface of the substrate, and wherein the one or more support members contact the substrate and the barrier between the barrier and the first dome portion, such that the one or more support members support the second dome portion relative to the first dome portion; and wherein the second dome portion has an outer surface that has a textured finish.

2. The light-generation module of claim 1, wherein the substrate is a printed circuit board, wherein drive circuitry for the one or more emitters of the emitter assembly is mounted to the printed circuit board.

3. The light-generation module of claim 2, wherein the printed circuit board comprises a metal core printed circuit board.

4. The light-generation module of claim 2, wherein the printed circuit board is made from an FR4 material.

5. The light-generation module of claim 1, further comprising:

a printed circuit board;

wherein the substrate comprises an intermediate substrate mounted to the printed circuit board, and wherein the intermediate substrate comprises a ceramic substrate.

6. The light-generation module of claim 1, wherein the height of the barrier is greater than a height of devices and wires mounted to the substrate.

7. The light-generation module of claim 1, wherein the emitter assembly comprises one or more detectors and electrical wires, and wherein the height of the first dome portion is configured such that the first dome portion surrounds and encapsulates the one or more emitters, the one or more detectors, and the electrical wires.

8. The light-generation module of claim 1, wherein a diameter of the first dome portion is approximately equal to a diameter of the barrier.

9. The light-generation module of claim 1, wherein the one or more support members have a height that is approximately the same as the height of the barrier.

10. The light-generation module of claim 1, wherein the textured finish of the outer surface of the second dome portion is textured to increase scattering of light emitted by the one or more emitters as compared to a smooth finish, and wherein the textured finish of the outer surface is configured to reflect an amount of the light emitted by the one or more emitters toward one or more detectors mounted on the substrate.

11. The light-generation module of claim 1, wherein the second dome portion comprises one or more ledge portions that are supported on the barrier.

12. The light-generation module of claim 1, wherein the one or more support members are a single support member that extends around a perimeter of the interface surface of the second dome portion.

13. The light-generation module of claim 1, wherein the one or more support members comprise flange portions configured to hold the second dome portion in place relative to the first dome portion.

14. A light-generation module comprising:

a substrate; and an emitter assembly mounted to the substrate, the emitter assembly comprising:

one or more emitters mounted to the substrate;

a barrier located on a surface of the substrate and surrounding the one or more emitters, the barrier and the surface of the substrate defining a recess;

a first dome portion formed on the surface of the substrate and located within the recess defined by the barrier and the surface of the substrate, the first dome portion encapsulating the one or more emitters, the first dome portion made of a first material that is optically transmissive; and a second dome portion located above the first dome portion, such that the first dome portion is located between the second dome portion and the substrate, the second dome portion having a shape configured to direct light from the one or more emitters, the second dome portion made of a second material that is optically transmissive;

wherein the second dome portion defines an interface surface proximate the first dome portion, and wherein the second dome portion comprises one or more support members that extend from the interface surface of the second dome portion into the recess formed by the barrier and the surface of the substrate, such that the one or more support members contact the substrate in the recess formed by the barrier and the surface of the substrate, wherein each support member of the one or more support members comprises an outer edge that contacts the barrier, and wherein the second dome portion further comprises one or more ledge portions that are supported on the barrier.

15. The light-generation module of claim 14, wherein the one or more support members comprise flange portions configured to hold the second dome portion in place relative to the first dome portion.

16. The light-generation module of claim 14, wherein a height of the barrier is greater than a height of devices and wires mounted to the substrate.

17. The light-generation module of claim 14, wherein the emitter assembly comprises one or more detectors and electrical wires, and wherein the height of the first dome portion is configured such that the first dome portion surrounds and encapsulates the one or more emitters, the one or more detectors, and the electrical wires.

18. The light-generation module of claim 14, wherein a diameter of the first dome portion is approximately equal to a diameter of the barrier.

19. The light-generation module of claim 14, wherein the one or more support members are a single support member that extends around a perimeter of the interface surface of the second dome portion.

20. A light-generation module comprising:

a substrate; and an emitter assembly mounted to the substrate, the emitter assembly comprising:

one or more emitters mounted to the substrate;

a barrier located on a surface of the substrate and surrounding the one or more emitters, the barrier and the surface of the substrate defining a recess;

a first dome portion formed on the surface of the substrate and located within the recess defined by the barrier and the surface of the substrate, the first dome portion encapsulating the one or more emitters, the first dome portion made of a first material that is optically transmissive; and a second dome portion located above the first dome portion, such that the first dome portion is located between the second dome portion and the substrate, the second dome portion having a shape configured to direct light from the one or more emitters, the second dome portion made of a second material that is optically transmissive and defining an interface surface that is proximate an interface surface of the first dome portion;

wherein the second dome portion comprises one or more support members that contact the substrate and reside within the recess, and wherein the second dome portion contacts an upper surface of the barrier.

21. The light-generation module of claim 20, further comprising an adhesive located between the interface surface of the first dome portion and the interface surface of the second dome portion for attaching the first dome portion to the second dome portion, wherein the adhesive comprises an optical bonding silicone.

22. The light-generation module of claim 20, wherein the one or more support members contact the substrate and the barrier such that the one or more support members prevent side-to-side movement of the second dome portion.

* * * * *